(12) United States Patent
Perkins et al.

(10) Patent No.: US 11,328,030 B2
(45) Date of Patent: May 10, 2022

(54) SYSTEMS AND METHODS OF GENERATING OR UPDATING A DESIGN BASED ON A UNIVERSAL RESOURCE LOCATOR (URL)

(71) Applicant: Canva Pty Ltd., Surry Hills (AU)

(72) Inventors: Melanie Joy Perkins, Surry Hills (AU); David Iain Hearnden, Darlinghurst (AU); Nikola Atanasov Yurukov, Sydney (AU)

(73) Assignee: Canva Pty Ltd, Surry Hills (AU)

( * ) Notice: Subject to any disclaimer, the term of this patent is extended or adjusted under 35 U.S.C. 154(b) by 218 days.

(21) Appl. No.: 16/698,249

(22) Filed: Nov. 27, 2019

(65) Prior Publication Data
US 2021/0157866 A1    May 27, 2021

(51) Int. Cl.
| | | |
|---|---|---|
| G06F 17/10 | (2006.01) | |
| G06F 16/955 | (2019.01) | |
| H04L 67/02 | (2022.01) | |
| G06F 16/957 | (2019.01) | |
| G06F 16/958 | (2019.01) | |

(52) U.S. Cl.
CPC .......... *G06F 16/955* (2019.01); *G06F 16/958* (2019.01); *G06F 16/9577* (2019.01); *H04L 67/02* (2013.01)

(58) Field of Classification Search
CPC .. G06F 16/955; G06F 16/958; G06F 16/9577; H04L 67/02
See application file for complete search history.

(56) References Cited

U.S. PATENT DOCUMENTS

| | | | | |
|---|---|---|---|---|
| 5,897,622 A | * | 4/1999 | Blinn | ................. G06Q 30/0635 705/26.81 |
| 6,085,229 A | * | 7/2000 | Newman | ............. G06F 16/9535 709/203 |
| 6,167,441 A | * | 12/2000 | Himmel | ............. G06F 16/9577 709/217 |
| 9,065,725 B1 | * | 6/2015 | Nanda | ................. G06F 9/45529 |
| 10,157,408 B2 | | 12/2018 | Varley | |
| 10,298,986 B2 | | 5/2019 | Cross | |

(Continued)

FOREIGN PATENT DOCUMENTS

WO      2019193407      10/2019

OTHER PUBLICATIONS

PCT/AU2020/051276, International Search Report and Written Opinion dated Feb. 5, 2021.

*Primary Examiner* — Shahid K Khan
(74) *Attorney, Agent, or Firm* — GrowIP Law Group LLC

(57) ABSTRACT

An apparatus includes a network interface and one or more processors. The network interface is configured to receive a request from a client device. The request includes a universal resource locator (URL). The one or more processors are configured, responsive to receiving the request, to identify a design template based on the URL, to generate a design based on the design template, and to generate design data by parsing the URL. The one or more processors are also configured to send, via the network interface, the design and the design data to the client device to cause display of an updated version of the design by applying the design data to the design. The one or more processors are further configured to receive the updated version of the design via the network interface from the client device.

15 Claims, 46 Drawing Sheets

(56) References Cited

U.S. PATENT DOCUMENTS

| | | | |
|---|---|---|---|
| 2003/0009460 A1* | 1/2003 | Bates | G06Q 10/107 |
| 2004/0172376 A1* | 9/2004 | Kobori | H04N 21/8113 |
| 2007/0079282 A1 | 4/2007 | Nachnani et al. | |
| 2007/0298773 A1* | 12/2007 | Uematsu | G06F 16/9577 |
| | | | 455/414.2 |
| 2008/0016219 A1* | 1/2008 | Libes | H04L 67/16 |
| | | | 709/226 |
| 2008/0147710 A1* | 6/2008 | Naam | G06F 16/958 |
| 2011/0258326 A1* | 10/2011 | Hu | H04L 63/062 |
| | | | 709/226 |
| 2011/0307436 A1* | 12/2011 | Cai | G06F 16/322 |
| | | | 706/48 |
| 2012/0110032 A1* | 5/2012 | Robison | G06F 16/958 |
| | | | 707/812 |
| 2013/0268447 A1* | 10/2013 | Stephens | G06Q 30/0645 |
| | | | 705/307 |
| 2014/0250366 A1* | 9/2014 | Bertram | G06F 16/958 |
| | | | 715/234 |
| 2015/0161082 A1* | 6/2015 | Levien | G06F 16/93 |
| | | | 715/235 |
| 2017/0124211 A1* | 5/2017 | Suter | G06N 20/20 |
| 2017/0357731 A1 | 12/2017 | Miller et al. | |
| 2018/0139481 A1* | 5/2018 | Cross | H04N 21/2662 |
| 2019/0043231 A1* | 2/2019 | Uzgin | G06T 11/60 |
| 2020/0125305 A1* | 4/2020 | Mihira | H04L 67/02 |
| 2021/0092176 A1* | 3/2021 | Schneider | H04L 65/4092 |

\* cited by examiner

FIG. 14

Design Template ID 702 — URL Gen. Interface 373 — Option 1402

Posts

| Tab 1 x | Tab 2 x | Tab 3 x | Tab 4 x | Posts x | ⊕ |

File  Edit  View  Insert  Format  Data  Tools  Add-ons  Help  Design Create  Design Edit HYPERLINK("http://www.cdesign.com/design/DADT-EjqcN8/remix?set.page.1.elements.pretitle.text=Testing%20Text&set.page.1.elements.pretitle.text.att=font-family~|font-weigt~normal|font-style~normal|text-transform~none|tracking~leading~&set.page.1.elements.title.text=Happy%20Birthday&set.page.1.elements.title.text.att=font-family~|font-weight~normal|font-style~normal|text-transform~none|tracking~leading~&set.page.1.elements.subtitle.text=Excellent%20person&set.page.1.elements.subtitle.text.att=font-family~|font-weight~normal|font-style~normal|text-transform~none|tracking~leading~&set.palette=%23f62a3c!%23fcfaf4!%23fab62b!%23fab62b!%23f62a3c!%23fcfaf4&", "Create your design")

→ Create your design https://www.cdesign.com...3c!%23fcfaf4&

| | EF | EG | EH | EI | EJ | EK | EL | EM | EN | EO |
|---|---|---|---|---|---|---|---|---|---|---|
| 1 | Color Palette | | | | | | | | | |
| 2 | Color Palette ID | 1 | 2 | 3 | 4 | 5 | 6 | | | |
| 3 | Forever Fields | #f62a3c | #fcfaf4 | #fab62b | #fab62b | #f62a3c | #fcfaf4 | | | |
| 4 | | | | | | | | | | |

| | EF | EG | EH | EI | EJ | EK | EL | EM | EN | EO |
|---|---|---|---|---|---|---|---|---|---|---|
| 1 | Color Palette | | | | | | | Document Creation | | |
| 2 | Color Palette ID | 1 | 2 | 3 | 4 | 5 | 6 | Document Title | Page 1 - Title | Create Design Link (auto) |
| 3 | Forever Fields | #f62a3c | #cfaf4 | #fab62b | #fab62b | #f62a3c | #cfaf4 | MY NEW TEMPLATE | PAGE ONE | Create your design |
| 4 | | | | | | | | | | |

Row 2 formula:
HYPERLINK("http://www.cdesign.com/design/DADT-EjqcN8/remix?set.page.1.elements.pretitle.text=Testing%20Text&set.page.1.elements.pretitle.text.att=font-family~!font-weight~normal!font-style~normal!text-transform~none!tracking~!leading~&set.page.1.elements.title.text=Happy%20Birthday&set.page.1.elements.title.text.att=font-family~!font-weight~normal!font-style~normal!text-transform~none!tracking~!leading~&set.page.1.elements.subtitle.text=Excellent%20person&set.page.1.elements.subtitle.text.att=font-family~!font-weight~normal!font-style~normal!text-transform~none!tracking~!leading~&set.palette=%23f62a3c!%23cfaf4!%23fab62b!%23fab62b!%23f62a3c!%23cfaf4&set.title=MY%20NEW%20TEMPLATE&", "Create your design")

https://www.cdesign.com...W%20TEMPLATE&

FIG. 17

```
O O O  | Tab 1 x | Tab 2 x | Tab 3 x | Tab 4 x | Posts x | ⊕
← →
```

← URL Gen. Interface 373

Design ID 1802

Posts

File   Edit   View   Insert   Format   Data   Tools   Add-ons   Help   Design Create   Design Edit HYPERLINK("http://www.cdesign.com/design/DADT-ykknLw/edit?set.page.1.elements.pretitle.text=Testing%20Text&set.page.1.elements.pretitle.text.att=font-family~lfont-weigt~normal|font-style~normal|text-transform~none|tracking~l|eading~& set.page.1.elements.title.text=Happy%20Birthday&set.page.1.elements.title.text.att=font-family~lfont-family~lfont-weight~normal|font-style~normal|text-transform~none|tracking~l|eading~& set.page.1.elements.subtitle.text=Excellent%20person&set.page.1.elements.subtitle.text.att=font-family~lfont-weight~normal|font-style~normal|text-transform~none|tracking~l|eading~& set.palette=%234e1a3d|%23ffffff|%2305e0e9|%23ff2768|%23ffc4d4|%23ffffff&set.title=MY%20NEW%20TEMPLATE&set.auth-token=z-CdzzHs4lbUhZ_tRb0Lw", "Update your design"

| | EF | EG | EH | EI | EJ | EK | EL | EM | EN | EO | EP |
|---|---|---|---|---|---|---|---|---|---|---|---|
| | Color Palette | | | | | | | Document Creation | | | Document Editing |
| 1 | Color Palette ID | 1 | 2 | 3 | 4 | 5 | 6 | Document Title | Page 1 - Title | Create Design Link (auto) | Edit Design Link (auto) |
| 2 | Berry Blues | #4e1a3d | #ffffff | #05e0e9 | #ff2768 | #ffc4d4 | #ffffff | MY NEW TEMPLATE | PAGE ONE | Create your design | Update your design |
| 3 | | | | | | | | | | | |
| 4 | | | | | | | | | | | |

Token 2102

Option 2602 https://www.cdesign.com...4lbUhZ_tRb0Lw

*FIG. 26*

| | Z | AA | AB | AC | AD | AE | AF | AG | AH | AI | AJ |
|---|---|---|---|---|---|---|---|---|---|---|---|
| 1 | Page 1 - Copy | | | | | | | | | Page 1 - BG | |
| 2 | Pretitle | cc | PT size | Title | cc | Tsize | Subtitle | cc | S size | BG | BG Type |
| 3 | Testing Test | 12 | | Happy Birthday | 14 | | Excellent Person | 16 | | MADGxmOGy6l | photo |
| 4 | | | | | | | | | | | |
| 5 | | | | | | | | | | | |
| 6 | | | | | | | | | | | |
| 7 | | | | | | | | | | | |

FIG. 29

| | | | | | | | | | | | | | | | | | | | |
|---|---|---|---|---|---|---|---|---|---|---|---|---|---|---|---|---|---|---|---|
| ○○○ | | Social Media – BASE TEMPLAT x | Tab 3 x | Tab 4 x | | | | | | | | | | | | | | | |
| ← → | | | | | | | | | | | | | | | | | | | |
| Posts | | | | | | | | | | | | | | | | | | | |
| File | Edit | View | Insert | Format | Data | Tools | Add-ons | Help | | | | | | | | | | | |
| | | | Posts x ⊕ | | | | | | | | | | | | | | | | |
| | A | B | C | D | E | F | G | H | I | J | K | L | M | N | O | P | Q | R | S |
| 1 | Job Status | | | | | | E1 Info | | | | | E2 Info | | | | | | | |
| 2 | Status | To do | Status Code | Trouble -shoot | Temp. V Look Up Col. | Point Person | E1 thumb -nail | E1 URL | E1 Type | E1 Design ID | E1 Media ID | Base Descrip -tion | E2 Base ID | E2 Base thumb -nail | BT E2 URL | BT E2 Type | Hacky Tool URL | E2 Design ID | E2 Design Tasks |
| 3 | WiP | Content inject me | Need Base Template Designed | | #N/A | Lynn | | | | | | | DADT-EjqcN8 | | | | Edit in hacky tool | DADT-ykknLw | z-_CdzzHs4IbUh_Z_tRb0Lw |
| 4 | WiP | Content inject me | Need Base Template Designed | | #N/A | Lynn | | | | | | | DADT-EjqcN8 | | | | Edit in hacky tool | | ← |

URL Gen. Interface 373

Design Template ID 702 — Row 3302, Row 3304

*FIG. 33*

| | A | B | C | D | E | F | G | H | I | J | K | L | M | N | O | P | Q | R | S |
|---|---|---|---|---|---|---|---|---|---|---|---|---|---|---|---|---|---|---|---|
| 1 | Job Status | | | | | | E1 Info | | | | | E2 Info | | | | | | | |
| 2 | Status | To do | Status Code | Trouble-shoot | Temp. V Look Up Col. | Point Person | E1 thumb-nail | URL | E1 Type | E1 Design ID | E1 Media ID | Base Descrip-tion | E2 Base ID | E2 Base thumb-nail | BT URL | E2 Type | Hacky Tool URL | E2 Design ID | E2 Design Tasks |
| 3 | WIP | Content inject me | Need Base Template Designed | | #N/A | Lynn | | | | | | | DADT-EijcN8 | | | | Edit in hacky tool | DADT-ykknLw | z-CdzzHs4tbUhZ_tRbQLw |
| 4 | WIP | Content inject me | Need Base Template Designed | | #N/A | Lynn | | | | | | | DADT-EijcN8 | | | | Edit in hacky tool | | |
| 5 | WIP | Content inject me | Need Base Template Designed | | #N/A | Lynn | | | | | | | DADT-EijcN8 | | | | Edit in hacky tool | | |
| 6 | WIP | Content inject me | Need Base Template Designed | | | Lynn | | | | | | | DADT-EijcN8 | | | | Edit in hacky tool | | |

| | Z | AA | AB | AC | AD | AE | AF | AG | AH | AI | AJ | |
|---|---|---|---|---|---|---|---|---|---|---|---|---|
| 1 | Page 1 – Copy | | | | | | | | | Page 1 – BG | | |
| 2 | Pretitle | cc | PT size | Title | cc | Tsize | Subtitle | cc | S size | BG | BG Type | |
| 3 | Testing Test | 12 | | Happy Birthday | 14 | | Excellent Person | 16 | | MADGxmOGy6I | photo | ← Row 3302 |
| 4 | Testing Test | 12 | | Version 2 | 9 | | Merry Christmas | 15 | | MAAgcNpWaG8 | photo | ← Row 3304 |
| 5 | Testing Test | 12 | | Version 3 | 9 | | Happy Hannukah | 14 | | MAA1JuDYzQc | photo | ← Row 3506 |
| 6 | Testing Test | 12 | | Version 4 | 9 | | Happy Easter | 12 | | MAB0ObUqawl | | ← Row 3508 |
| 7 | | | | | | | | | | | | |

URL Gen. Interface 373

Posts
File  Edit  View  Insert  Format  Data  Tools  Add-ons  Help  Design Create  Design Edit Tab 1 x | Tab 2 x | Tab 3 x | Tab 4 x | Posts x URL Gen. Interface 373

| ○○○ | | Tab 1 x | Tab 2 x | Tab 3 x | Tab 4 x | Posts x | ⊕ |

Posts

File  Edit  View  Insert  Format  Data  Tools  Add-ons  Help  Design Create  Design Edit

| | EF | EG | EH | EI | EJ | EK | EL | EM | EN | EO | EP |
|---|---|---|---|---|---|---|---|---|---|---|---|
| 1 | Color Palette | | | | | | | | | | Document Editing |
| 2 | Color Palette ID | 1 | 2 | 3 | 4 | 5 | 6 | Document Title | Create Design Link (auto) | Create Design Link (auto) | Edit Design Link (auto) |
| 3 | Berry Blues | #4e1a3d | #ffffff | #05e0e9 | #ff2768 | #fc4d4 | #ffffff | MY NEW TEMPLATE | PAGE ONE | Create your design | Update your design |
| 4 | The Deep Blue | #000000 | #4f6fc | #233dff | #233dff | #000000 | #4f6fc | MY NEW TEMPLATE | PAGE ONE | Create your design | Update your design |
| 5 | In the Blue | #00a8a8 | #0c6980 | #ffffff | #c0f0f7 | #1f628e | #00a8a8 | MY NEW TEMPLATE | PAGE ONE | Create your design | Update your design |
| 6 | Arts and Crafts | #489dff | #9752da | #feffe9 | #08ddb8 | #feffe9 | #0a847e | MY NEW TEMPLATE | PAGE ONE | Create your design | Update your design |
| 7 | | | | | | | | | | | |

Row 3302, Row 3304, Row 3506, Row 3508

*FIG. 37*

| | BD | BE | BF | BG | BH | BI | BJ | BK | BL | BM | BN | BO | BP | BQ | BR | BS | BT | BU |
|---|---|---|---|---|---|---|---|---|---|---|---|---|---|---|---|---|---|---|
| 1 | | | Font Combo | | | | | | | | | | | | | | | |
| 2 | | | Font Combo | Pretitle | | B | i | cap | ls | lh | Title | | | B | i | cap | ls | lh |
| 3 | | | | | | | | | | | | | | | | | | |
| 4 | | | #FC1001 | Josefin Sans | Ymk | B | | AA | 101 | 1170 | Sifonn | gEz-Z | Ymk | | | AA | 12 | 980 |
| 5 | | | #FC1002 | Open Sans | ES_ | B | | AA | 150 | 1230 | Vidaloka | Open Sans | EdRn | | | | 0 | 980 |
| 6 | | | #FC1004 | indifferen | ETiW | B | | AA | 80 | 1020 | Oregano | indifferent | EZP8 | | 1 | | -20 | 930 |
| 7 | | | | | | | | | | | | | | | | | | |

Posts

File  Edit  View  Insert  Format  Data  Tools  Add-ons  Help  Design Create  Design Edit URL Gen. Interface 373

Row 3302
Row 3304
Row 3506
Row 3508

SYSTEMS AND METHODS OF GENERATING OR UPDATING A DESIGN BASED ON A UNIVERSAL RESOURCE LOCATOR (URL)

BACKGROUND

There is a proliferation of design tools with graphical interfaces to generate designs.

Typically, a user selects a template and manually adds or updates individual design elements. The user can use another template, different design elements, or a combination thereof, to generate another design. Manually adding user content to multiple templates for comparison can be repetitive and time-consuming.

BRIEF DESCRIPTION OF THE DRAWINGS

FIG. 14 illustrates a particular example of a URL generation interface that may be generated by the system of FIG. 3;

FIG. 17 illustrates a particular example of a URL generation interface that may be generated by the system of FIG. 3;

FIG. 26 illustrates a particular example of a URL generation interface that may be generated by the system of FIG. 3;

FIG. 29 illustrates a particular example of a URL generation interface that may be generated by the system of FIG. 3;

FIG. 33 illustrates a particular example of a URL generation interface that may be generated by the system of FIG. 3;

FIG. 34 illustrates a particular example of a URL generation interface that may be generated by the system of FIG. 3;

FIG. 35 illustrates a particular example of a URL generation interface that may be generated by the system of FIG. 3;

FIG. 37 illustrates a particular example of a URL generation interface that may be generated by the system of FIG. 3;

FIG. 39 illustrates a particular example of a URL generation interface that may be generated by the system of FIG. 3;

FIG. 41 illustrates a particular example of a URL generation interface that may be generated by the system of FIG. 3;

DETAILED DESCRIPTION

Figure 1:
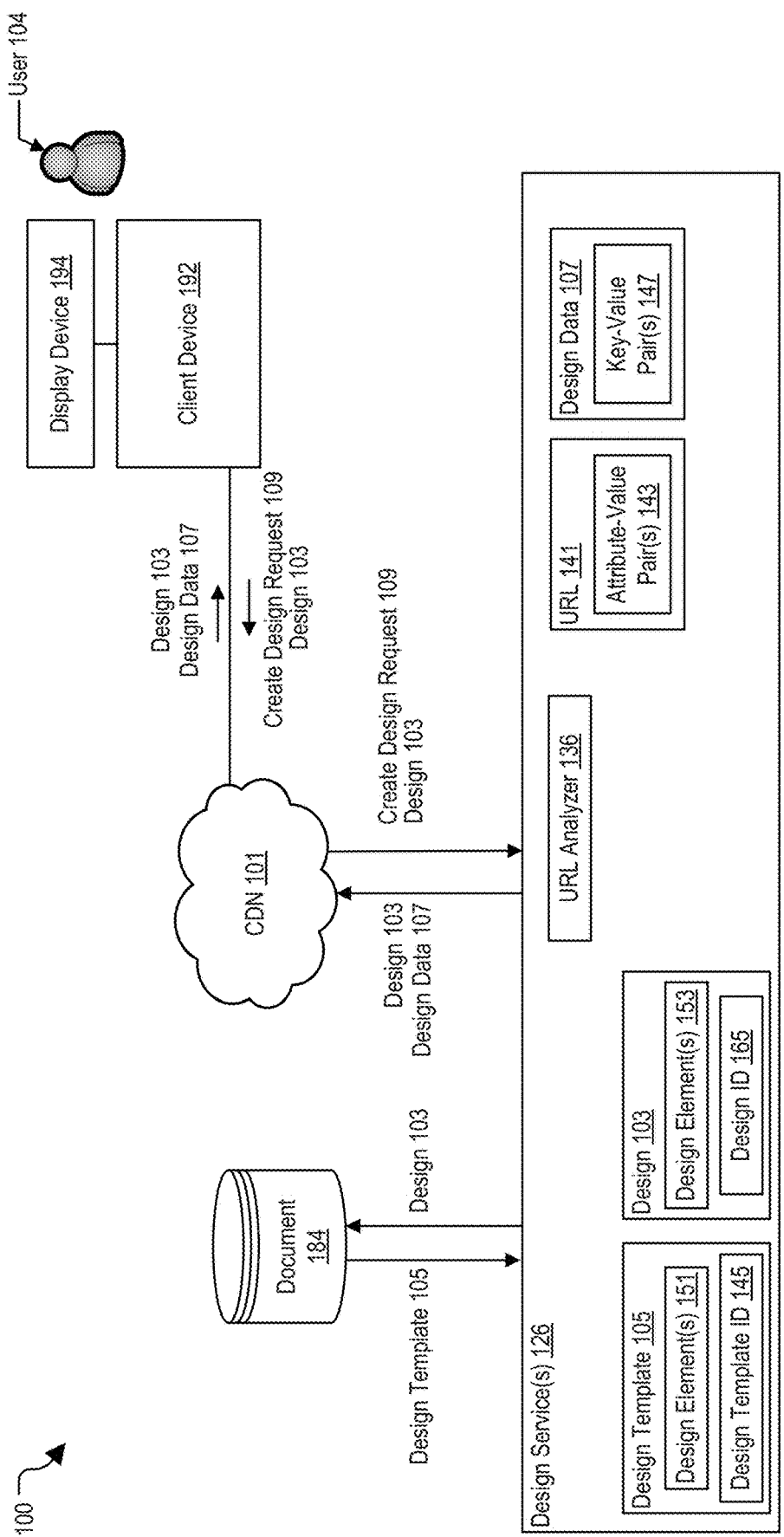
FIG. 1 illustrates a particular example of a system that is operable to generate a design based on a universal resource locator (URL)

Design templates are a popular way to generate graphic designs, e.g., for websites, brochures, invitations, etc. In accordance with particular aspects of the present disclosure, a universal resource locator (URL) indicates a design template that is to be used to generate a design. In some examples, the URL also indicates one or more additional attributes and corresponding attribute values that are to be used to update the design. To illustrate, the URL indicates that a title attribute has a particular value ("Welcome to First Grade Sue!").

A URL analyzer receives a URL from a client device. The URL analyzer, in response to determining that the URL indicates the design template, generates a design based on the design template. As used herein, a "design" includes one or more design elements and format information (e.g., color information, font type, font size, etc.). A "design element" includes image content (e.g., in vector format or pixel format), text content, etc.

The URL analyzer generates design data by parsing the URL. For example, the design data includes a key-value pair, with a key associated with the title attribute and a value based on the particular value (e.g., "Welcome to First Grade Sue!"). The URL analyzer sends the design and the design data to the client device to cause display at the client device of an updated version of the design by applying the design data to the design. For example, a browser at the client device renders the updated version by applying the design data to the design. A user of the client device can view the updated version and may choose to save the updated version. The URL analyzer, in response to receiving the updated version from the client device, stores the updated version of the design in data storage. In a particular example, the URL analyzer, in response to receiving the updated version from the client device, replaces the design stored in the data storage with the updated version of the design.

In a particular example, the URL analyzer receives multiple URLs from the client device and generates multiple designs and corresponding design data based on the multiple URLs. For example, a first URL indicates a first title attribute value (e.g., "Welcome to First Grade Sue!") and a second URL indicates a second title attribute value (e.g., "Welcome to First Grade Enaya!"). The URL analyzer generates a first design with a first title (e.g., "Welcome to First Grade Sue!") based on the first title attribute and a second design with a second title (e.g., "Welcome to First Grade Enaya!") based on the second title attribute. The URL analyzer sends the multiple designs and corresponding design data to the client device to cause display of updated versions of the multiple designs based on the corresponding data. The user can compare the updated versions and select one or more of the updated versions to be stored as designs in the data storage. The URL analyzer can thus automatically generate, for review and storage, one or more designs based on corresponding URL(s).

It will be appreciated that automatically generating the design based on the design template indicated in the URL and automatically updating the generated design based on the URL, as described herein, may enable faster design processes. In a particular example, the user can create multiple copies of the URL, edit selected attribute values of the URL copies, and use the edited URLs to generate multiple designs. In another example, an interface generator provides a URL generation interface and the user can update fields of the URL generation interface to generate multiple URLs. The user can generate multiple designs without having to repetitively perform the same edits that are common to each design. While some users may prefer generating or updating designs using a graphical user interface, other users may prefer the smaller memory footprint and manageability of using text-based URLs for generating or updating designs. Text-based URLs can also be easier to communicate over text messaging, e-mail, social networks, etc., as compared to a two-dimensional or three-dimensional graphical design. Text-based URLs are also easier to programmatically manage and manipulate using macros or scripts. Having the client device generate the updated version of the design (as compared to a server-side component) may reduce server-side resource utilization (e.g., memory, processing cycles, or both) of the URL analyzer. In a particular aspect, font measuring and positioning libraries of a browser at the client device are used in generating the updated version of the design. In this aspect, generating the updated version of the design at the client device enables "collision detection", such as when text fields get too long or words have to be hyphenated. In some implementations, generating the updated version of the design at the client device enables automatic resizing of text boxes when collisions are detected and enables automatic reflow of text. Additional illustrative, non-limiting advantages of the present disclosure are described herein.

In the following description, certain aspects of the present disclosure are described in conjunction with a graphic design website that enables users to create designs using web application(s) or other Software-as-a-service (SaaS) components. Examples of graphic designs include, but are not limited to, social media posts or headers, presentations, letterheads, magazine templates, certificates, resumes, flyers, book/album covers or art, infographics, flyers, posters, menus, business cards, brochures, logos, greeting cards, postcards, invitations, collages, announcements, blog graphics, Internet advertisements, videos, animations, etc. In some examples, the graphic design website can be accessed by using Internet browsers and/or an application installed on a mobile device, such as a mobile phone or tablet. Unless specified otherwise, reference to the "graphic design website" herein includes the graphic design web application(s)/SaaS component(s) accessible via the graphic design website. Use of the graphic design website to create designs may be faster and/or more convenient than using a standalone downloaded/purchased software program. However, it is to be understood that the description of website-based aspects herein is for illustration only and is not to be considered limiting. In alternative implementations, the techniques of the present disclosure may be applied in the context of a standalone computer application executed on a desktop computer, a laptop computer, a mobile device, etc. A "user" can refer to an internal user or an external user of the graphic design website. For example, an internal user includes a designer, an employee, a software engineer, or another person that manages or designs the graphic design website. An external user includes a person that is not an internal user, such as someone that accesses the graphic design website to generate designs and does not manage or design the graphic design website. In a particular aspect, one or more operations described herein with reference to a user can be performed by a first user (e.g., an internal user) and one or more operations described herein with reference to the user can be performed by a second user (e.g., an external user).

When a user creates a new design (e.g., a first design) on the graphic design website, the user may start with a blank design or may start from a design template that has a pre-applied layout. As used herein, a "template" includes a default layout of images, text, colors, and/or fonts. For example, a placeholder template includes text elements that are placed on a white background. In a particular aspect, the layout of the text elements is based on a type of the template. For example, an Instagram® (a registered trademark of Instagram LLC, Menlo Park, Calif.) post template includes a pre-title text element that includes default pre-title text (e.g., "Tap to add a pre-title (optional)"), a title text element that includes default title text (e.g., "Tap to add text"), and a subtitle text element that includes default subtitle text (e.g., "Tap to add a subtitle (optional)"). As another example, the graphic design website may provide access to several "holiday greeting card" templates, and a user may select one of the templates as a starting point from which to customize their own holiday greeting card by uploading photos of their own family, entering a personalized greeting message, changing the images/text/fonts/colors included in the pre-applied template, etc.

To provide a more comprehensive design experience, the graphic design website may enable the user to search for images, templates, fonts, etc., as described above. To illustrate, the user may enter the search term "dog" to search for stock images of dogs that can be inserted into a design, pre-existing templates featuring images and/or text about dogs, previously stored designs (by that user or by other users) featuring dogs, or any combination thereof. Incorporating a search result image (e.g., a photo of a dog) into a design may be as simple as "dragging-and-dropping" the image into the design, at which point the user may be free to edit the image in terms of size, color, etc. Certain media assets (e.g., images, templates, fonts, etc.) may be free to incorporate into designs while others may be available for a price and may have an associated license (e.g., a one-time-use license) that is enforced by the graphic design website.

The graphic design website may provide a URL generation interface. In a particular example, a user updates one or more fields of the URL generation interface, and selects an option to calculate a create URL. For example, a template field of the URL generation interface indicates a design template. A URL generator generates a URL indicating the design template and attribute-value pairs that are based on field values of the URL generation interface. The graphic design website displays the URL. In a particular example, the user clicks on the URL. A URL analyzer, in response to receiving a request indicating the URL, automatically generates a design based on the design template indicated in the URL and automatically generates design data by parsing the URL. The graphic design website causes display of an updated version of the design by applying the design data to the design.

In a particular example, the user updates a design field of the URL generation interface to indicate a first design, updates one or more additional fields of the URL generation interface, and selects an option to calculate an updated URL. In this example, the URL generator generates a second URL indicating the design and attribute-value pairs that are based on field values of the URL generation interface. The graphic design website displays the second URL. In a particular example, the user clicks on the second URL. The URL analyzer, in response to receiving a request indicating the second URL, retrieves the design indicated in the second URL and generates second design data by parsing the second URL. The graphic design web site causes display of a second updated version of the design by applying the second design data to the design. In a particular example, the user selects a particular updated version of the design and the graphic design website stores the selected updated version as a "chosen" design in data storage.

An illustrative example of a system that supports operation of such a graphic design website and that is operable to generate a design based on a URL is shown in FIG. 1 and is generally designated 100. The system 100 includes a client device 192 that is communicably coupled, via a content delivery network (CDN) 101, to a computing environment (e.g., a network-accessible cloud computing environment). For example, the client device 192 is communicatively coupled to one or more design service(s) 126 of the computing environment. In a particular aspect, the design service (s) 126 correspond to one or more services or components described with reference to FIG. 45, one or more additional services or components, or a combination thereof. Although FIG. 1 shows a CDN 101, it is to be understood that in alternative aspects devices shown in FIG. 1 may communicate using one or more networks (or portions thereof) that include but are not limited to CDN(s), private network(s), cellular network(s), the Internet, etc. The client device 192 is configured to be operated by a user 104. As further described herein, the system 100 may enable the user 104 to quickly and easily create and edit various forms of graphic designs and other visual media works, even if the user 104 is not a trained graphic designer or other visual arts professional. In some examples, the computing environment includes one or more servers and/or one or more databases, data stores, and/or data storage devices. For example, the computing environment includes a document database 184. The computing environment may include additional databases, such as a media database, an export database, or both. The computing environment may include one or more load balancers, as further described with reference to FIG. 45.

In particular aspects, the client device 192 corresponds to a desktop computer, a laptop computer, a mobile phone, a tablet, or other computing device configured to access websites via the Internet. The client device 192 may include (or may be connected to) one or more input devices (e.g., a keyboard, a mouse, a touchscreen, etc.) and one or more output devices (e.g., a monitor, a touchscreen, audio speakers, a headphone connection, etc.). In a particular aspect, the client device 192 is coupled to a display device 194.

In particular aspects, the client device 192, the computing environment, the one or more servers, the document database 184, the media database, the export database, the load balancers, or a combination thereof may include one or more processors or processing logic, memories, and/or network interfaces. The memories may include instructions executable by the processors to perform various functions as described herein. The network interfaces may include wired and/or wireless interfaces operable to enable communication to local area networks (LANs) and/or wide area networks (WANs), such as the Internet.

A first server may be configured to execute a web front end. The web front end is configured to serve a graphic design website to requestors. For example, the web front end may send one or more graphical user interfaces to the client device 192 in response to receiving a request from the client device 192. The same or a different (e.g., second) server may be configured to execute the design service(s) 126. The design service(s) 126 may enable core design creation, design updating, and design deletion functionality of the graphic design website. The same or a different (e.g., third) server may be configured to execute an export service. The export service may support graphic design export tasks (e.g., publishing a design as a web output).

The load balancers may be configured to send a message to a server requesting instantiation of a particular service. The server may execute a virtual machine including an instance of the particular service. For example, the load balancers may be configured to send a message to the second server to instantiate the design service(s) 126. The second server may, in response to receiving the message, execute a virtual machine including an instance of the design service(s) 126. In a particular aspect, multiple servers may execute instances of the same service. For example, the load balancers may send a second message to a fourth server to instantiate the design service(s) 126. In this example, the third server may execute a first virtual machine executing a first instance of the design service(s) 126 and the fourth server may execute a second virtual machine including a second instance of the design service(s) 126.

Figure 3:
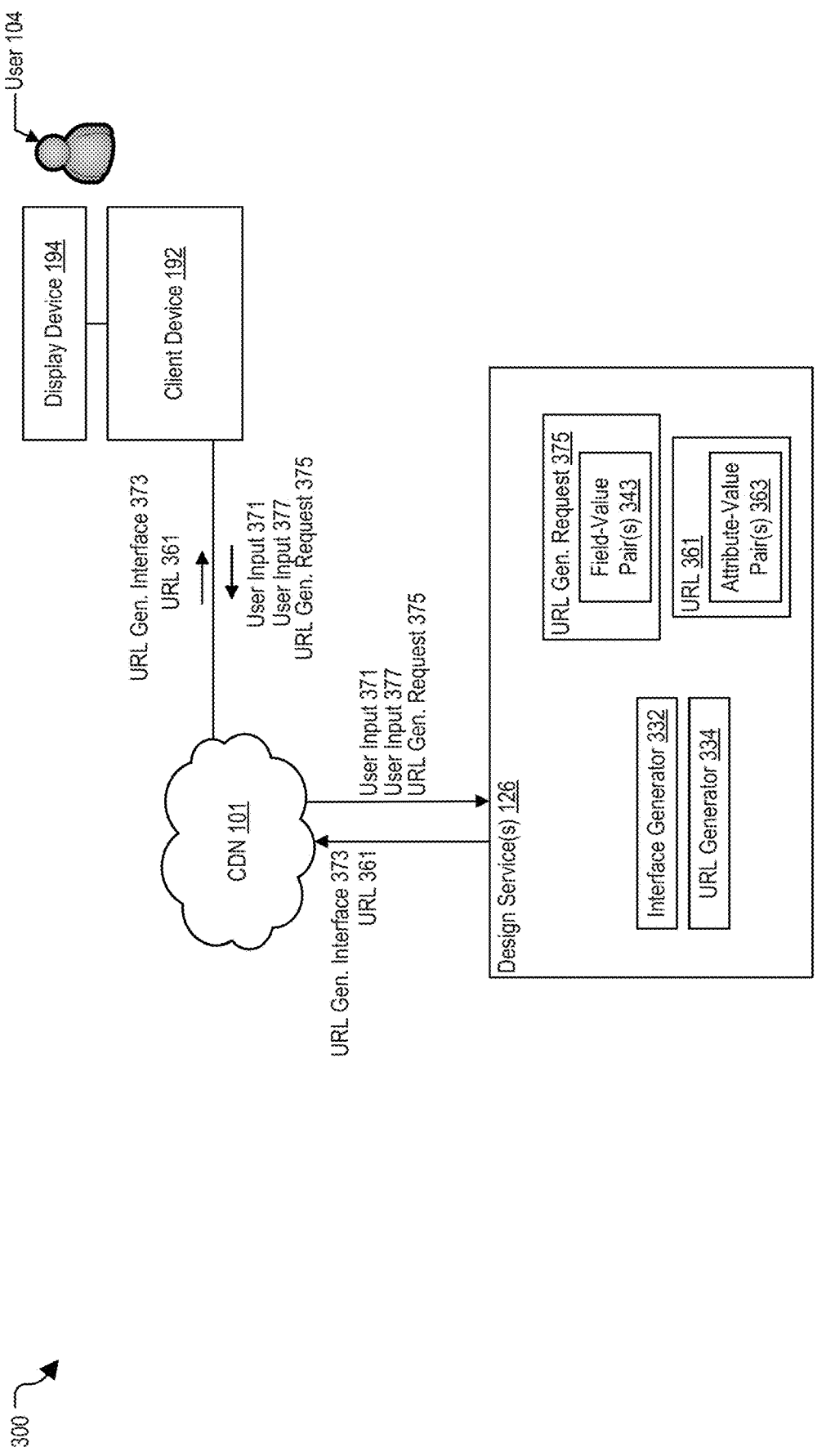
FIG. 3 illustrates a particular example of a system that is operable to generate a URL that can be used to generate or update a design.
Figure 4:
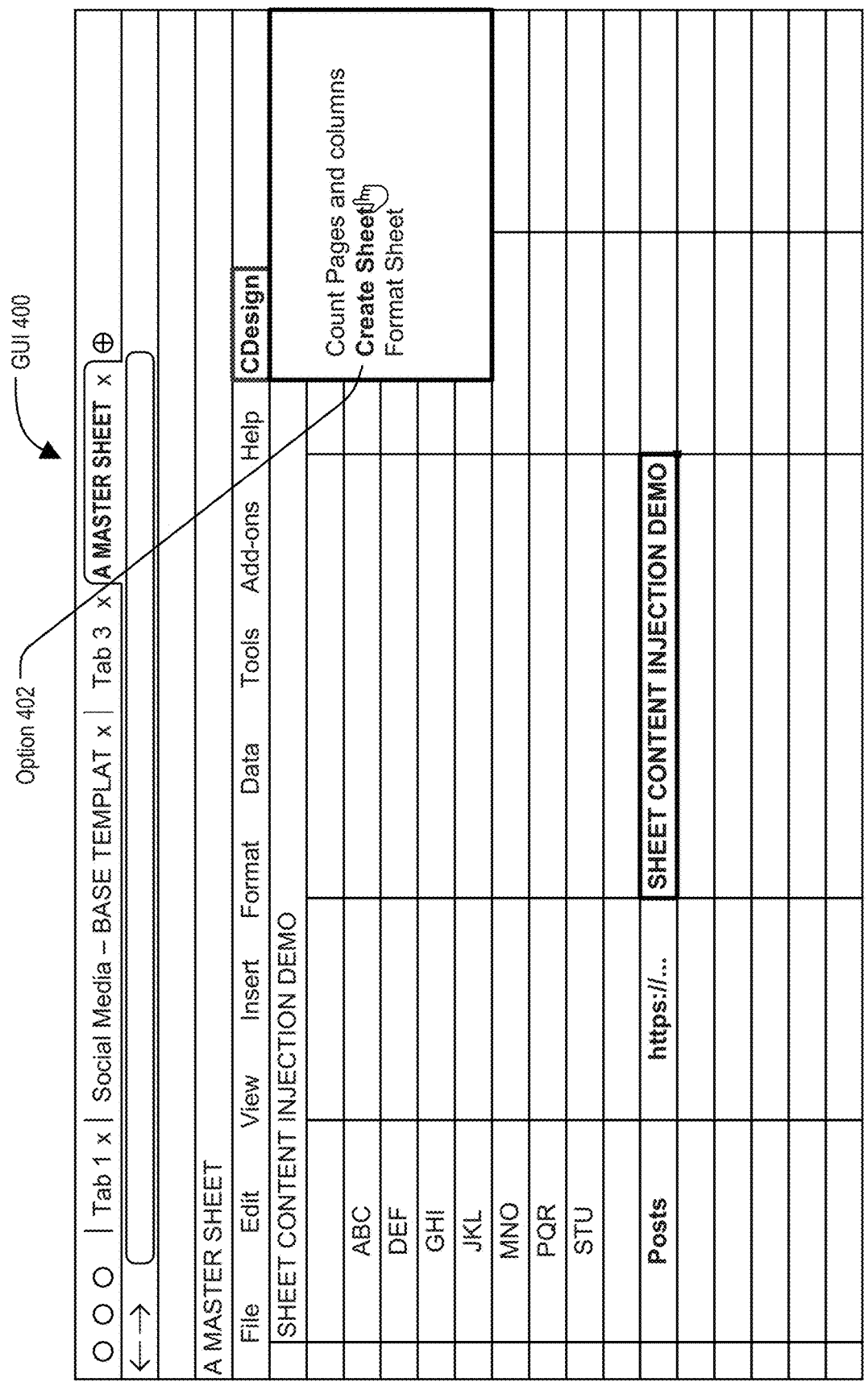
FIG. 4 illustrates a particular example of a user interface that may be generated by the system of FIG. 3.

During operation, the user 104 may operate the client device 192 to access a graphic design website via the computing environment. The graphic design website may enable the user 104 to generate one or more URLs. Turning to FIG. 3, a system is shown and generally designated 300. The system 300 is operable to generate a URL that can be used to create or update a design. In a particular aspect, the system 300 includes one or more components of the system 100 of FIG. 1. In FIG. 3, the design service(s) 126 includes an interface generator 332, a URL generator 334, or both. In a particular example, the user 104 provides a user input 371 to the graphic design website. In the example illustrated in FIG. 4, the web front end may generate a graphical user interface (GUI) 400 of the graphic design website. The user 104 may select an option 402 (e.g., a create sheet option). Returning to FIG. 3, the client device 192, in response to receiving the selection of the option 402, sends user input 371 to the computing environment. The user input 371 indicates that the option 402 is selected.

The interface generator 332, in response to receiving the user input 371, generates a URL generation interface 373 and sends the URL generation interface 373 to the client device 192. In a particular aspect, the web front end performs one or more operations described herein with reference to the interface generator 332. In a particular aspect, the interface generator 332 generates (or updates) the URL generation interface 373 based on multiple user inputs. For example, the interface generator 332 generates the URL generation interface 373 in response to the user input 371 (e.g., a create sheet option selection), formats the URL generation interface 373 in response to a second user input (e.g., a format sheet option selection), initializes the URL generation interface 373 in response to a third user input (e.g., a bootstrap sheet option selection), or a combination thereof. In an alternative aspect, the interface generator 332 generates and updates the URL generation interface 373 in response to a single user input. For example, the interface generator 332, in response to the user input 371, generates the URL generation interface 373, formats the URL generation interface 373, and initializes the URL generation interface 373. In a particular aspect, formatting the URL generation interface 373 includes adding fields to the URL generation interface 373 based on a design type indicated by the user input 371, the second user input, or both. In a particular aspect, initializing the URL generation interface 373 includes setting valid field values for one or more, such as by initializing a dropdown list.

Figure 5:
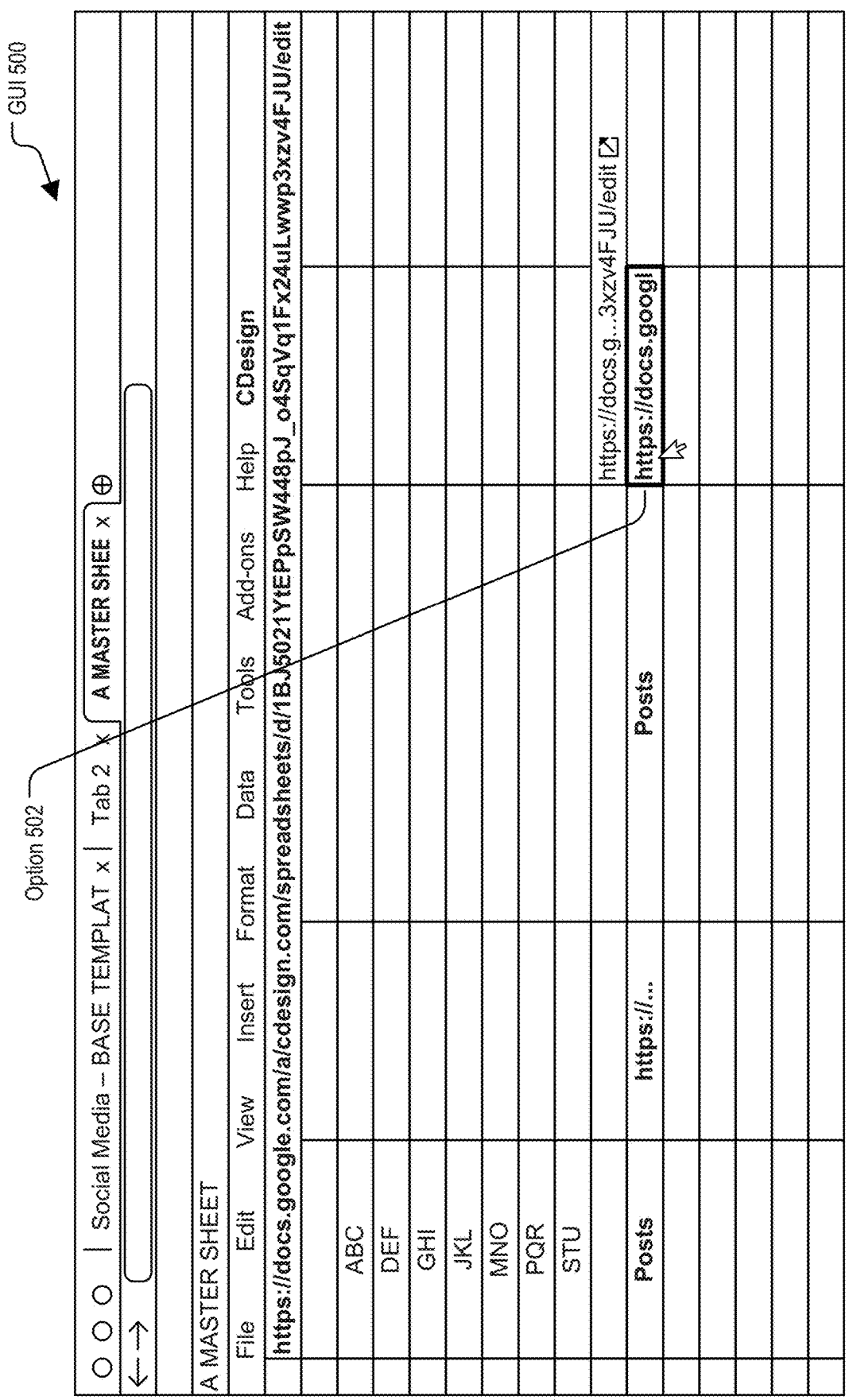
FIG. 5 illustrates a particular example of a user interface that may be generated by the system of FIG. 3.

In FIG. 5, the web front end generates a GUI 500 including an option 502 to display the URL generation interface 373. In a particular aspect, the web front end generates the GUI 500 by updating the GUI 400 to include the option 502. In a particular example, the user 104 selects the option 502. Returning to FIG. 3, the client device 192, in response to receiving the selection of the option 502, sends user input 377 to the computing environment. The user input 377 indicates that the option 502 is selected.

The interface generator 332, in response to receiving the user input 377, generates provides the URL generation interface 373 to the client device 192. FIGS. 6-44 illustrate examples of URL generation and corresponding designs.

Figure 6:
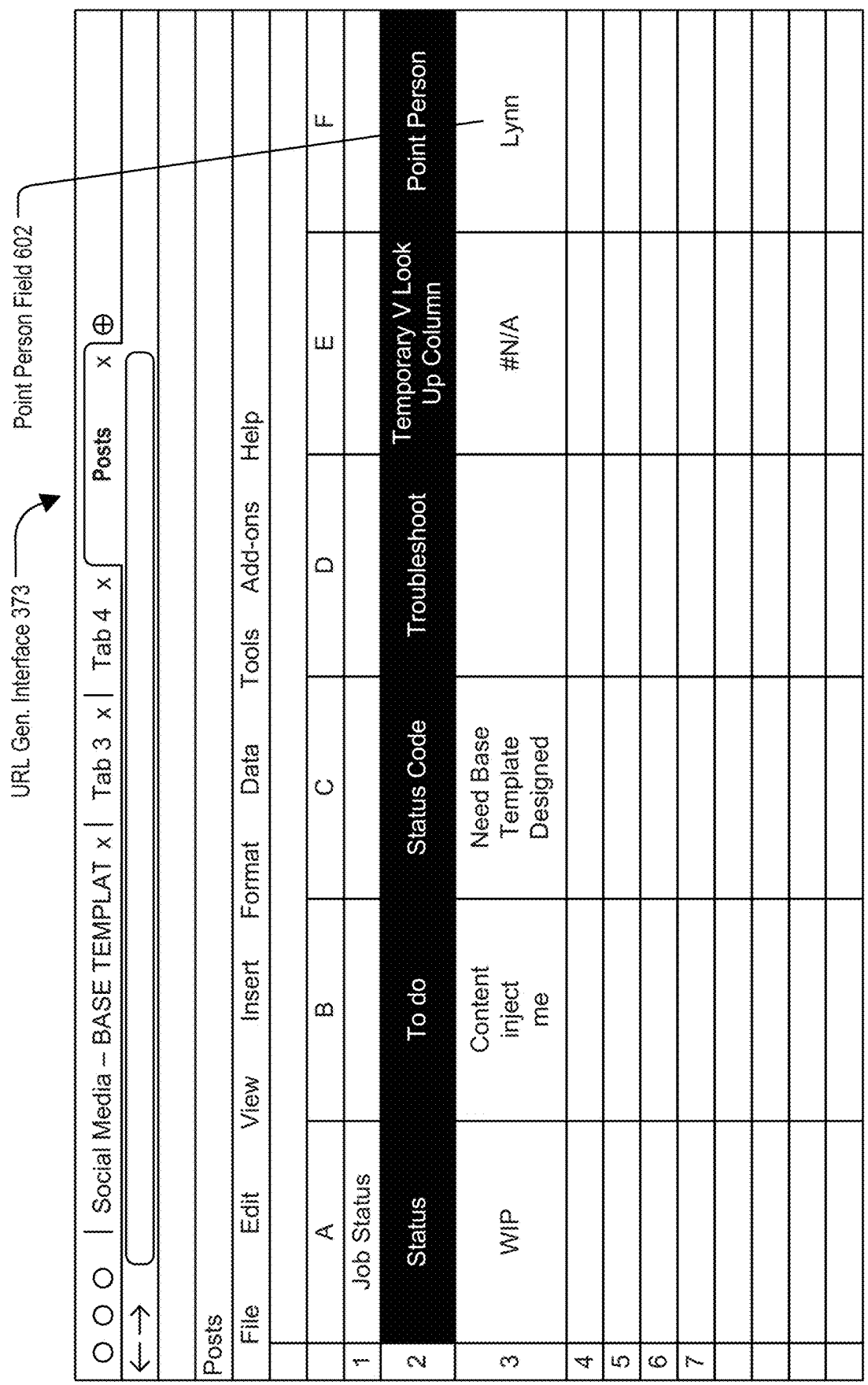
FIG. 6 illustrates a particular example of a URL generation interface that may be generated by the system of FIG. 3.

In the example illustrated in FIG. 6, the URL generation interface 373 includes a plurality of fields. The user 104 can update values of the fields. For example, the user 104 can update a point person field 602 to indicate that a particular person (e.g., "Lynn") is associated with a design to be generated. In the example illustrated in FIG. 6, each row of the URL generation interface 373 corresponds to a single design to be created or updated.

Figure 7:
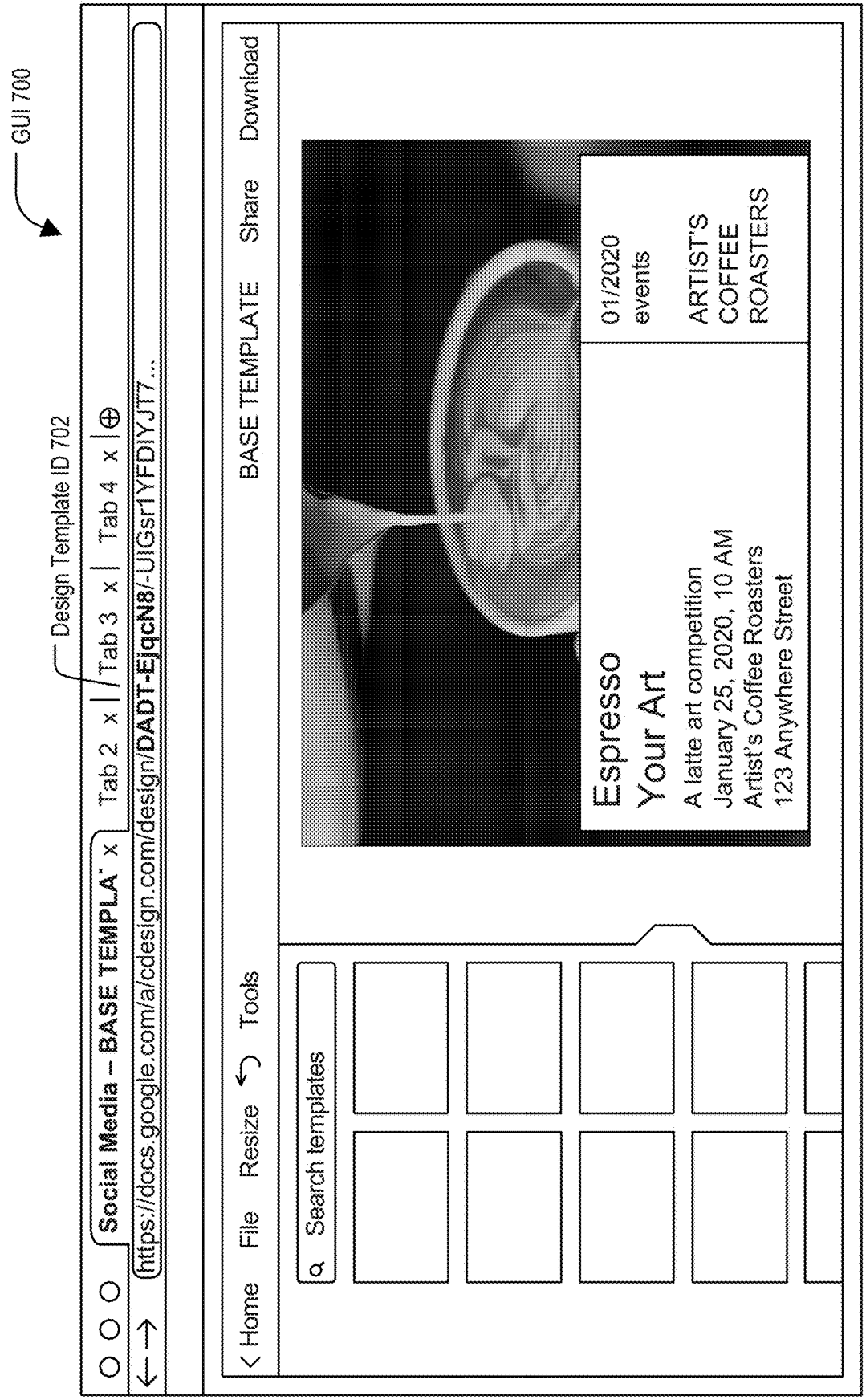
FIG. 7 illustrates a particular example of a user interface that may be generated by the systems of FIGS. 1-3.
Figure 8:
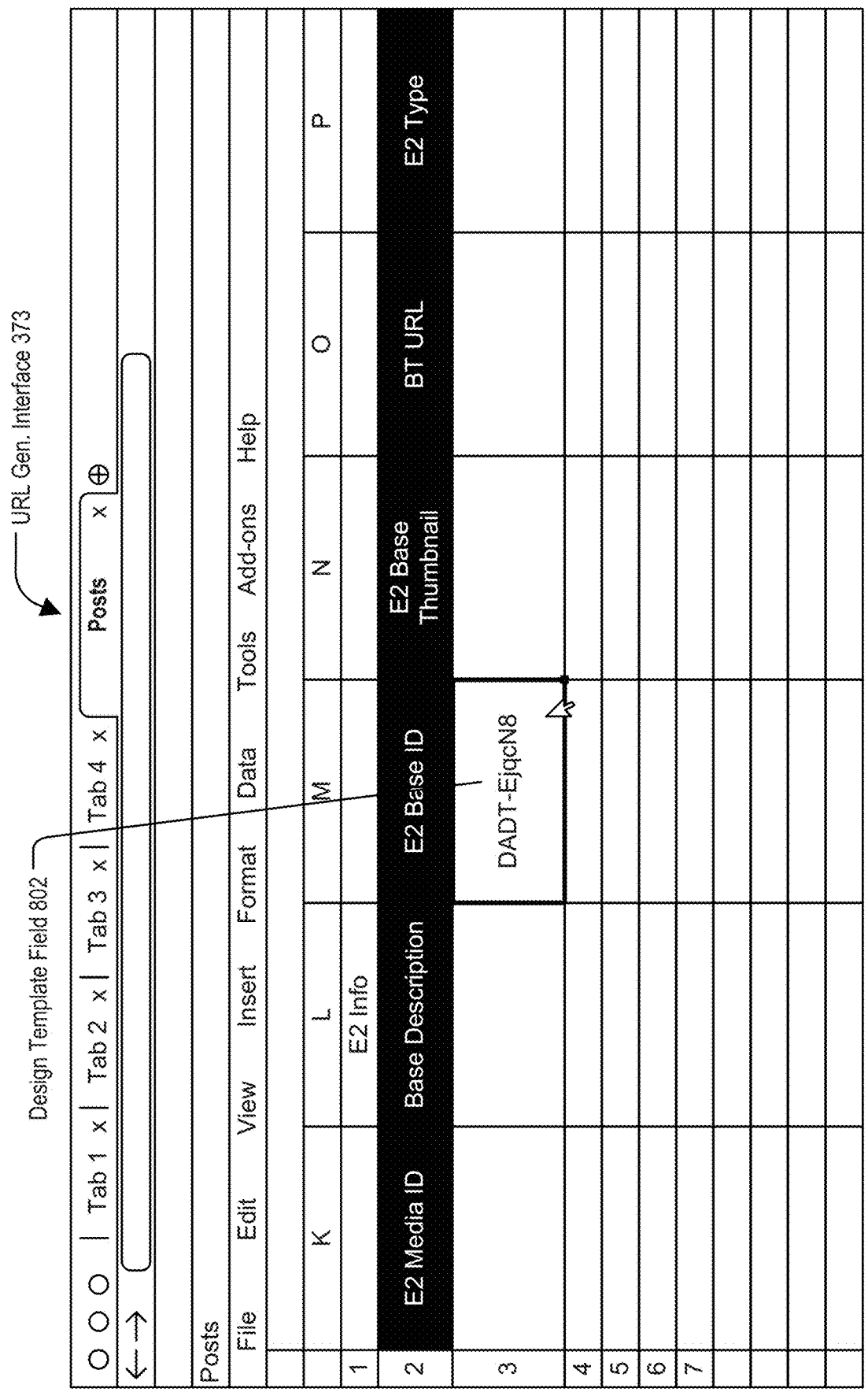
FIG. 8 illustrates a particular example of a URL generation interface that may be generated by the system of FIG. 3.

Turning to the example of FIG. 7, the user 104 copies a design template identifier 702 (e.g., "DADT-EjqcN8") from a GUI 700 generated by the web front end. In the example illustrated in FIG. 8, the user 104 updates a design template field 802 of the URL generation interface 373 with the design template identifier 702 (e.g., "DADT-EjqcN8").

Figure 9:
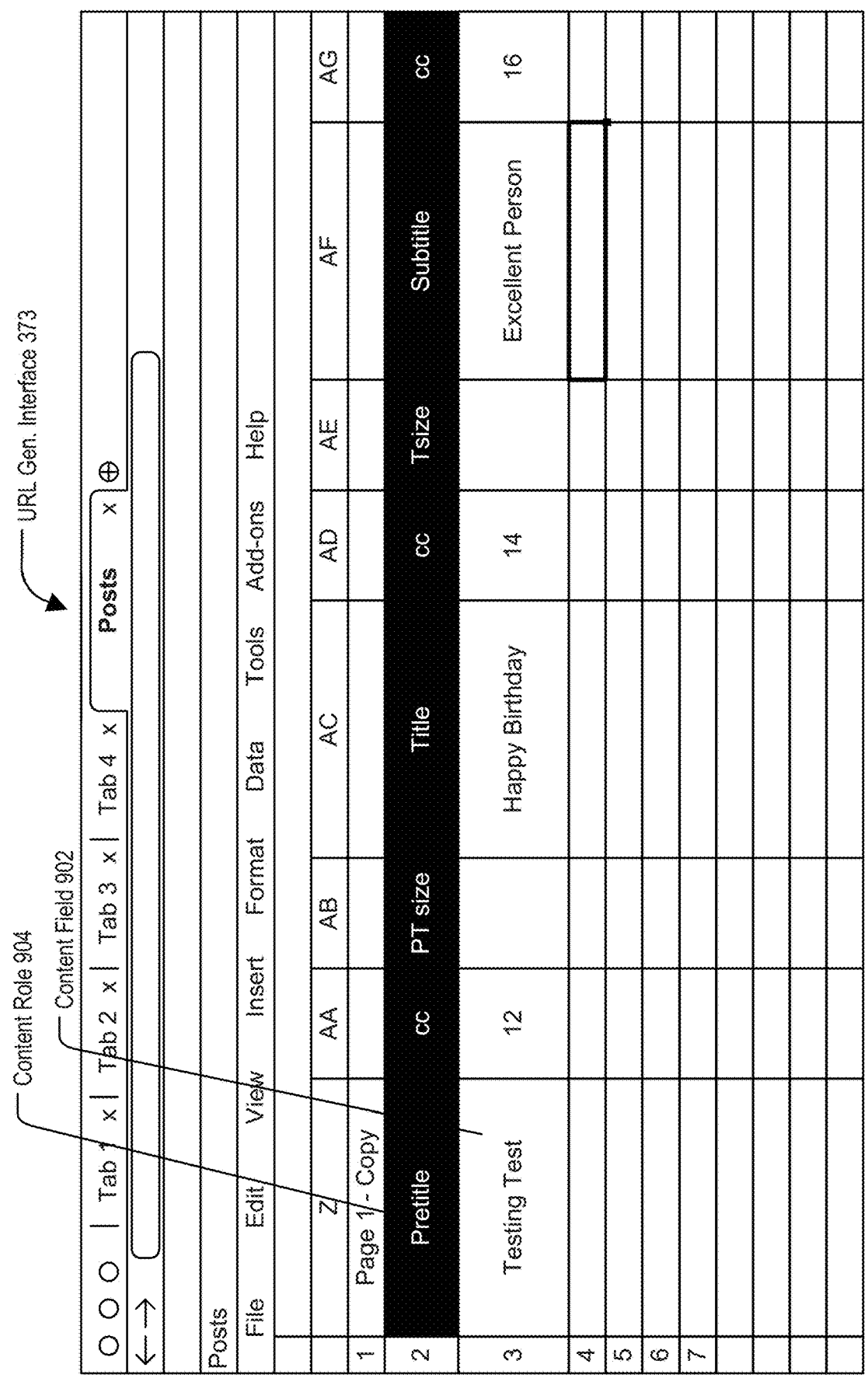
FIG. 9 illustrates a particular example of a URL generation interface that may be generated by the system of FIG. 3.

In the example illustrated in FIG. 9, the user 104 updates a content field 902 of the URL generation interface 373 to indicate particular content (e.g., "Testing Text"). The content field 902 (e.g., a pretitle field) is associated with a content role 904 (e.g., a design element type).

Figure 10:
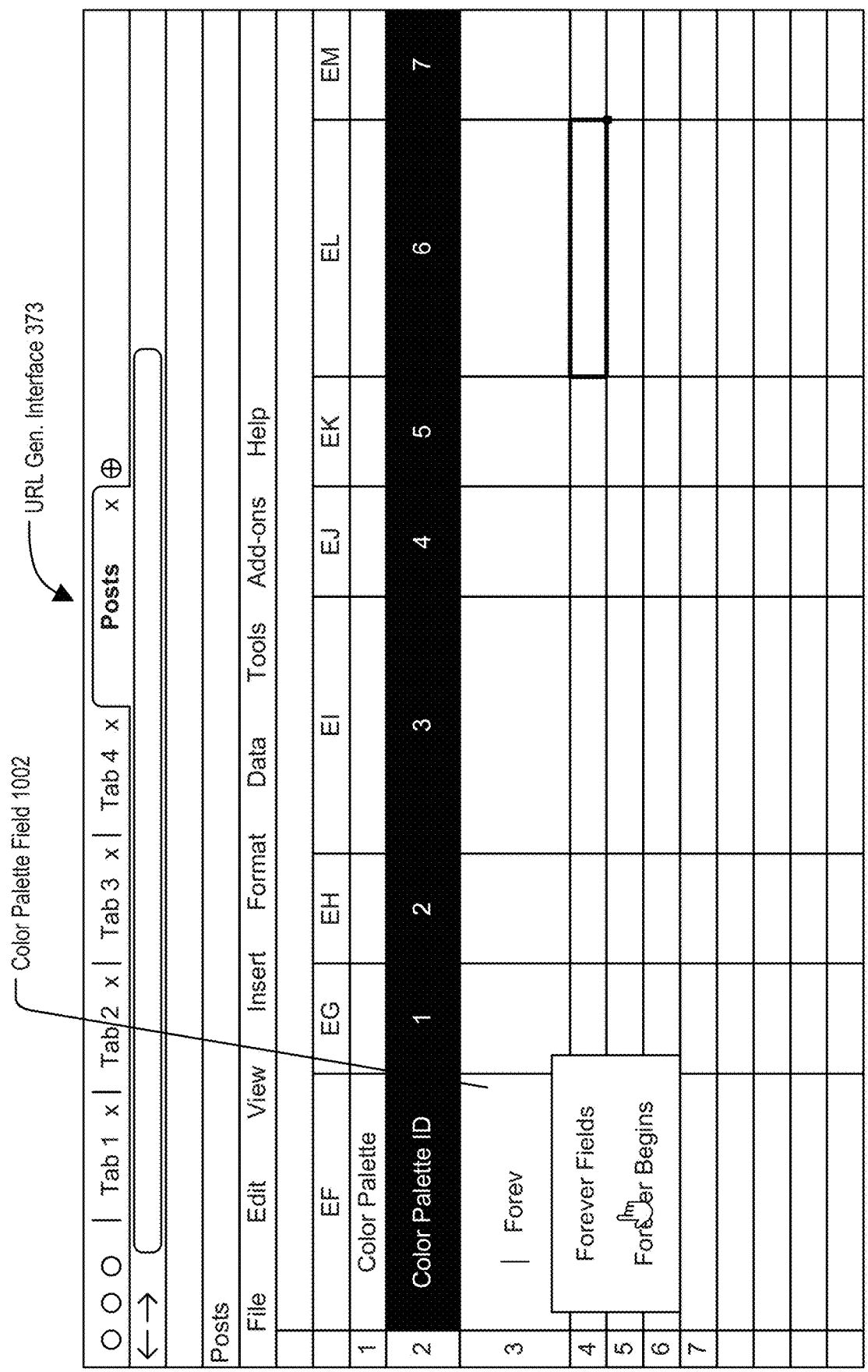
FIG. 10 illustrates a particular example of a URL generation interface that may be generated by the system of FIG. 3.
Figure 11:
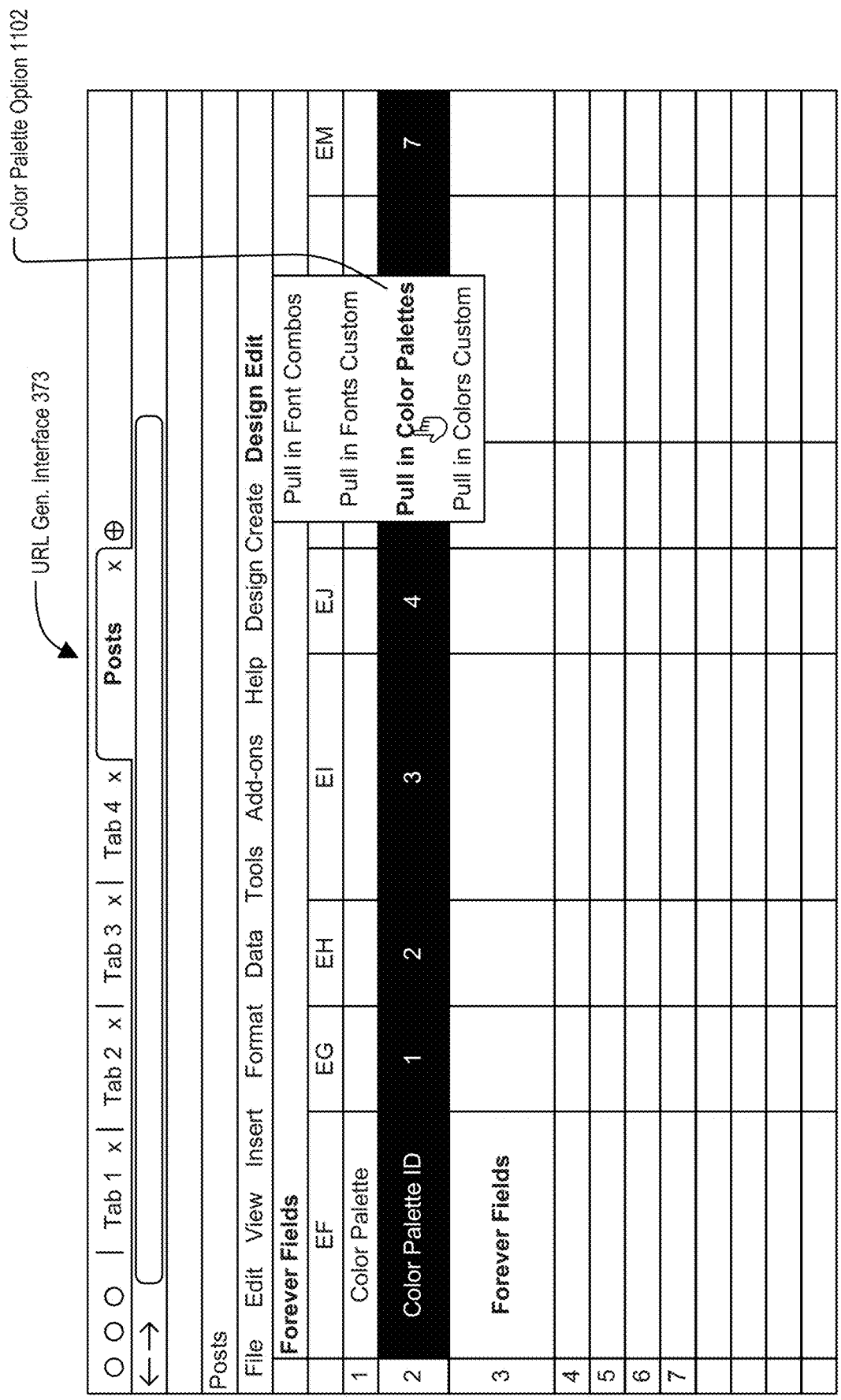
FIG. 11 illustrates a particular example of a URL generation interface that may be generated by the system of FIG. 3.
Figure 12:
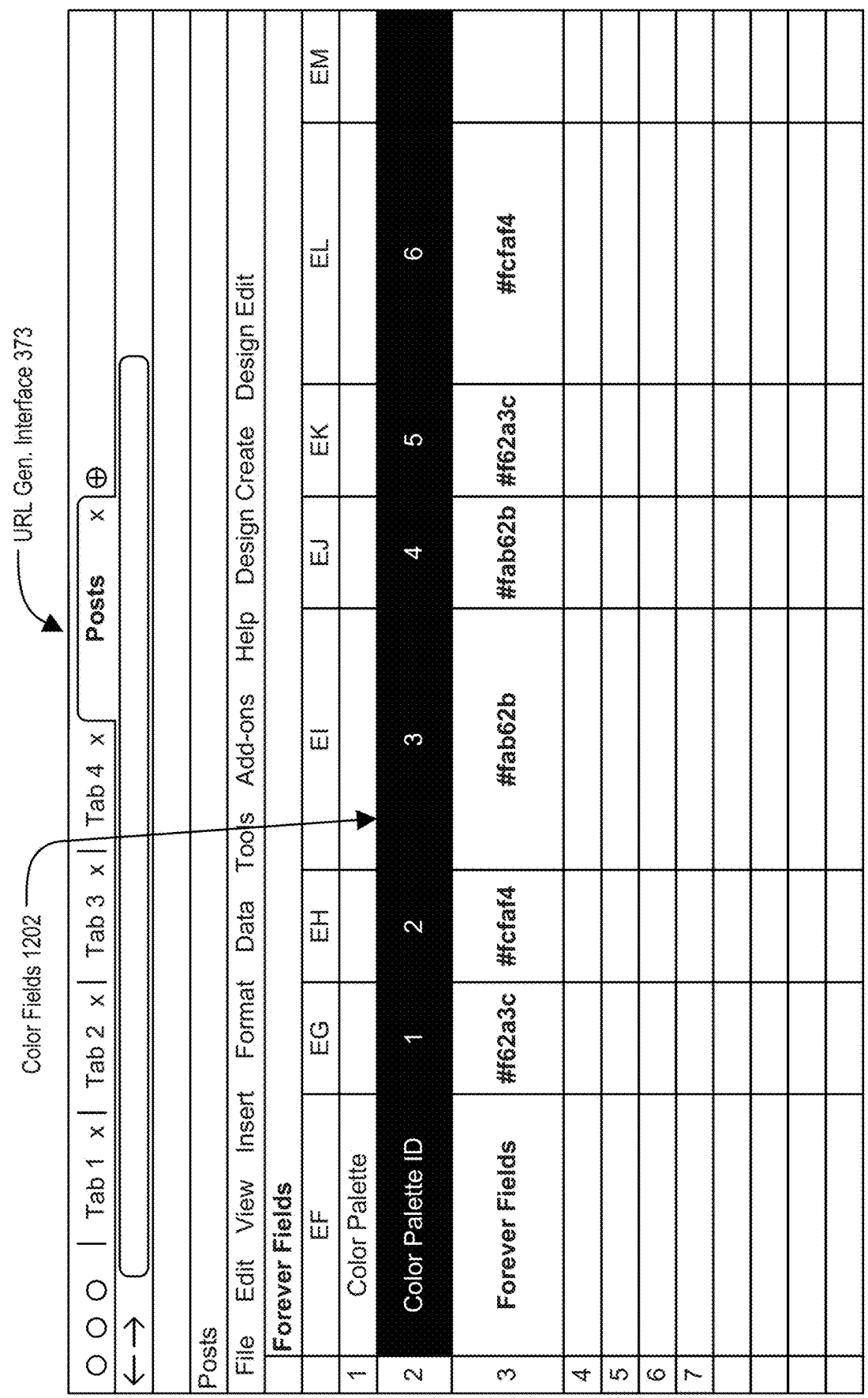
FIG. 12 illustrates a particular example of a URL generation interface that may be generated by the system of FIG. 3.

In the example illustrated in FIG. 10, the user 104 updates a color palette field 1002 to indicate a particular color palette (e.g., "Forever Fields"). In the example illustrated in FIG. 11, the user 104 selects a color palette option 1102 (e.g., "Pull in Color Palettes"). In the example illustrated in FIG. 12, the web front end, in response to receiving the color palette option 1102, populates one or more color fields 1202 of the URL generation interface 373 based on hexadecimal values for the constituent colors of the particular color palette (e.g., "Forever Fields"). In a particular example, the web front end uses a lookup table (e.g., stored in memory and/or a document) to determine hexadecimal values for constituent colors of color palettes. In a particular example, a location of the lookup table is specified during initialization of the URL generation interface 373.

Figure 13:
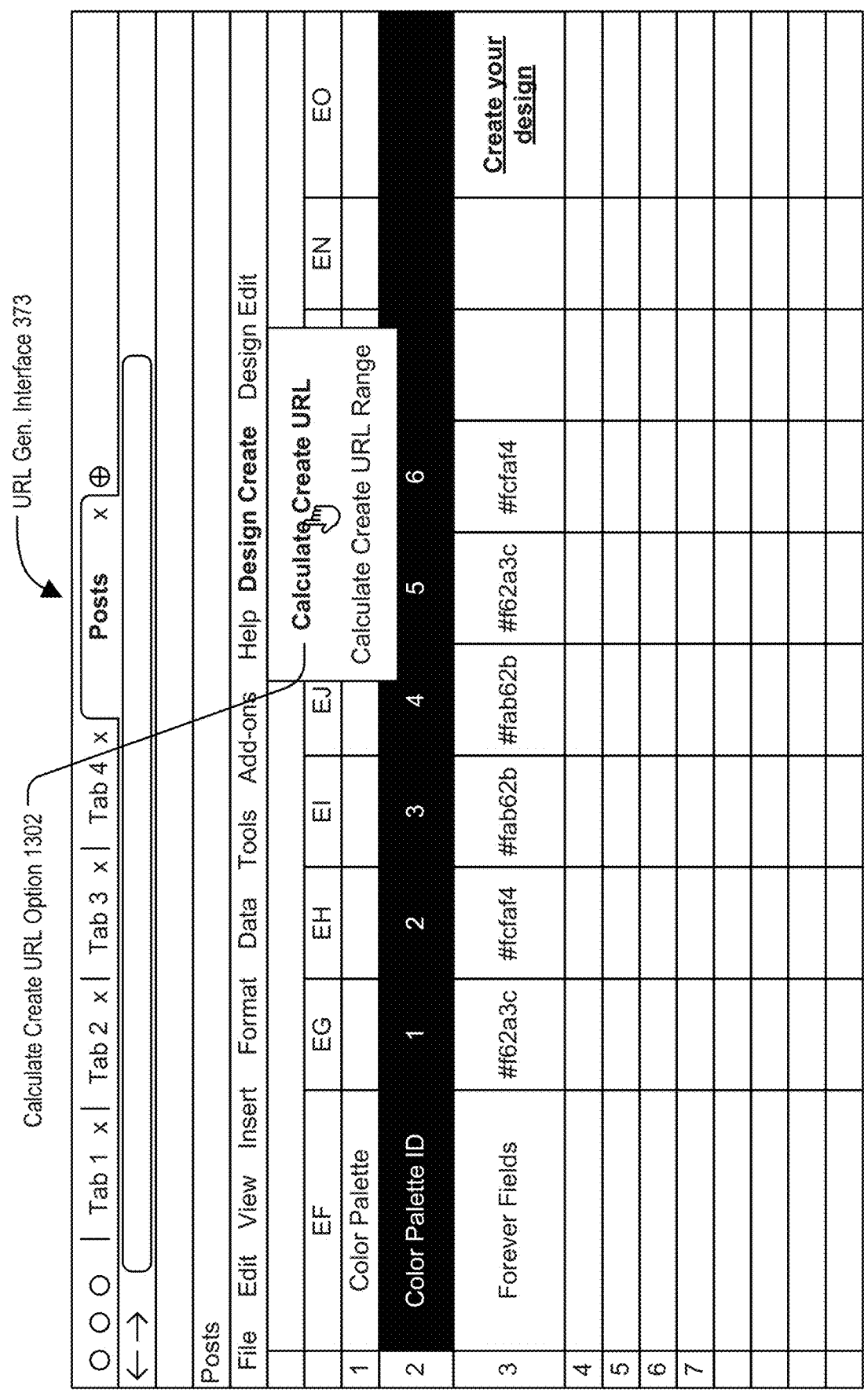
FIG. 13 illustrates a particular example of a URL generation interface that may be generated by the system of FIG. 3.

In the example illustrated in FIG. 13, the user 104 selects a calculate create URL option 1302 of the URL generation interface 373. Returning to FIG. 3, the client device 192, in response to a selection of the calculate create URL option 1302, sends a URL generation request 375 to the computing environment. The URL generator 334 receives the URL generation request 375. In a particular implementation, the URL generator 334 is included in the client device 192 and the URL generation request 375 is received by the URL generator 334 of the client device 192. The URL generation request 375 includes one or more field-value pair(s) 343. The field-value pair(s) 343 indicates fields of the URL generation interface 373 and corresponding field values of the URL generation interface 373. For example, a first field-value pair 343 indicates that the point person field 602 has a first field value indicating a particular person (e.g., "Lynn"), a second field-value pair 343 indicates that the design template field 802 has a second field value indicating the design template identifier 702 (e.g., "DADT-EjqcN8"), a third field-value pair 343 indicates that the content field 902 (e.g., the pretitle field) has a third field value indicating particular content (e.g., "Testing Text"), a fourth field-value pair 343 indicates that the color palette field 1002 has a fourth field value indicating the particular color palette (e.g., "Forever Fields"), fifth field-value pairs 343 indicating that color fields 1202 have fifth field values, or a combination thereof.

The URL generator 334, in response to receiving the URL generation request 375, generates a URL 361 based on the field-value pair(s) 343. For example, the URL generator 334 generates the URL 361 to include one or more attribute-value pair(s) 363 that are based on the field-value pair(s) 343. To illustrate, the URL generator 334 generates attribute-value pairs 363 indicating that Lynn is the point person, the design template is "DADT-EjqcN8", the pretitle is "Testing Text", the color palette is "Forever Fields", and the palette colors.

In a particular aspect, the URL generator 334, in response to determining that a field-value pair 343 indicates the design template identifier "DADT-EjqcN8", generates at least a portion of the URL 361 (e.g., "http://www.cdesign-.com/design/DADT-EjqcN8/remix?"). In a particular aspect, the URL generator 334 updates the URL 361 to indicate the attribute-value pair(s) 363. For example, the URL generator 334 updates the URL 361 by adding a portion (e.g., "set.page.1.elements.pretitle.text=Testing %20Text") to the URL 361 that is based on the third attribute (e.g., "set.page.1.elements.pretitle.text") and the third attribute value (e.g., "Testing %20Text").

The URL generator 334 sends the URL 361 to the client device 192. In the example illustrated in FIG. 14, the website front end updates the URL generation interface 373 to include an option 1402 (e.g., a hyperlink) that is based on the URL 361. In a particular aspect, the user 104 selects the option 1402.

Returning to FIG. 1, the client device 192, in response to receiving the selection of the option 1402, sends a create design request 109 to the computing environment. The create design request 109 indicates a URL 141. The URL 141 indicates a design template identifier 145, one or more attribute-value pairs 143, or a combination thereof. In a particular aspect, the URL 141 corresponds to the URL 361 of FIG. 3. In this aspect, the design template identifier 145 corresponds to the design template identifier 702 (e.g., "DADT-EjqcN8") of FIG. 7, the attribute-value pair(s) 143 correspond to the attribute-value pair(s) 363 of FIG. 3, or a combination thereof.

The URL analyzer 136, in response to receiving the create design request 109 and determining that the URL 141 indicates the design template identifier 145 (e.g., "DADT-EjqcN8"), retrieves a design template 105 having the design template identifier 145 (e.g., "DADT-EjqcN8") from the document database 184. The design template 105 includes one or more design elements 151. The URL analyzer 136 generates a design 103 based on the design template 105. For example, the URL analyzer 136, in response to determining that the design template 105 includes a design element 151, adds a corresponding design element 153 to the design 103 and transfers content from the design element 151 to the design element 153. In a particular aspect, the URL analyzer 136 copies text, an address (e.g., a link) of an image, and/or format information from the design template 105 to the design 103. The design 103 has a design identifier 165 (e.g., "DADT-8fr_IM"). In a particular aspect, the design identifier 165 (e.g., "DADT-8fr_IM") of the design 103 includes a portion (e.g., "DADT") of the design template identifier 145 (e.g., "DADT-EjqcN8") of design template 105.

The URL analyzer 136 generates design data 107 by parsing the URL 141. For example, the URL analyzer 136 generates one or more key-value pair(s) 147 based on the attribute-value pair(s) 143. For example, the URL analyzer 136 generates a key-value pair 147 with a key (e.g., "pretitle") associated with an attribute (e.g., "set.page.1.elements.pretitle.text") of a particular attribute-value pair 143 and a key value (e.g., "Testing Text") based on an attribute value (e.g., "Testing %20Text") of the particular attribute-value pair 143. In a particular aspect, the key indicates a content role (e.g., a design element type). As another example, the URL analyzer 136 generates a key-value pair 147 with a key (e.g., "palette") associated with an attribute (e.g., "set.palette") of a particular attribute-value pair 143 and a key value (e.g., "%23f62a3c!%23fcfaf4!%23fab62b!%23fab62b!%23f62a3c!%23fcfaf4") based on an attribute value of the particular attribute-value pair 143. The URL analyzer 136 sends the design 103 and the design data 107 to the client device 192.

Figure 15:
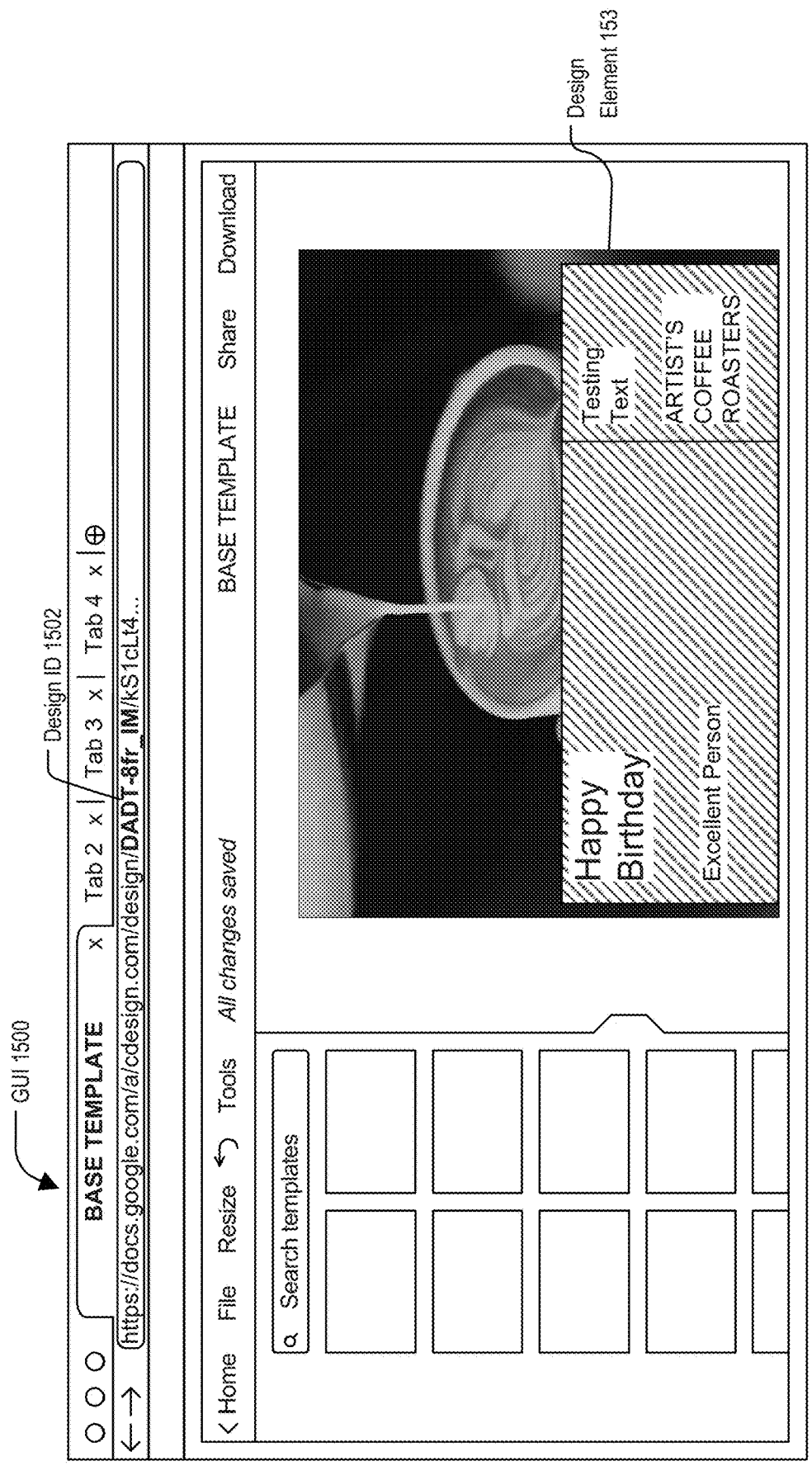
FIG. 15 illustrates a particular example of a user interface that may be generated by the systems of FIGS. 1-3.
Figure 16:
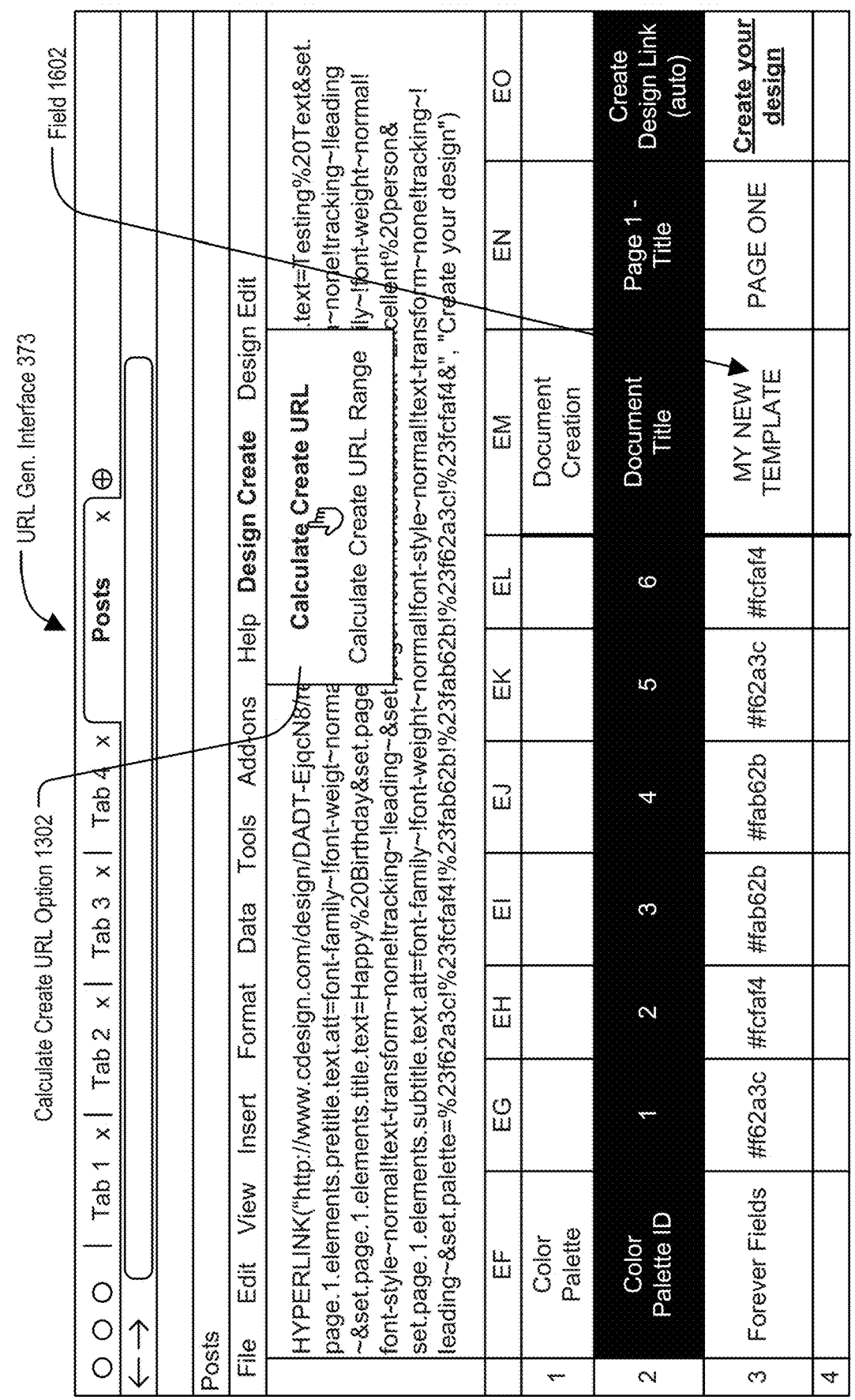
FIG. 16 illustrates a particular example of a URL generation interface that may be generated by the system of FIG. 3.

In the example illustrated in FIG. 15, the web front end generates a GUI 1500 displaying an updated version of the design 103. In FIG. 15, the displayed design has a design identifier 1502. The design identifier 1502 corresponds to the design identifier 165 (e.g., "DADT-8fr_IM") of FIG. 1. In a particular example, the client device 192, in response to receiving the design 103 and the design data 107, displays an updated version of the design 103 by applying the design data 107 to the design 103. Returning to FIG. 1, the client device 192, in response to determining that a key-value pair 147 of the design data 107 indicates a content role (e.g., pretitle), determines whether the design 103 includes any design element having the content role. The client device 192, in response to determining that a particular design element 153 of the design 103 has the content role, updates the particular design element 153 based on a key value (e.g., "Testing Text") of the key-value pair 147. Alternatively, the client device 192, in response to determining that the design 103 does not include any design element having the content role, adds a particular design element 153 having the content role to the design 103 and updates (or initializes) the particular design element 153 based on the key value (e.g., "%23f62a3c!%23fcfaf4!%23fab62b!%23fab62b!%23f62a3c!%23fcfaf4") of the key-value pair 147. In FIG. 15, a diagonal line fill is used to represent a particular color that is indicated by a hex value (e.g., "f62a3c") in the key value.

In a particular aspect, the client device 192 updates a color palette of the design 103 based on the design data 107. For example, the client device 192, in response to determining that a key-value pair 147 of the design data 107 includes a color palette key (e.g., "palette"), updates a color palette of the design 103 based on a key value of the key-value pair 147. The client device 192 provides the updated version of the design 103 to the display device 194 for display.

In a particular aspect, the graphic design website may enable the user to view or modify the design 103 (which may be persisted to the document database) using web application(s) and/or Software-as-a-service components presented by the graphic design website. For example, the user 104 may use the GUI 1500 of FIG. 15 to view or modify the updated version of the design 103. To illustrate, the GUI 1500 may include one or more options to edit the updated version of the design 103. The GUI 1500 may include a display portion that displays the updated version of the design 103. In various aspects, the GUI 1500 may enable at least any graphic design function that is generally found in a standalone graphic design application, although it is to be appreciated that the GUI 1500 may enable other functionality as well.

In a particular aspect, the user 104 selects a save option to save the design 103. The client device 192, in response to receiving the selection of the save option, sends the design 103 (e.g., the updated version or the updated and user modified version of the design 103) to the computing environment. The design service(s) 126 stores the design 103 in the document database 184. For example, the design service(s) 126 stores the updated version or the updated and user modified version as the design 103 in the document database 184.

The graphic design website thus enables the user 104 to use the URL 141 to automatically generate the design 103 based on a template identifier and text input regarding attributes. In a particular aspect, the same URL (e.g., the URL 141) can be used to generate multiple designs. For example, the user 104 can select the option 1402 multiple times to generate multiple designs, each of the multiple designs being generated based on the same URL. In another example, the user can generate multiple URLs having different attributes by changing the text inputs. The user can select the different URLs to generate different designs. The different designs can be open in different browser tabs so the user can easily flip back and forth to compare.

In a particular example, the user 104 views the updated version of the design 103, as illustrated in FIG. 15, and decides to make additional modifications using the URL generation interface 373. In the example illustrated in FIG. 16, the user 104 updates a field 1602 of the URL generation interface 373 to indicate a particular field value (e.g., "MY NEW TEMPLATE") and selects the calculate create URL option 1302.

Returning to FIG. 3, the client device 192, in response to a selection of the calculate create URL option 1302, sends a URL generation request 375 to the computing environment. In a particular example, a particular field-value pair 343 indicates that the field 1602 has the particular field value (e.g., "MY NEW TEMPLATE"), a second field-value pair 343 indicates that the design template field 802 has a second field value indicating the design template identifier 702 (e.g., "DADT-EjqcN8"), one or more additional field-value pairs 343, or a combination thereof.

The URL generator 334, in response to determining that the second field-value pair 343 indicates that the design template field 802 has the second field value indicating the design template identifier 702 (e.g., "DADT-EjqcN8"), generates at least a portion of the URL 361 (e.g., "http://www.cdesign.com/design/DADT-EjqcN8/remix?") based on the second field value. In a particular aspect, the URL generator 334 updates the URL 361 by adding a portion (e.g., "set.title=MY %20NEW %20TEMPLATE") to the URL 361 that indicates a particular attribute (e.g., "set.title") and a particular attribute value (e.g., "MY %20NEW %20TEMPLATE") of a particular attribute-value pair 363. The particular attribute (e.g., "set.title") is associated with the field 1602 indicated by the particular field-value pair 343 and the particular attribute value (e.g., "MY %20NEW %20TEMPLATE") is based on the particular field value (e.g., "MY NEW TEMPLATE"). The URL generator 334 thus generates the URL 361 based on the field-value pairs 343 indicated by the URL generation request 375. In a particular aspect, the URL generation request 375 can be generated programmatically (e.g., using a macro or a script) at the client device 192 to indicate the field-value pairs 343 (e.g., without a user specifying values of fields of the URL generation interface 373).

The URL generator 334 sends the URL 361 to the client device 192. In the example illustrated in FIG. 17, the website front end updates the URL generation interface 373 to include an option 1702 (e.g., a hyperlink) that is based on the URL 361. In a particular aspect, the user 104 selects the option 1702.

Returning to FIG. 1, the client device 192, in response to receiving the selection of the option 1702, sends a create design request 109 to the computing environment. The create design request 109 indicates a URL 141. The URL 141 indicates a design template identifier 145 (e.g., "DADT-EjqcN8"), one or more attribute-value pairs 143, or a combination thereof.

The URL analyzer 136, in response to receiving the create design request 109 and determining that the URL 141 indicates the design template identifier 145 (e.g., "DADT-EjqcN8"), generates a design 103 (e.g., a second design) based on the design template 105 having the design template identifier 145 (e.g., "DADT-EjqcN8"). The design 103 has a design identifier 165 (e.g., "DADT-ykknLw"). The URL analyzer 136 generates a first design having a first design identifier (e.g., "DADT-ykknLw") responsive to the user selection of the option 1402 and generates a second design having a second design identifier (e.g., "DADT-8fr_IM") responsive to the user selection of the option 1702.

The URL analyzer 136 generates design data 107 by parsing the URL 141. For example, the URL analyzer 136 generates a particular key-value pair 147 with a key (e.g., "design title") associated with an attribute (e.g., "set.title") of a particular attribute-value pair 143 and a key value (e.g., "MY NEW TEMPLATE") based on an attribute value (e.g., "MY %20NEW %20TEMPLATE") of the particular attribute-value pair 143. In a particular aspect, the key indicates a design property (e.g., a design title) and the key value indicates a design property value (e.g., "MY NEW TEMPLATE"). The URL sends the design 103 and the design data 107 to the client device 192.

Figure 18:
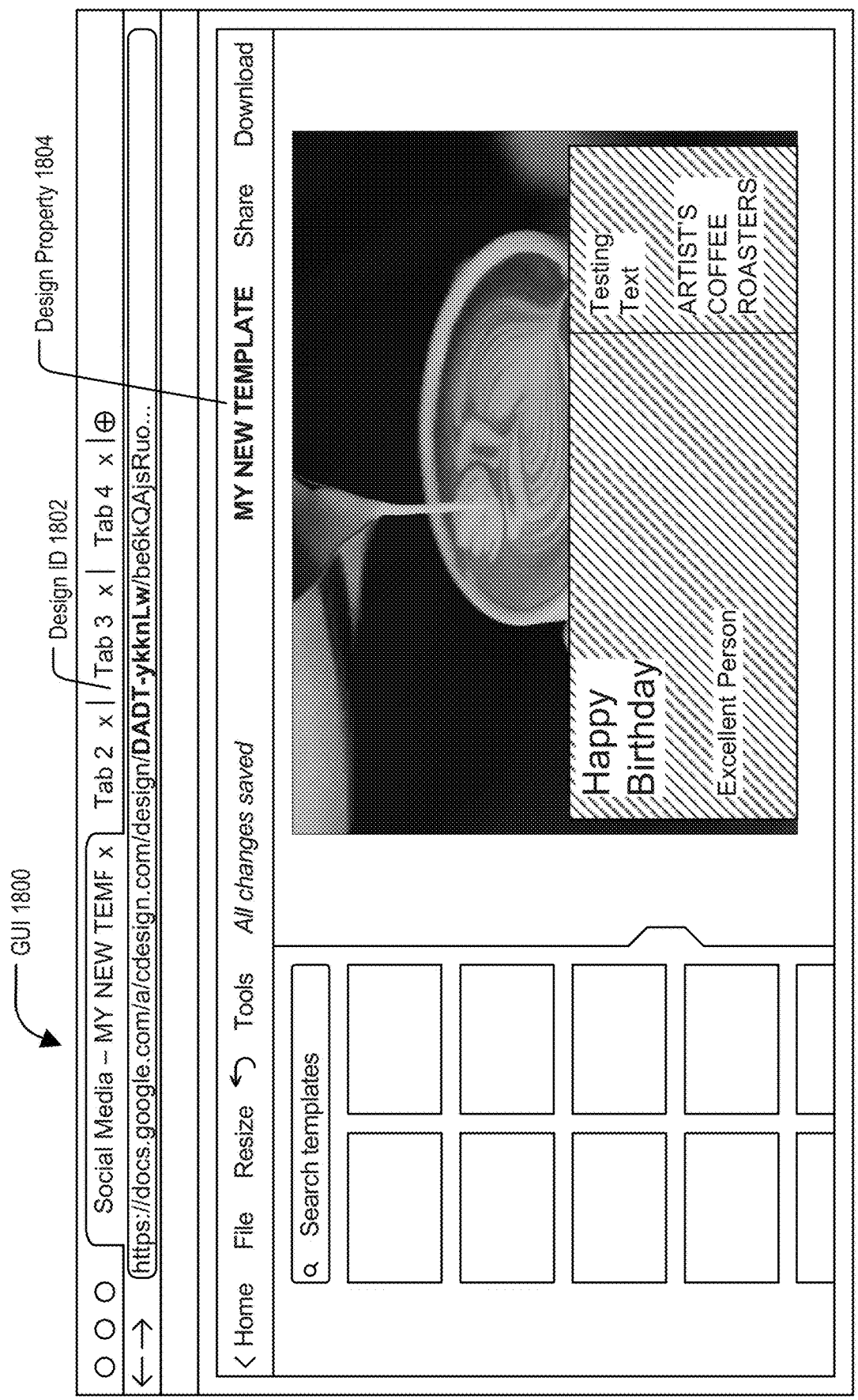
FIG. 18 illustrates a particular example of a user interface that may be generated by the systems of FIGS. 1-3.
Figure 19:
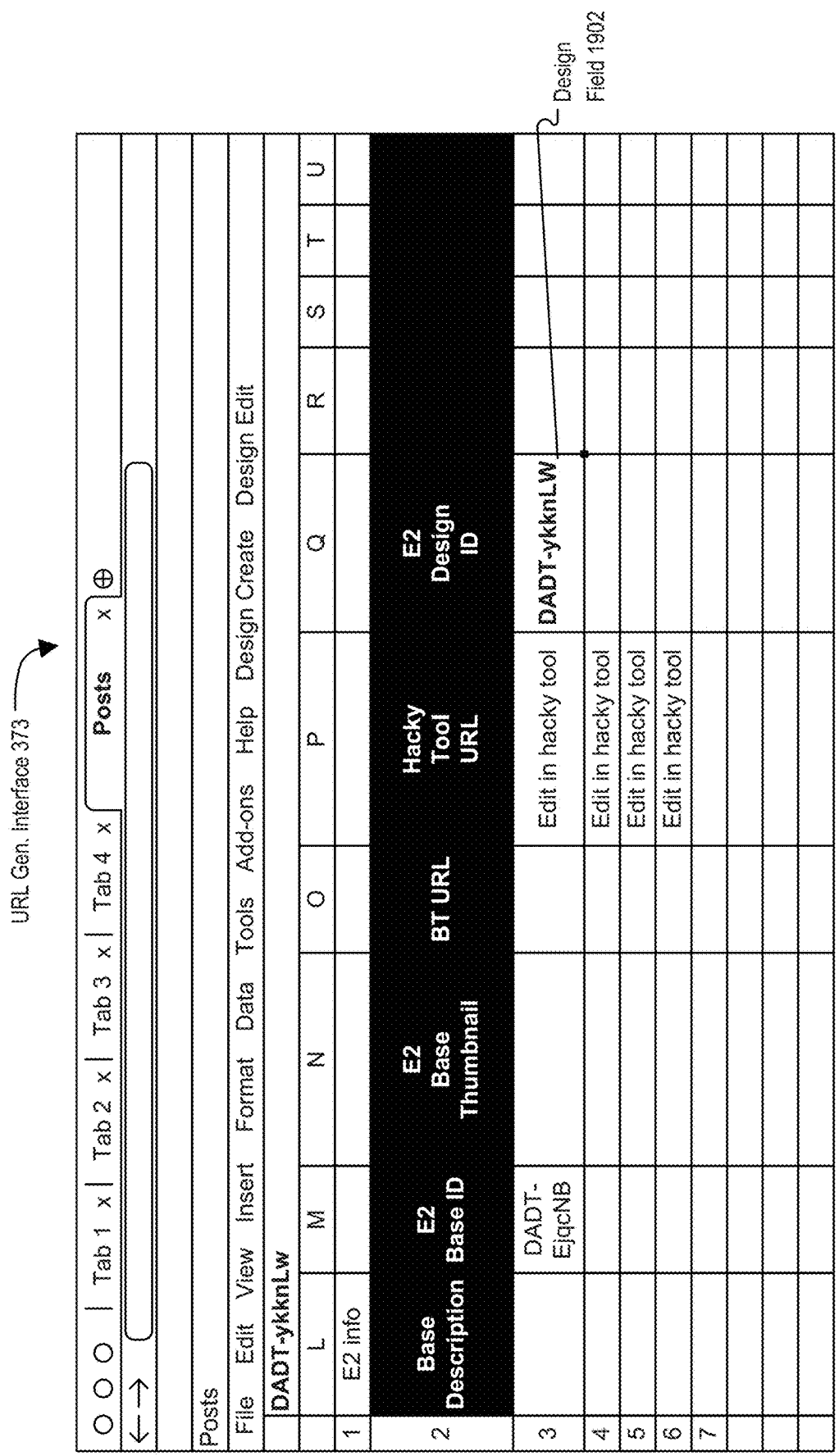
FIG. 19 illustrates a particular example of a URL generation interface that may be generated by the system of FIG. 3.
Figure 20:
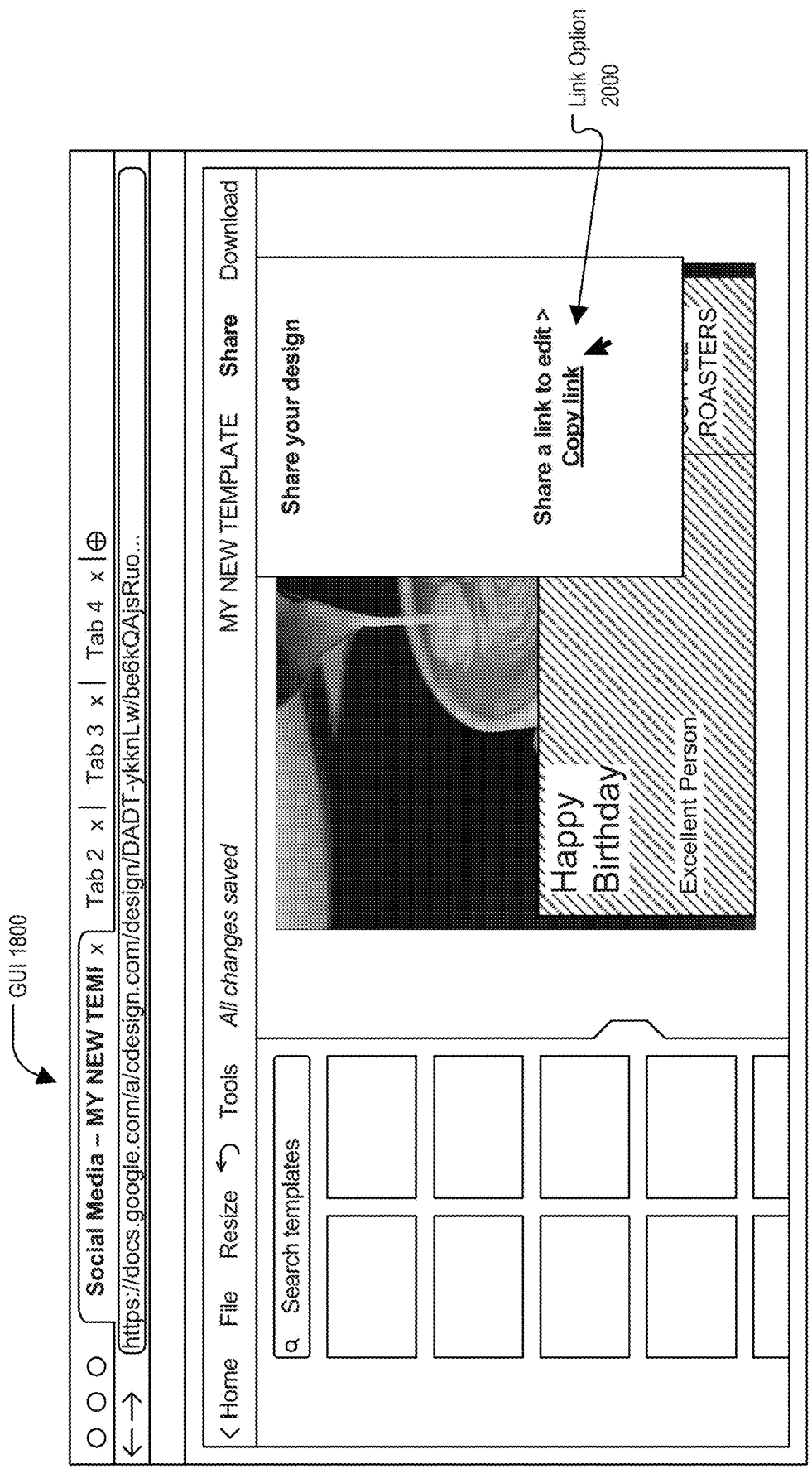
FIG. 20 illustrates a particular example of a user interface that may be generated by the systems of FIGS. 1-3.

In the example illustrated in FIG. 18, the web front end generates a GUI 1800 displaying an updated version of the design 103. In FIG. 18, the displayed design has a design identifier 1802. The design identifier 1802 corresponds to the design identifier 165 (e.g., "DADT-ykknLw") of FIG. 1. In a particular example, the client device 192, in response to receiving the design 103 and the design data 107, generates the updated version of the design 103 by applying the design data 107 to the design 103. Returning to FIG. 1, the client device 192, in response to determining that a key-value pair 147 of the design data 107 indicates a design property (e.g., a design title), updates (e.g., sets) the design property based on the design property value (e.g., "MY NEW TEMPLATE") indicated by the key-value pair 147.

The GUI 1800 may include a display portion that displays the updated version of the design 103. For example, the GUI 1800 displays the design property 1804 having the design property value (e.g., "MY NEW TEMPLATE"). In a particular aspect, the user 104 selects a save option to save the design 103 (e.g., the second design). The client device 192, in response to receiving the selection of the save option, sends the design 103 (e.g., the updated version or the updated and user modified version of the second design) to the computing environment. The design service(s) 126 stores the design 103 (e.g., the second design) in the document database 184. For example, the design service(s)

126 stores the updated version or the updated and user modified version as the design 103 (e.g., the second design) in the document database 184.

In a particular aspect, the document database 184 stores the first design having the first design identifier (e.g., "DADT-ykknLw"), the second design having the second design identifier (e.g., "DADT-8fr_IM"), or both. The graphic design website thus enables the user 104 to thus generate multiple designs by making incremental modifications using the URL generation interface 373. Making incremental modifications can reduce design time because the user 104 does not have to repetitively specify the common design elements.

In some aspects, the user 104 can use the URL generation interface 373 to make changes to an existing design, as compared to generating a new design. In the example illustrated in FIG. 19, the user 104 updates a design field 1902 to indicate the design identifier 1802 (e.g., "DADT-ykknLw") of the design 103 (e.g., the second design).

Figure 21:
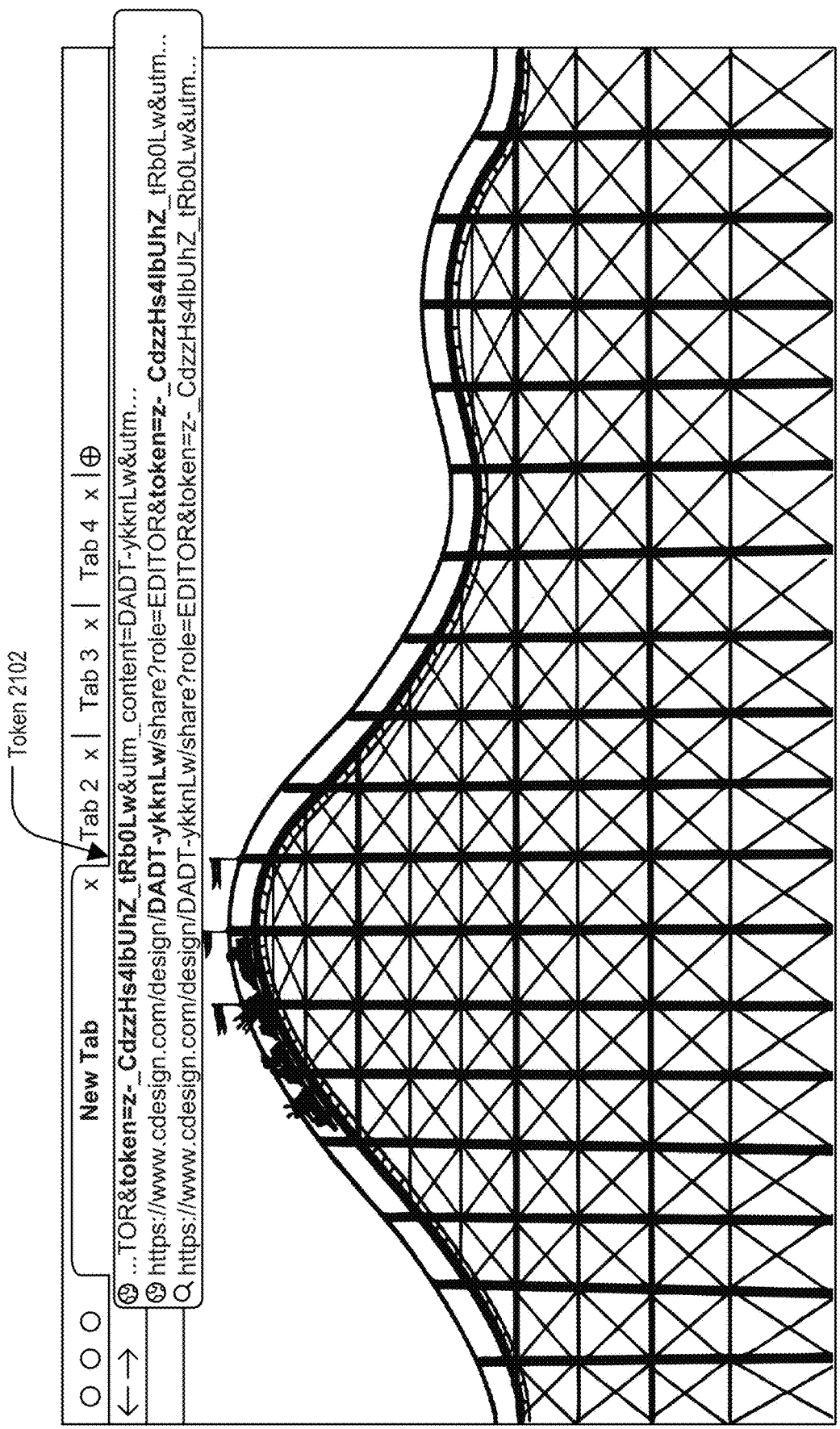
FIG. 21 illustrates a particular example of a user interface that may be generated by the systems of FIGS. 1-3.

Unlike design templates that are likely to be publicly accessible, designs generally have restricted access. In the example illustrated in FIG. 20, the user 104 selects a link option 2000 of the GUI 1800 to copy a link that enables access of the design 103 (e.g., the second design). In the example illustrated in FIG. 21, the user 104 copies a token 2102 (e.g., "z-_CdzzHs4lbUhZ_tRb0Lw") from the link. In the example of FIG. 21, the user 104 pastes the link into a web browser and copies a portion of the link corresponding to the token 2102 from the web browser. In another example, the user 104 could paste the link into a text document and copy the portion of the link corresponding to the token 2102 from the text document. In a particular aspect, the token 2102 (e.g., "z-_CdzzHs4lbUhZ_tRb0Lw") is associated with an account of the user 104.

Figure 22:
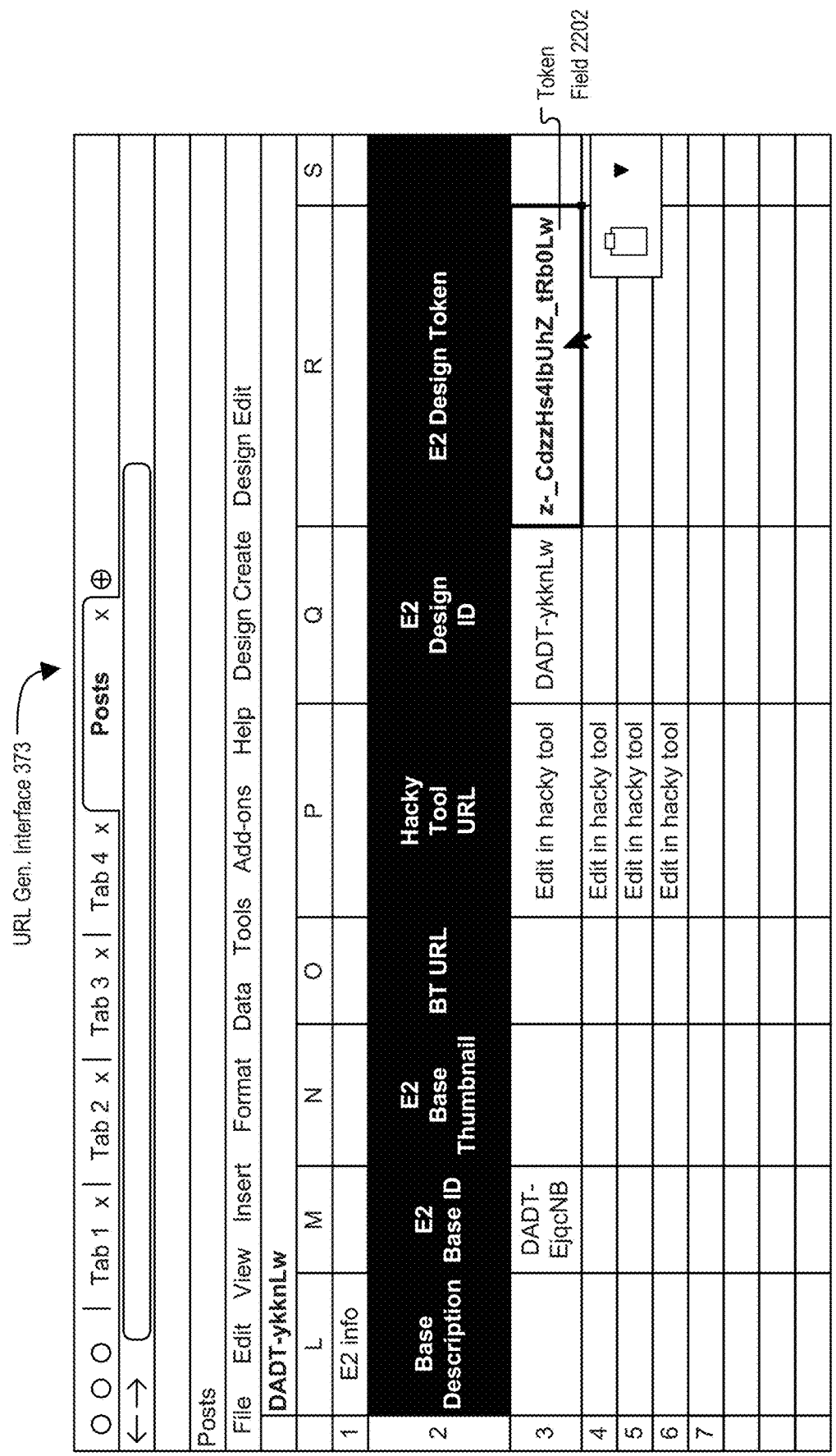
FIG. 22 illustrates a particular example of a URL generation interface that may be generated by the system of FIG. 3.
Figure 23:
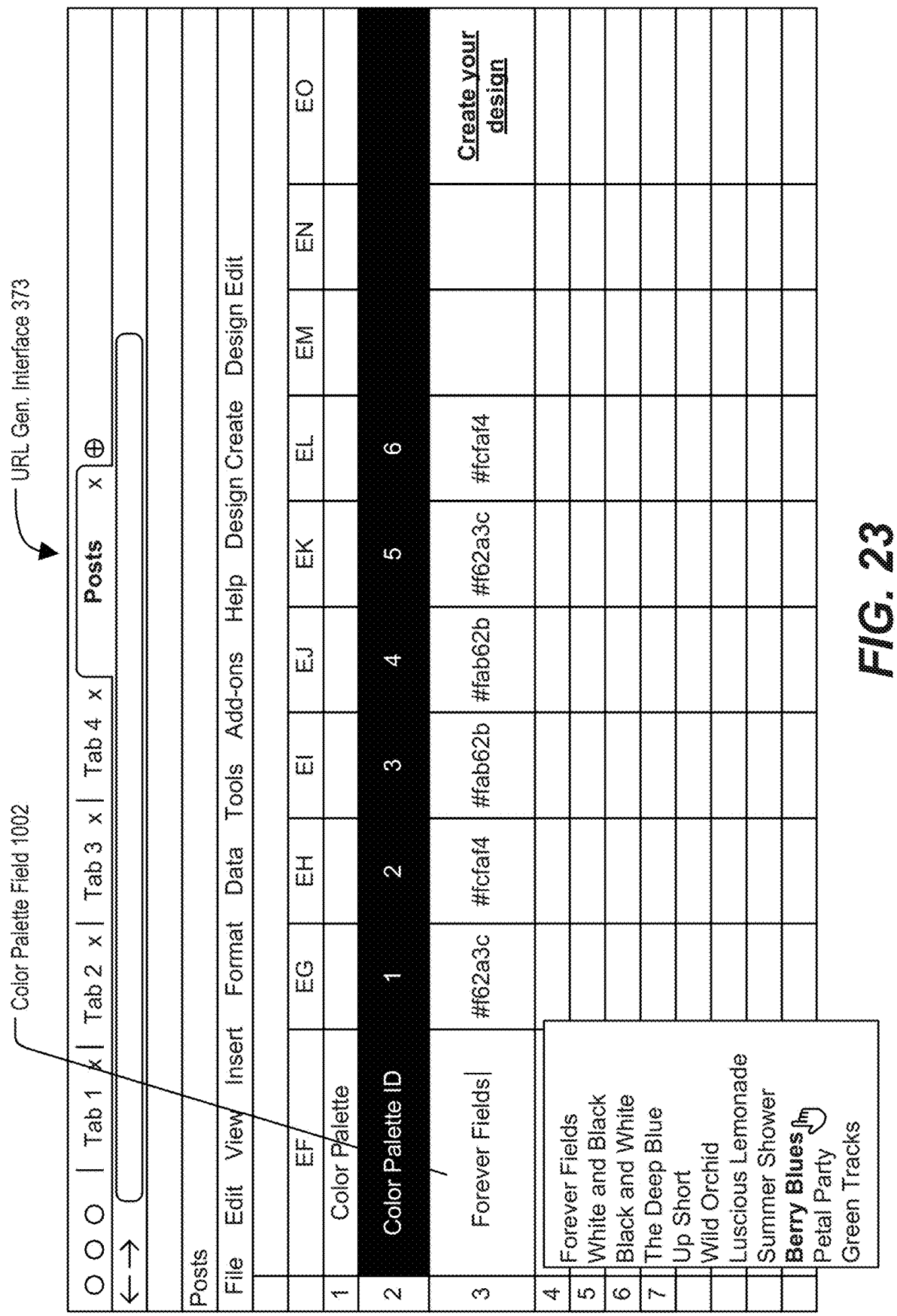
FIG. 23 illustrates a particular example of a URL generation interface that may be generated by the system of FIG. 3.
Figure 24:
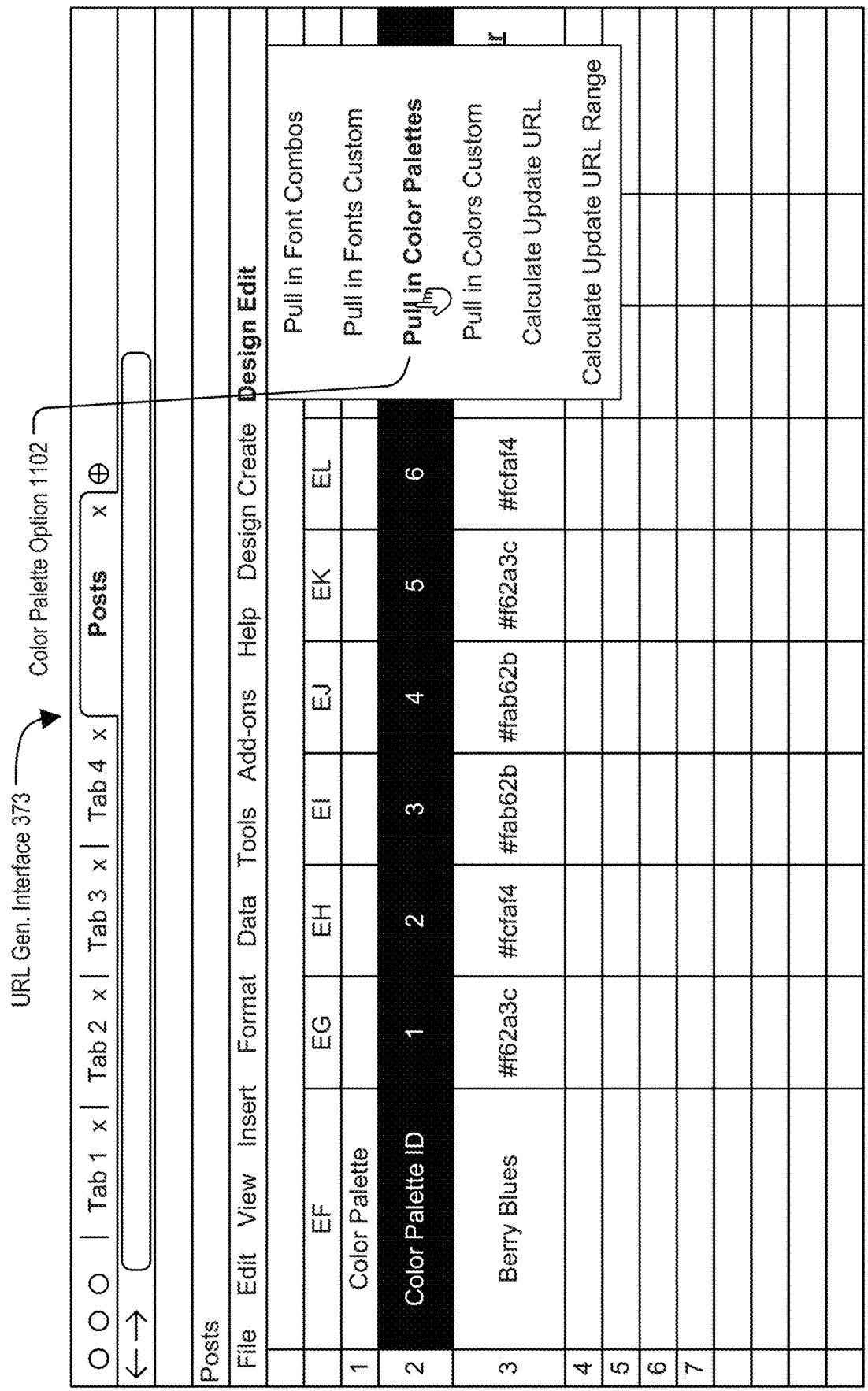
FIG. 24 illustrates a particular example of a URL generation interface that may be generated by the system of FIG. 3.
Figure 25:
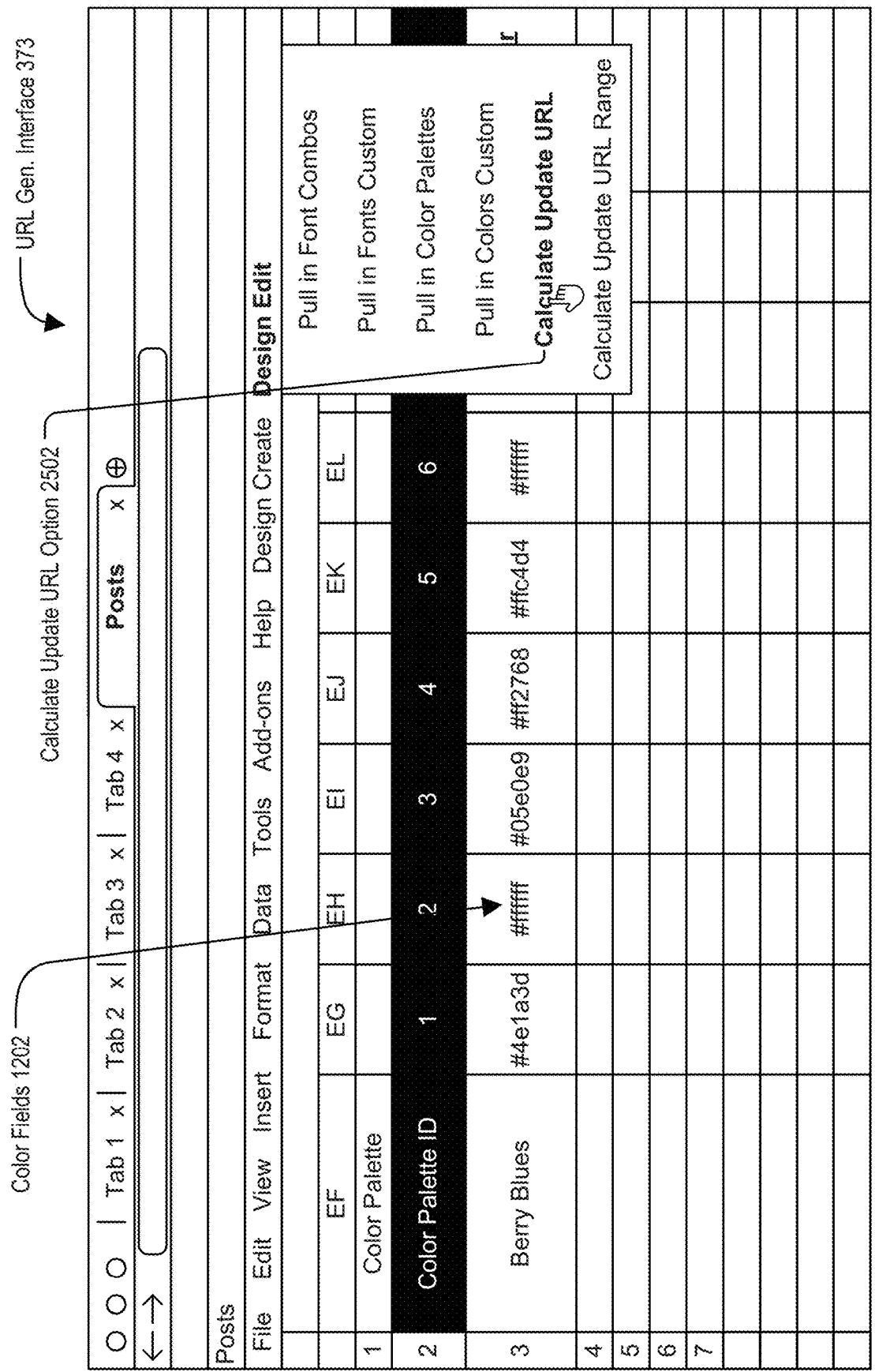
FIG. 25 illustrates a particular example of a URL generation interface that may be generated by the system of FIG. 3.

In the example illustrated in FIG. 22, the user 104 updates a token field 2202 of the URL generation interface 373 to indicate the token 2102 (e.g., "z-_CdzzHs4lbUhZ_tRb0Lw"). In the example illustrated in FIG. 23, the user 104 updates the color palette field 1002 to have a particular value indicating a particular color palette (e.g., "Berry Blues"). In the example illustrated in FIG. 24, the user 104 selects the color palette option 1102 (e.g., "Pull in Color Palettes"). In the example illustrated in FIG. 25, the web front end, in response to receiving the color palette option 1102, populates the color field(s) 1202 of the URL generation interface 373 based on hexadecimal values for the constituent colors of the particular color palette (e.g., "Berry Blues"). The user 104 selects a calculate update URL option 2502 (e.g., "Calculate Update URL").

Returning to FIG. 3, the client device 192, in response to a selection of the calculate update URL option 2502, generates a URL generation request 375 indicating that an update URL is to be generated. The URL generation request 375 includes one or more field-value pair(s) 343. For example, a first field-value pair 343 indicates that the design field 1902 has a first field value indicating the design identifier 1802 (e.g., "DADT-ykknLw"), a second field-value pair 343 indicates that the token field 2202 has a second field value indicating the token 2102 (e.g., "z-CdzzHs4lbUhZ_tRb0Lw"), a third field-value pair 343 indicates that the color palette field 1002 has a third field value indicating the particular color palette (e.g., "Berry Blues"), fourth field-value pairs 343 indicating that color fields 1202 have fourth field values, or a combination thereof. The client device 192 sends the URL generation request 375 to the computing environment.

The URL generator 334, in response to receiving the URL generation request 375, generates a URL 361 based on the field-value pair(s) 343. For example, the URL generator 334, in response to determining that the URL generation request 375 indicates that an update URL is to be generated, generates at least a portion of the URL 361 (e.g., "http://www.cdesign.com/design/DADT-ykknLw/edit?") based on the design identifier "DADT-ykknLw". In a particular aspect, the URL generator 334, in response to determining that a field-value pair 343 indicates a token "z-_CdzzHs4lbUhZ_tRb0Lw", updates the URL 361 by adding a portion (e.g., "set.auth-token=z-_CdzzHs4lbUhZ_tRb0Lw") that is based on the token. In a particular aspect, the URL generator 334 updates the URL 361 to include one or more attribute-value pairs 363 based on the color palette "Berry Blues", the colors of the color palette, or a combination thereof.

The URL generator 334 sends the URL 361 to the client device 192. In the example illustrated in FIG. 26, the website front end updates the URL generation interface 373 to include an option 2602 (e.g., a hyperlink) that is based on the URL 361. In a particular aspect, the user 104 selects the option 2602.

Figure 2:
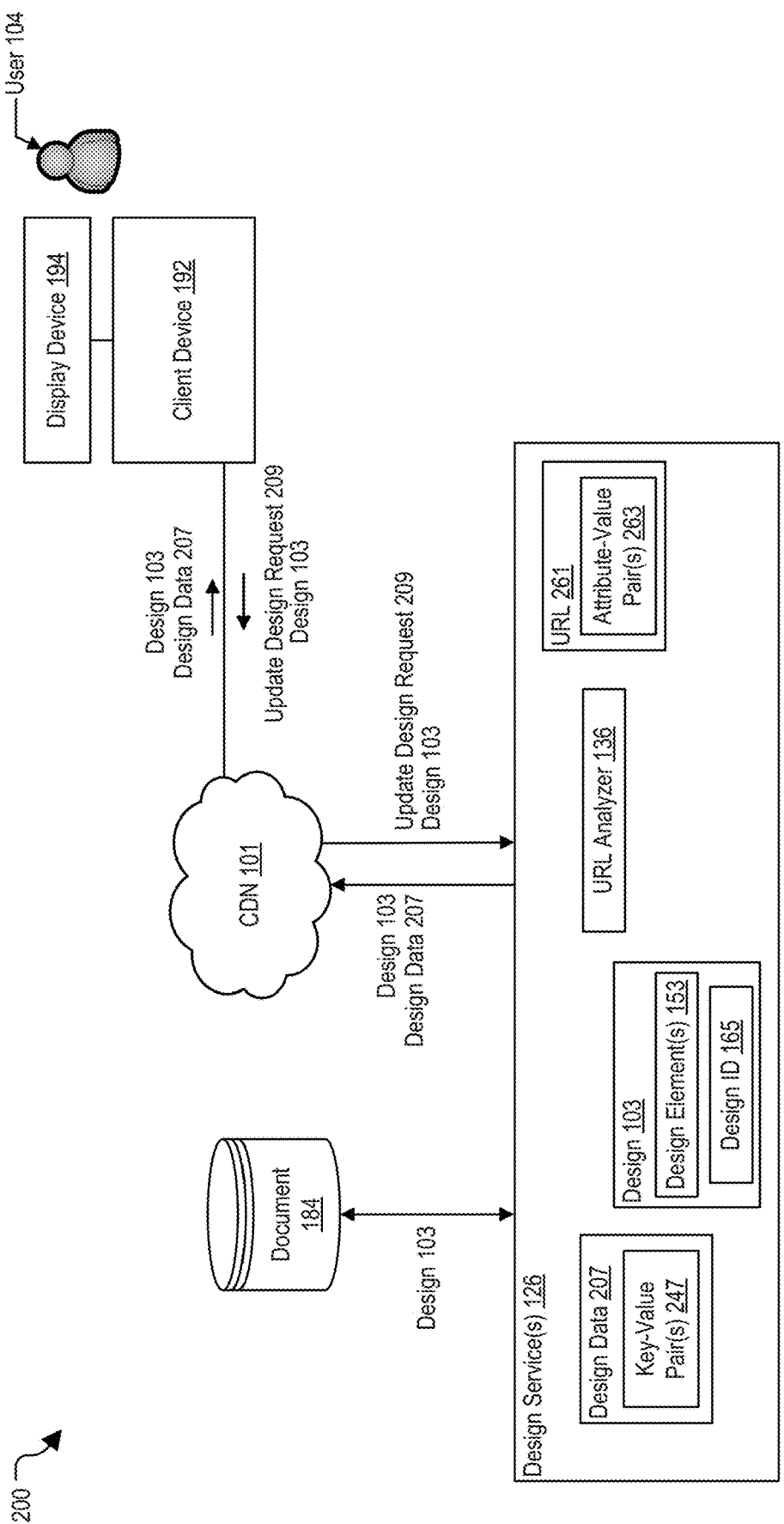
FIG. 2 illustrates a particular example of a system that is operable to update a design based on a URL.

Turning to FIG. 2, a system is shown and generally designated 200. The system 200 is operable to update a design based on a URL. In a particular aspect, the system 200 includes one or more components of the system 100 of FIG. 1. In FIG. 2, the client device 192, in response to receiving the selection of the option 2602, sends an update design request 209 to the computing environment. The update design request 209 indicates a URL 261. The URL 261 indicates a design identifier 165, one or more attribute-value pairs 263, or a combination thereof. In a particular aspect, the URL 261 corresponds to the URL 361 of FIG. 3. In this aspect, the design identifier 165 corresponds to the design identifier 1802 (e.g., "DADT-ykknLw") of the design 103 (e.g., the second design), the attribute-value pair(s) 263 correspond to the attribute-value pair(s) 363 of FIG. 3, or a combination thereof.

The URL analyzer 136, in response to receiving the update design request 209 and determining that the URL 261 indicates the design identifier 165 (e.g., "DADT-ykknLw"), determines whether the URL 261 includes a token associated with an account authorized to access the design 103 associated with the design identifier 165. The URL analyzer 136, in response to determining that a token attribute (e.g., "set.auth-token") of the URL 261 indicates an attribute value (e.g., "z-_CdzzHs4lbUhZ_tRb0Lw"), that the attribute value indicates the token 2102, and that the token 2102 is associated with an account that is authorized to access the design 103, retrieves the design 103 (e.g., the second design) having the design identifier 165 (e.g., "DADT-ykknLw") from the document database 184.

The URL analyzer 136 generates design data 207 by parsing the URL 261. For example, the URL analyzer 136 generates one or more key-value pair(s) 247 based on the attribute-value pair(s) 263 corresponding to the particular color palette (e.g., "Berry Blues"), the color fields 1202, or a combination thereof. The URL sends the design 103 (e.g., the second design) and the design data 207 to the client device 192.

Figure 27:
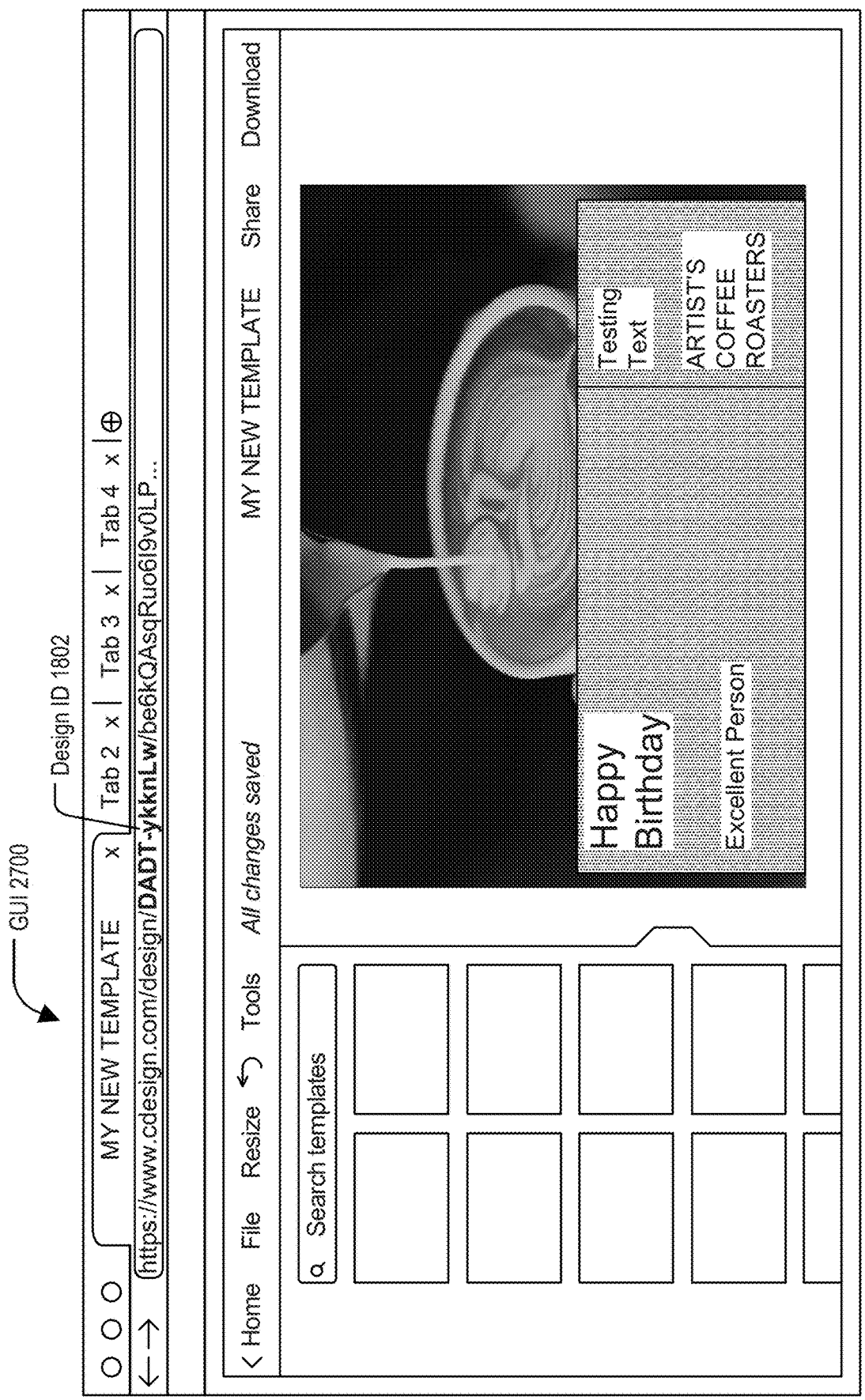
FIG. 27 illustrates a particular example of a user interface that may be generated by the systems of FIGS. 1-3.
Figure 28:
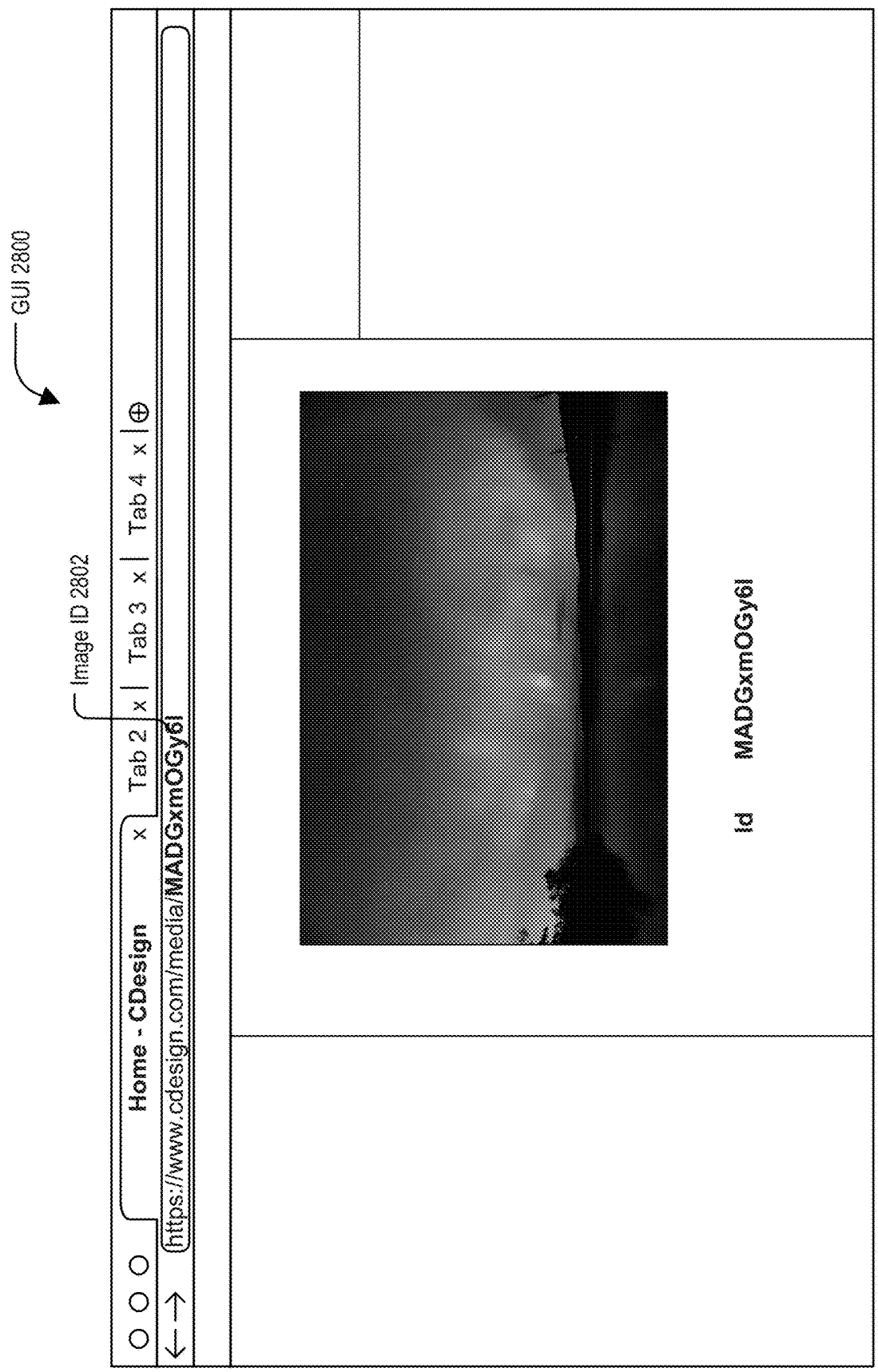
FIG. 28 illustrates a particular example of a user interface that may be generated by the systems of FIGS. 1-3.
Figure 30:
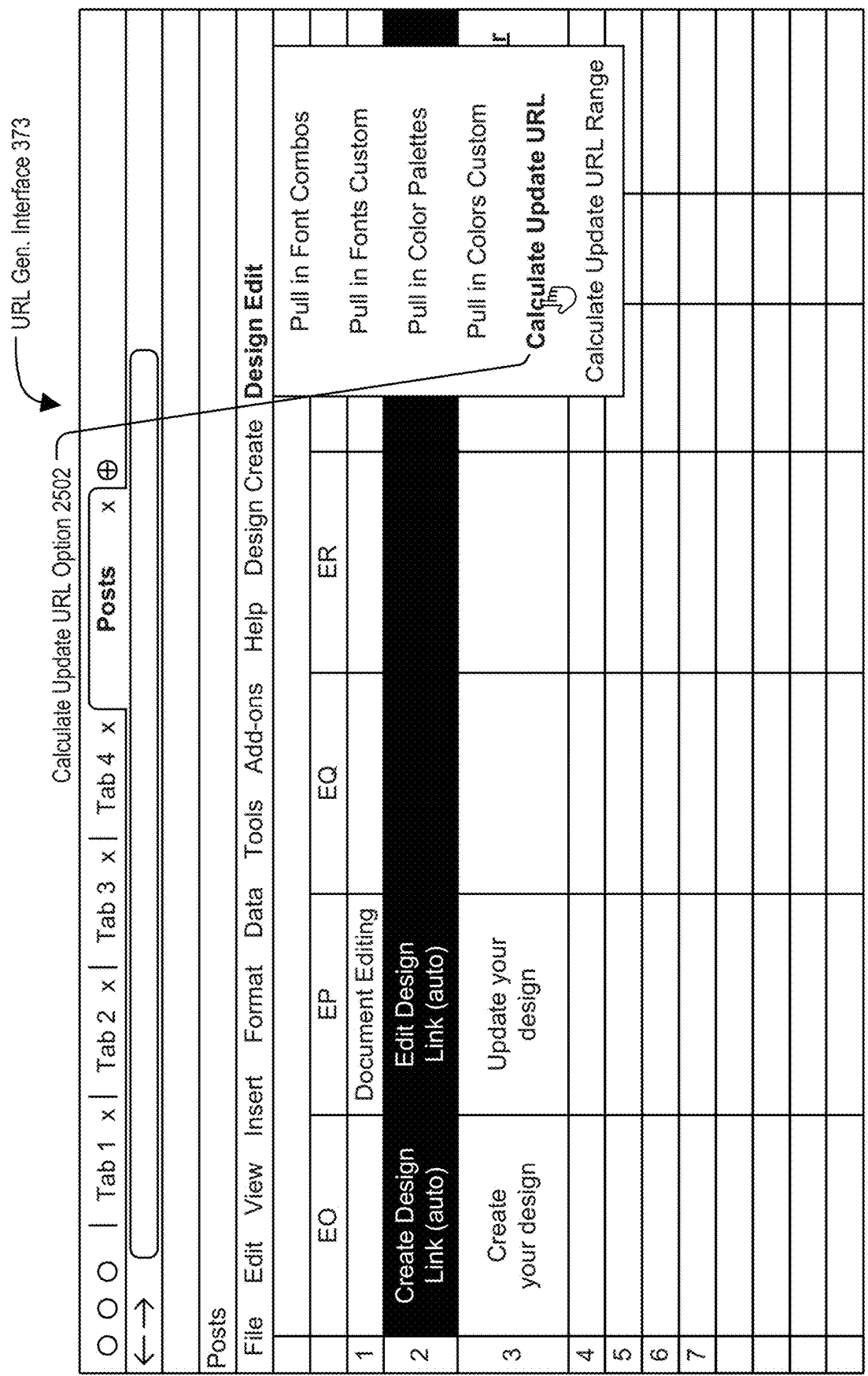
FIG. 30 illustrates a particular example of a URL generation interface that may be generated by the system of FIG. 3.
Figure 31:
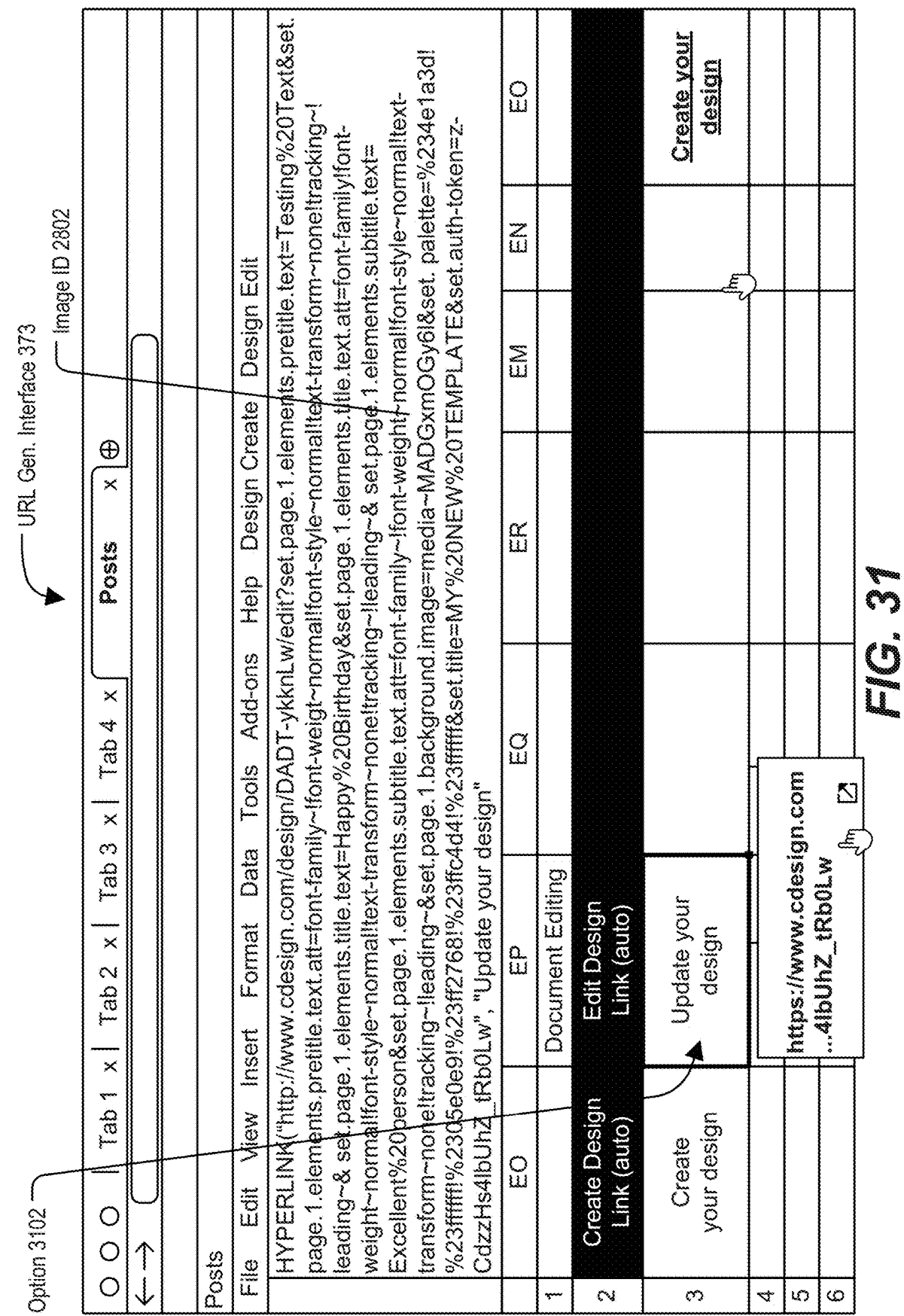
FIG. 31 illustrates a particular example of a URL generation interface that may be generated by the system of FIG. 3.

In the example illustrated in FIG. 27, the web front end generates a GUI 2700 displaying an updated version of the design 103 (e.g., the second design). In FIG. 27, the displayed design has the design identifier 1802 (e.g., "DADT-ykknLw"). In a particular example, the client device 192, in response to receiving the design 103 and the design data 207, generates the updated version of the design 103 (e.g., the second design) by applying the design data 207 to the design 103. Returning to FIG. 1, the client device 192, in response to determining that the key-value pair(s) 247 indicate the particular color palette (e.g., "Berry Blues"), one or more values associated with the color fields 1202, or a combination thereof, generates the updated version by updating the color palette of the design 103. In FIG. 27, a dotted fill is used to represent a particular color of the particular color palette (e.g., "Berry Blues).

In a particular aspect, the graphic design website may enable the user to compare the design 103 prior to applying the design data 207 and the updated version of the design 103 subsequent to applying the design data 207. For example, the user 104 can compare the GUI 1800 (prior to application of the design data 207) and the GUI 2700 (subsequent to applying the design data 207).

In a particular aspect, the user 104 uses the URL generation interface 373 to make additional modifications to the design 103 (e.g., the second design). In the example illustrated in FIG. 28, the user 104 uses a GUI 2800 to select an image identifier 2802 (e.g., "MADGxmOGy6I") of an image. In the example illustrated in FIG. 29, the user 104 updates a background image field 2902 of the URL generation interface 373 to indicate the image identifier 2802 (e.g., "MADGxmOGy6I"). In the example illustrated in FIG. 30, the user 104 selects the calculate update URL option 2502. The URL generator 334 of FIG. 3 generates the URL 361 based on the field-value pair(s) 343 indicating field values of the fields of the URL generation interface 373. In the example illustrated in FIG. 31, the web front end updates the URL generation interface 373 to indicate an option 3102 (e.g., a link) indicating the URL 361. In a particular aspect, the user 104 selects the option 3102 and the client device 192 sends an update design request 209 to the computing environment. The update design request 209 indicates a URL 261 corresponding to the URL 361.

Returning to FIG. 2, the URL analyzer 136 retrieves the design 103 based on the URL 261, generates the design data 207 by parsing the URL 261, and sends the design 103 and the design data 207 to the client device 192. For example, the design data 207 indicates a content role (e.g., background image) and the image identifier 2802 (e.g., "MADGxmOGy6I"). The client device 192 displays an updated version of the design 103 by applying the design data 207 to the design 103. In a particular aspect, the client device 192, in response to determining that the design 103 includes a design element 153 having the content role (e.g., background image), updates the design element 153 to indicate the image identifier 2802. Alternatively, the client device 192, in response to determining that the design 103 does not include any design element having the content role, adds a design element 153 indicating the image identifier 2802 (e.g., "MADGxmOGy6I") to the design 103.

Figure 32:
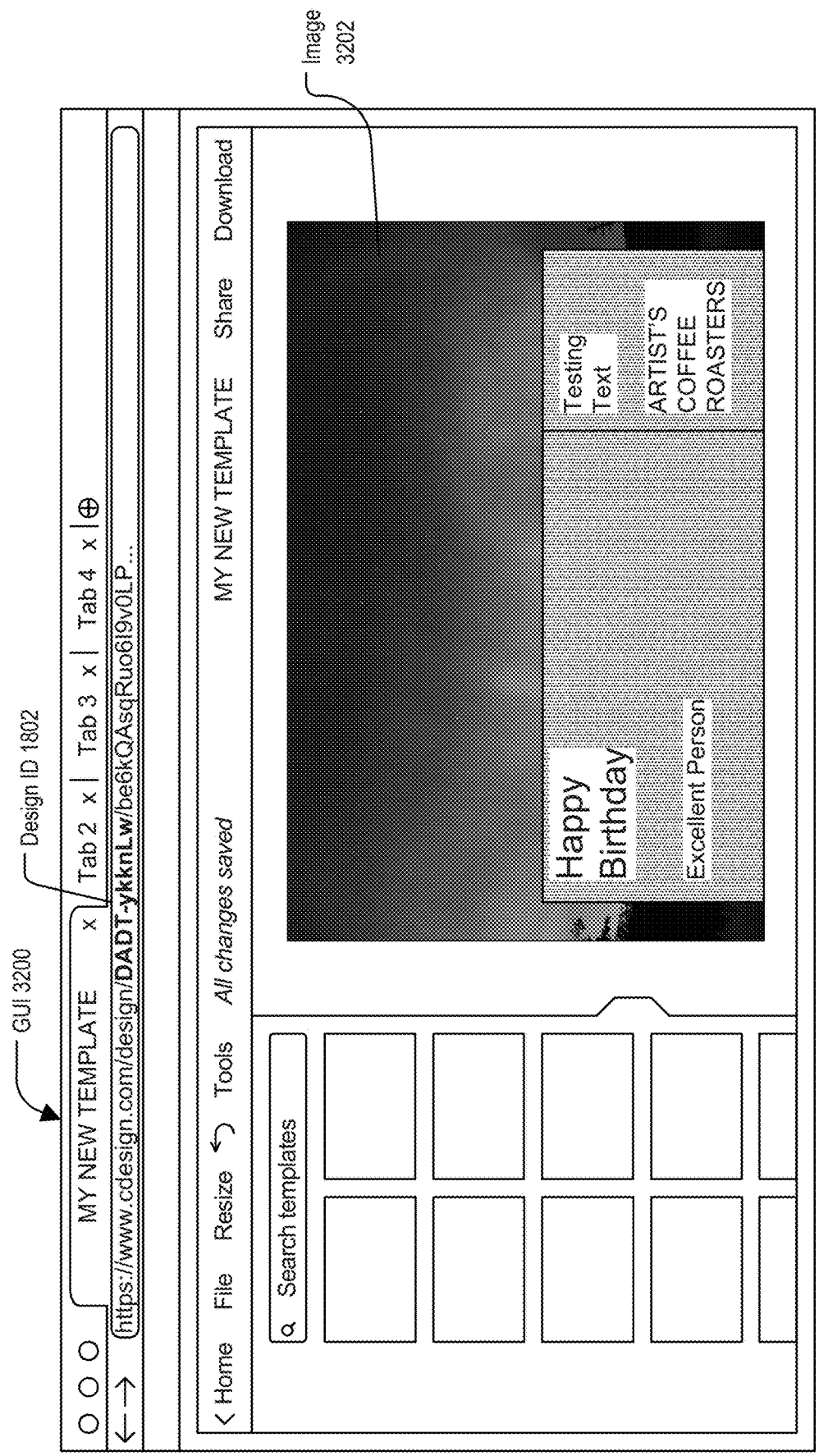
FIG. 32 illustrates a particular example of a user interface that may be generated by the systems of FIGS. 1-3.
Figure 36:
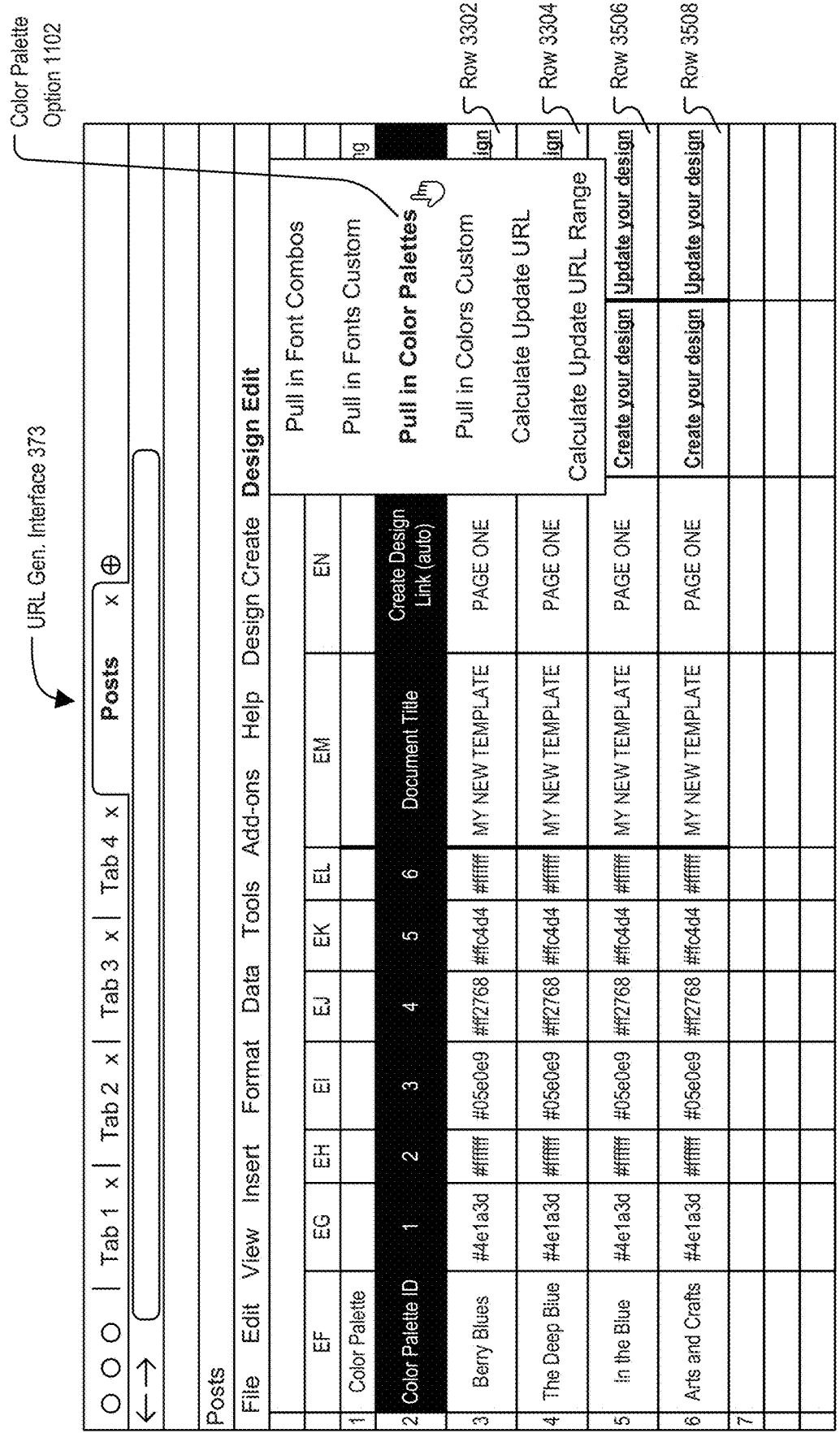
FIG. 36 illustrates a particular example of a URL generation interface that may be generated by the system of FIG. 3.

In the example illustrated in FIG. 32, the web front end generates a GUI 3200 displaying an updated version of the design 103 (e.g., the second design). In FIG. 32, the displayed design has the design identifier 1802 (e.g., "DADTykknLw"). In a particular example, the client device 192, in response to receiving the design 103 and the design data 207, generates the updated version of the design 103 (e.g., the second design) by applying the design data 207 to the design 103. For example, an image 3202 has the image identifier 2802 (e.g., "MADGxmOGy6I") and the updated version of the design 103 includes the image 3202 as a background image.

In a particular aspect, the user 104 selects a save option of the GUI 3200 to save the updated version of the design 103. The client device 192, in response to receiving the selection of the save option, sends the design 103 (e.g., the updated version or an updated and user modified version of the design 103) to the computing environment. The design service(s) 126 stores the design 103 in the document database 184. For example, the design service(s) 126 stores the updated version or the updated and user modified version as the design 103 in the document database 184. Alternatively, the user 104 refrains from selecting the save option or selects a cancel option. The client device 192 refrains from sending the updated (or the updated and user modified) version of the design 103 and the design 103 remains unchanged in the document database 184. The graphic design website thus enables the user 104 to use the URL generation interface 373 to generate URLs corresponding to different versions of the design 103, compare the various versions of the design 103, and optionally save a selected version of the design 103.

In a particular aspect, the user 104 uses the URL generation interface 373 to generate multiple URLs. In the example illustrated in FIG. 33, the user 104 copies field values from a row 3302 of the URL generation interface 373 to a row 3304 of the URL generation interface 373. In a particular aspect, the user 104 removes the design identifier 1802 and the token 2012 from the row 3304 so that the row 3304 can be used to generate a design (as compared to updating the design 103 indicated by the design identifier 1802). In the example illustrated in FIG. 34, the user 104 adds multiple copies of the row 3304 to the URL generation interface 373. Each of the rows indicates the same design template identifier (e.g., the design template identifier 702) so that updates are applied to designs generated from the same design template. In other examples, the user 104 can update the design template identifier of one or more rows of the URL generation interface 373.

In the example illustrated in FIG. 35, the user 104 updates a background field of the row 3304, a row 3506, and a row 3508 to indicate a second image identifier, a third image identifier, and a fourth image identifier, respectively. In the example illustrated in FIG. 36, the user 104 updates a color palette field of the row 3304, the row 3506, and the row 3508 to indicate a second color palette (e.g., "The Deep Blue"), a third color palette (e.g., "In the Blue"), and a fourth color palette (e.g., "Arts and Crafts"), respectively. The user 104 selects the color palette option 1102 to update color fields of the row 3304, the row 3506, and the row 3508. For example, color fields of the row 3304, the row 3506, and the row 3508 indicate values copied from the color fields of the row 3302. The user selects the color palette option 1102 to update the color fields of the row 3304, the row 3506, and the row 3508 based on corresponding color palettes. In the example illustrated in FIG. 37, the web front end updates the URL generation interface 373 by populating color fields of the row 3304, the row 3506, and the row 3508 based on the second color palette (e.g., "The Deep Blue"), a third color palette (e.g., "In the Blue"), and a fourth color palette (e.g., "Arts and Crafts"), respectively.

Figure 38:
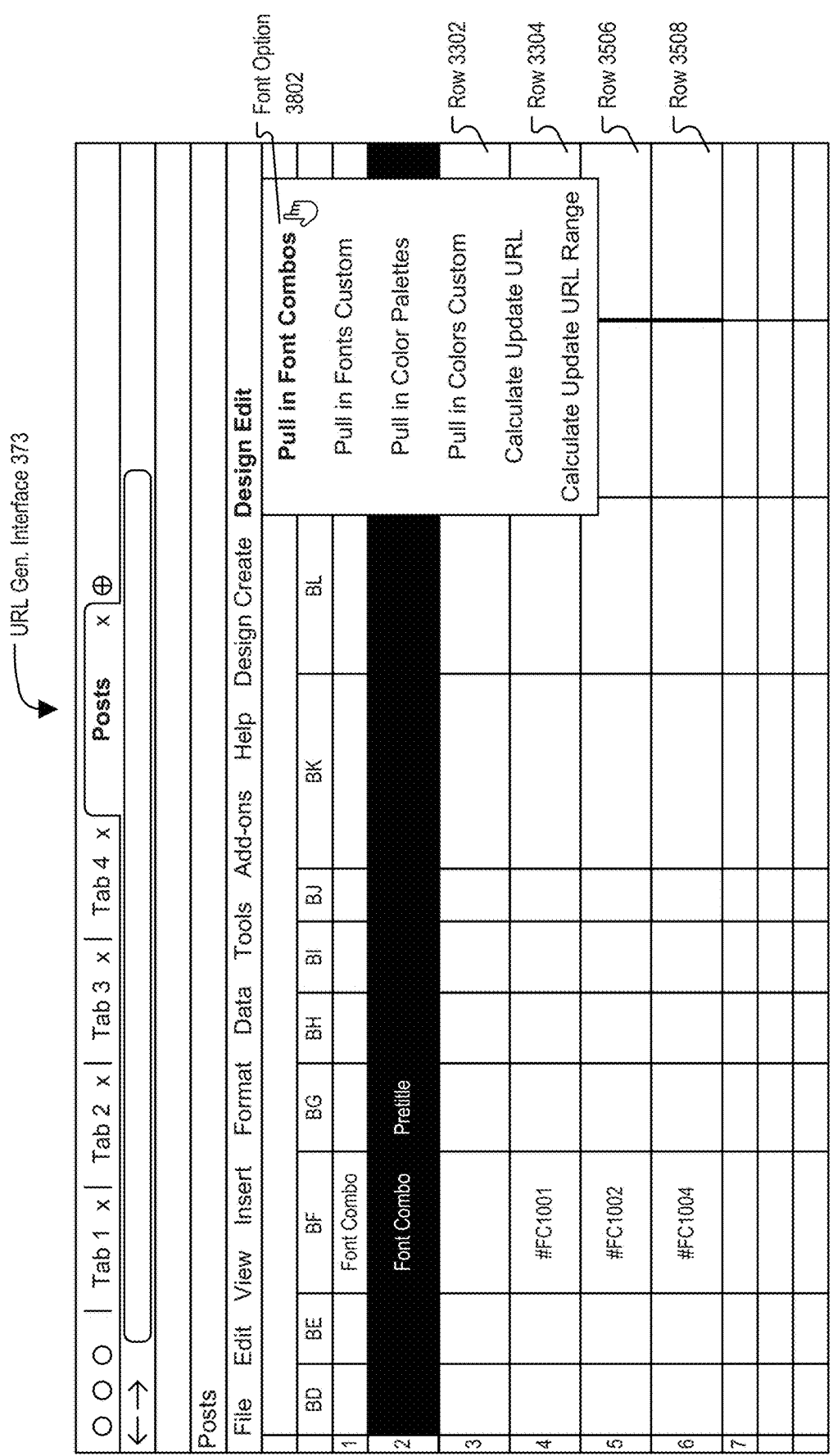
FIG. 38 illustrates a particular example of a URL generation interface that may be generated by the system of FIG. 3.

In the example illustrated in FIG. 38, the user 104 updates a font combination field of the row 3304, the row 3506, and the row 3508 to indicate a second font combination (e.g., "#FC1001"), a third font combination (e.g., "#FC1002"), and a fourth font combination (e.g., "#FC1004"), respectively. The user 104 selects a font option 3802 of the URL generation interface 373 to populate font fields of the row 3304, the row 3506, and the row 3508. In the example illustrated in FIG. 39, the web front ends updates the URL generation interface 373 by populating font fields of the row 3304, the row 3506, and the row 3508 based on the second font combination (e.g., "#FC1001"), a third font combination (e.g., "#FC1002"), and a fourth font combination (e.g., "#FC1004"), respectively.

Figure 40:
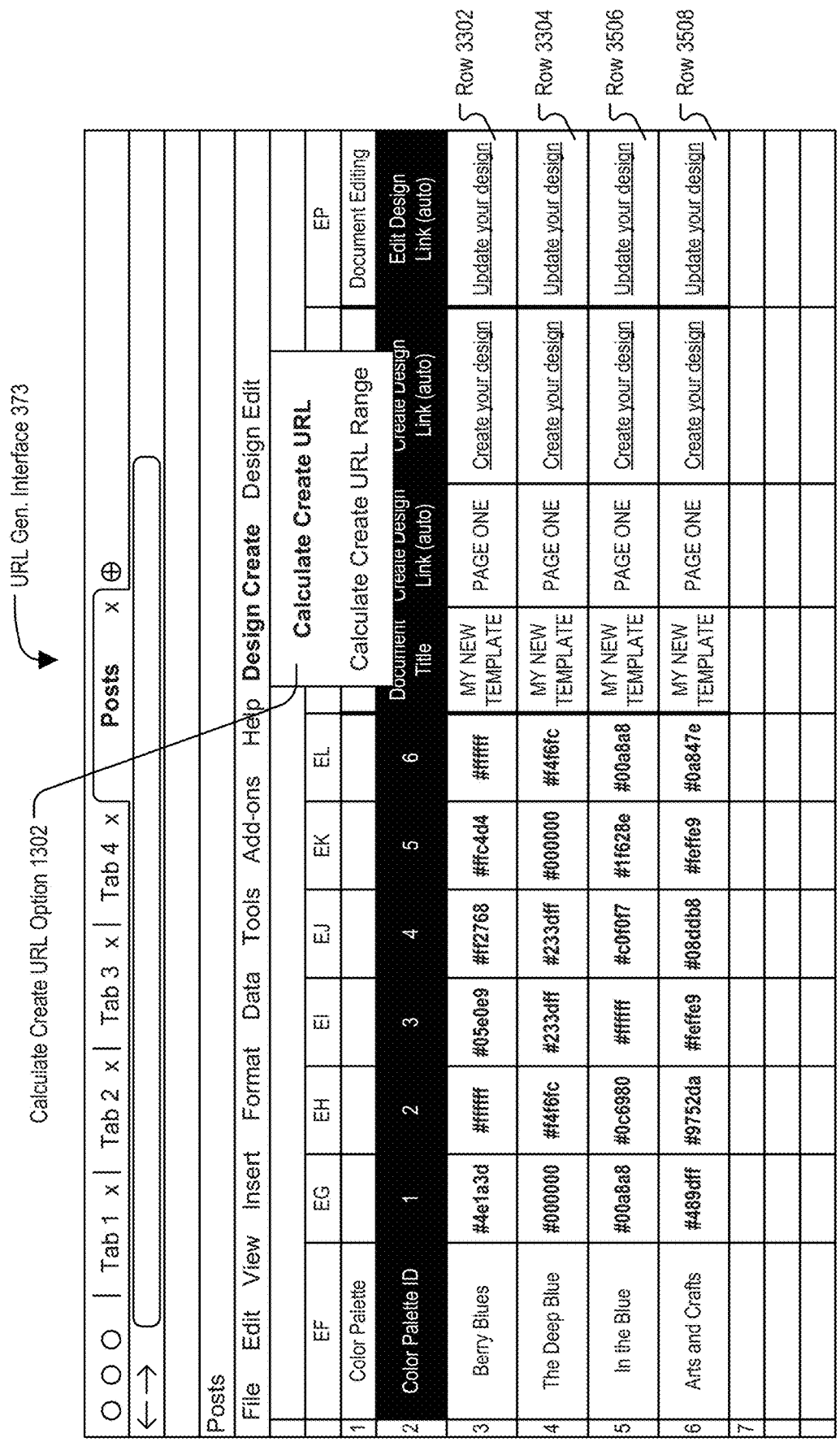
FIG. 40 illustrates a particular example of a URL generation interface that may be generated by the system of FIG. 3.

In the example illustrated in FIG. 40, the user 104 updates a design property field (e.g., a document title field) of the row 3304, the row 3506, and the row 3508 to indicate a second property value (e.g., "VERSION 2"), a third property value (e.g., "VERSION 3"), and a fourth property value (e.g., "VERSION 4"), respectively. The user 104 selects the calculate create URL option 1302 (e.g., "Calculate Create URL") of the URL generation interface 373. Turning to FIG. 3, the client device 192 sends a first URL generation request 375 corresponding to the row 3304, a second URL generation request 375 corresponding to the row 3506, and a third URL generation request 375 corresponding to the row 3508 to the computing environment. A particular URL generation request 375 includes field-value pair(s) 343 indicating values of fields of the corresponding row.

The URL generator 334 performs operations described above with respect to FIGS. 13 and 16 to generates URLs corresponding to each of the URL generation requests. In a particular aspect, portions of the URLs that are associated with common field values are identical to each other. For example, each of the URLs includes a portion (e.g., "http://www.cdesign.com/design/DADT-EjqcN8") corresponding to the design template identifier "DADT-EjqcN8". Portions of the URLs that are associated with distinct field values are distinct from (e.g., not identical to each other. For example, a first URL 361 includes a portion (e.g., "set.page.1.elements.title.text=VERSION %202") corresponding to the document title "VERSION 2" and a second URL 361 includes a portion (e.g., "set.page.1.elements.title.text=VERSION %203") corresponding to the document title "VERSION 3". The URL generator 334 provides the URLs to the client device 192.

Figure 41:
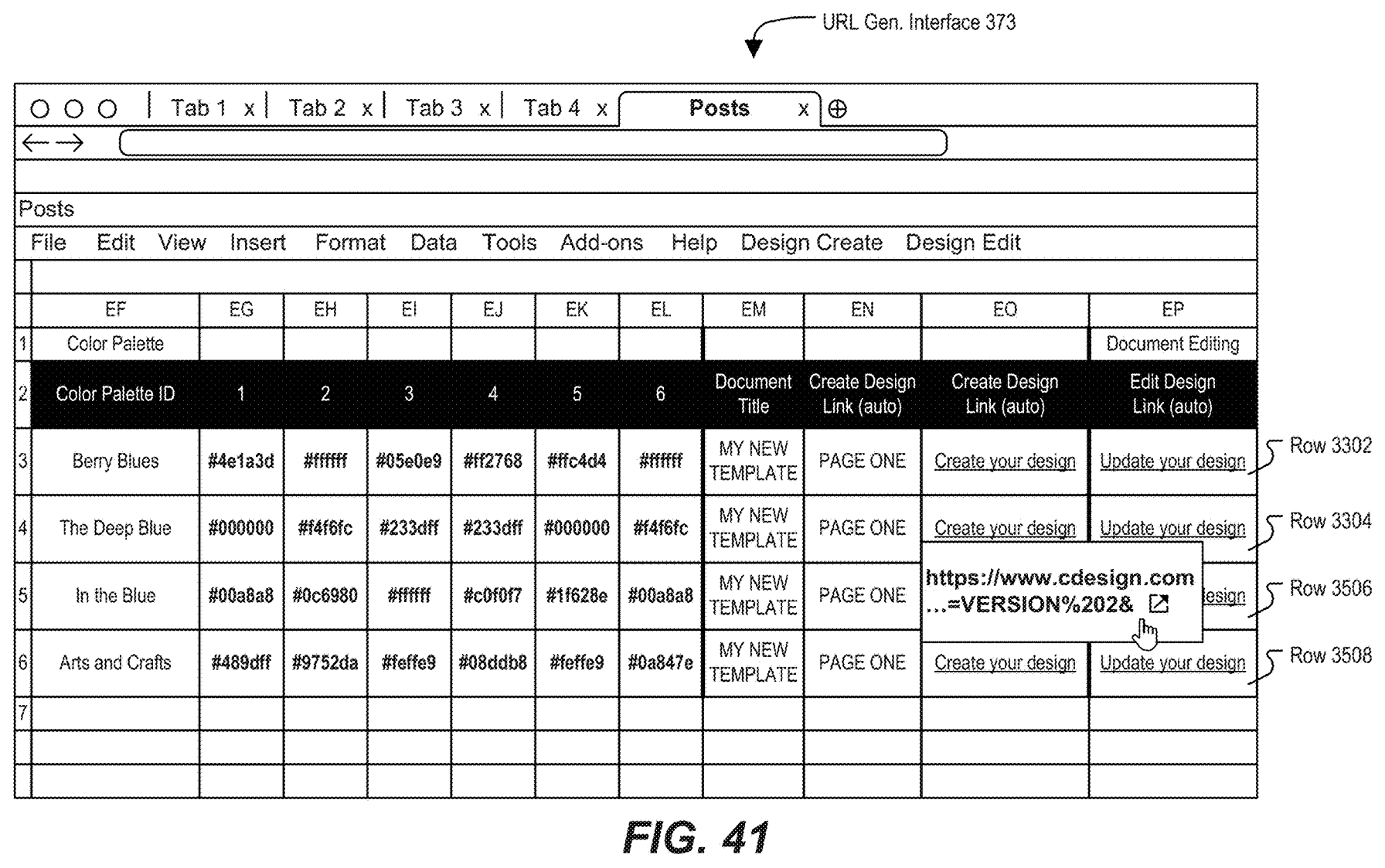

In the example illustrated in FIG. 41, the web front end updates the URL generation interface 373 to include an option (e.g., a link) indicating an associated URL to each of the row 3304, the row 3506, and the row 3508. In a particular aspect, the user 104 selects an option indicating a URL 361. Turning to FIG. 1, the client device 192 sends a create design request 109 indicating the URL 361 (e.g., a URL 141) to the computing environment. The URL analyzer 136, responsive to the create design request 109, sends a design 103 and design data 107 to the client device 192.

Figure 42:
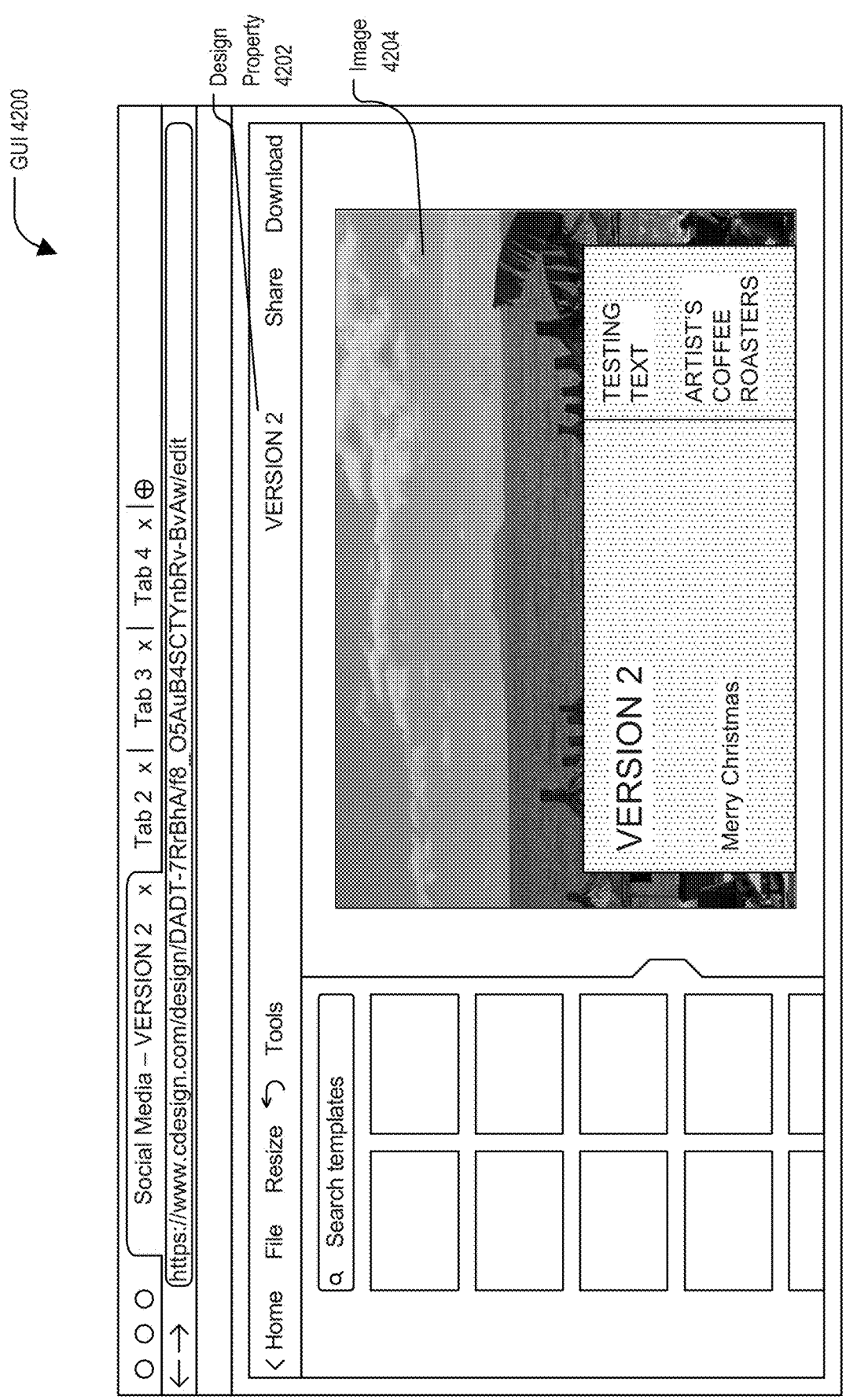
FIG. 42 illustrates a particular example of a user interface that may be generated by the systems of FIGS. 1-3.

In the example illustrated in FIG. 42, the client device 192 displays, in a GUI 4200, an updated version of a first design 103, where the first design 103 indicates the value "VERSION 2" of a design property 4202 (e.g., the document title property). The first design 103 includes an image 4204 having the second image identifier as a background image, and the second font combination (e.g., "#FC1001") and the second color palette (e.g., "The Deep Blue") are also applied.

Figure 43:
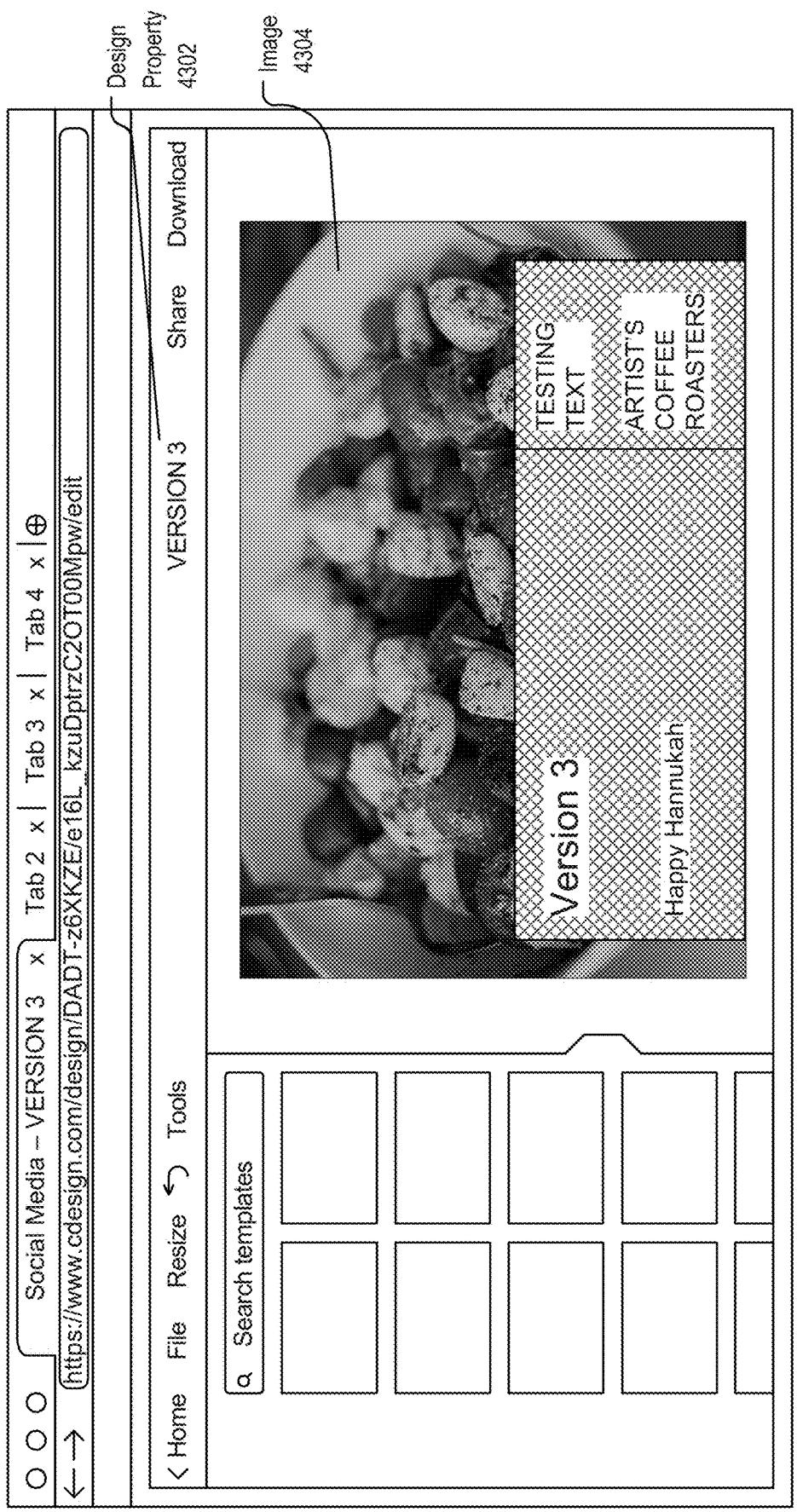
FIG. 43 illustrates a particular example of a user interface that may be generated by the systems of FIGS. 1-3.

In the example illustrated in FIG. 43, the client device 192 displays, in a GUI 4300, an updated version of a second design 103, wherein the second design 103 indicates the value "VERSION 3" of a design property 4302 (e.g., the document title property). The second design 103 includes an image 4304 having the third image identifier as a background image, and the third font combination (e.g., "#FC1002") and the third color palette (e.g., "In the Blue") are also applied.

Figure 44:
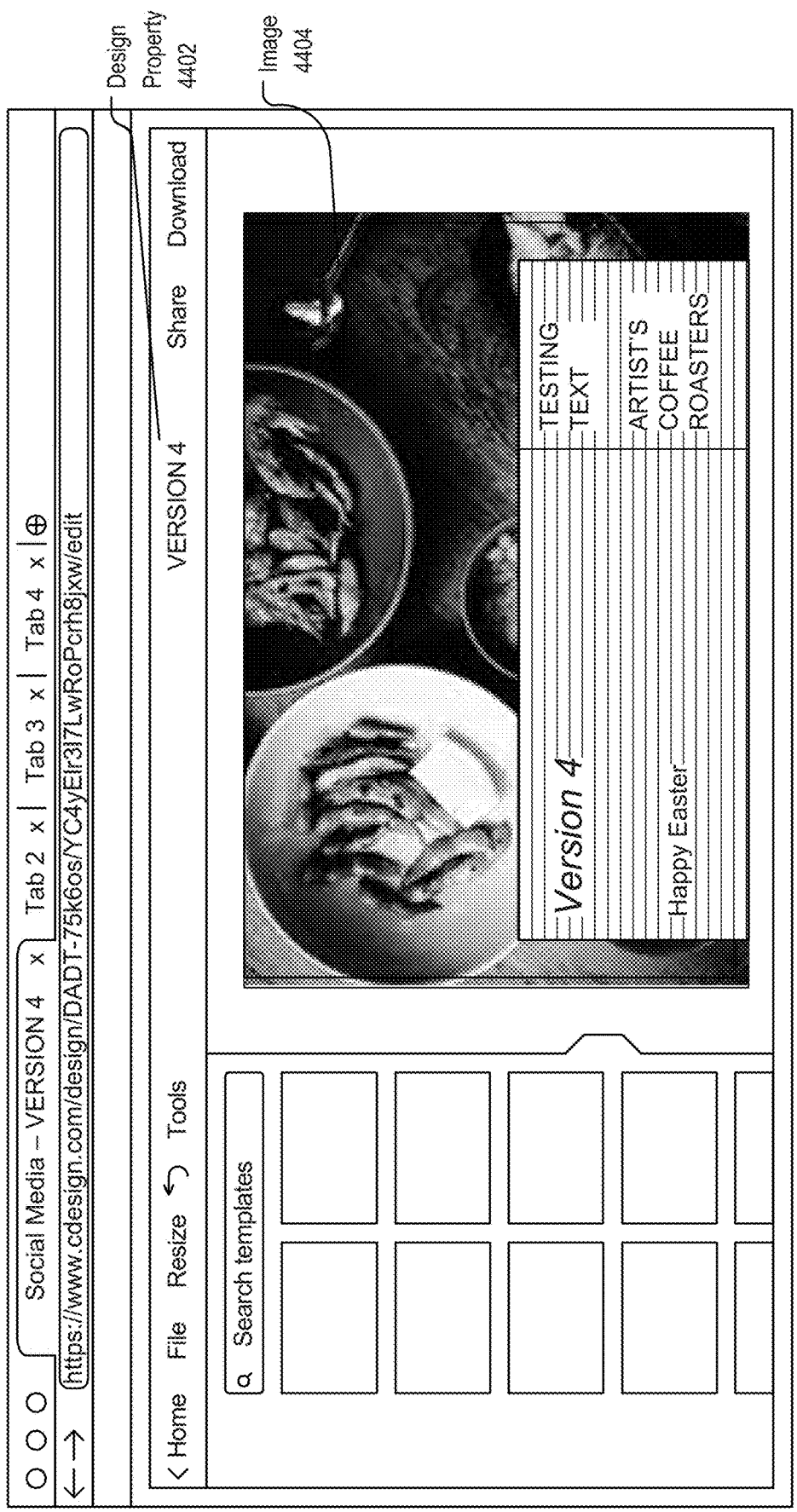
FIG. 44 illustrates a particular example of a user interface that may be generated by the systems of FIGS. 1-3.

In the example illustrated in FIG. 44, the client device 192 displays, in a GUI 4400, an updated version of a third design 103 by applying third design data 107 to the third design 103. For example, the third design 103 indicates the document title "VERSION 4" and includes an image 4404 having the fourth image identifier as a background image. In a particular example, the third design 103 indicates the fourth font combination (e.g., "#FC1004"), the fourth color palette (e.g., "Arts and Crafts"), or a combination thereof.

The URL generation interface 373 thus enables efficient generation of multiple designs by copying field values corresponding to common design elements and updating field values corresponding to distinct design elements. For example, using the URL generation interface 373 significantly speeds up design creation compared to individually adding design elements to each design. The ability to copy design elements by a simple copy and paste of a row of the URL generation interface 373 reduces design effort and inconsistencies as compared to graphically adding each individual design element step-by-step to each design.

It should be understood that particular examples of generating URLs are provided as illustrative examples, in other examples URLs can be generated in other ways. For example, URL-based design generation can enable a user 104 to specify a base URL and a folder with a large number of images (e.g., 1000) and the URL generator 334 can automatically generate a URL corresponding to each of the images by replacing an attribute value (e.g., a background image attribute) of the base URL to indicate a name of the image. Each of the generated URLs can be used to generate one or more designs having a background image corresponding to the URL.

Figure 45:
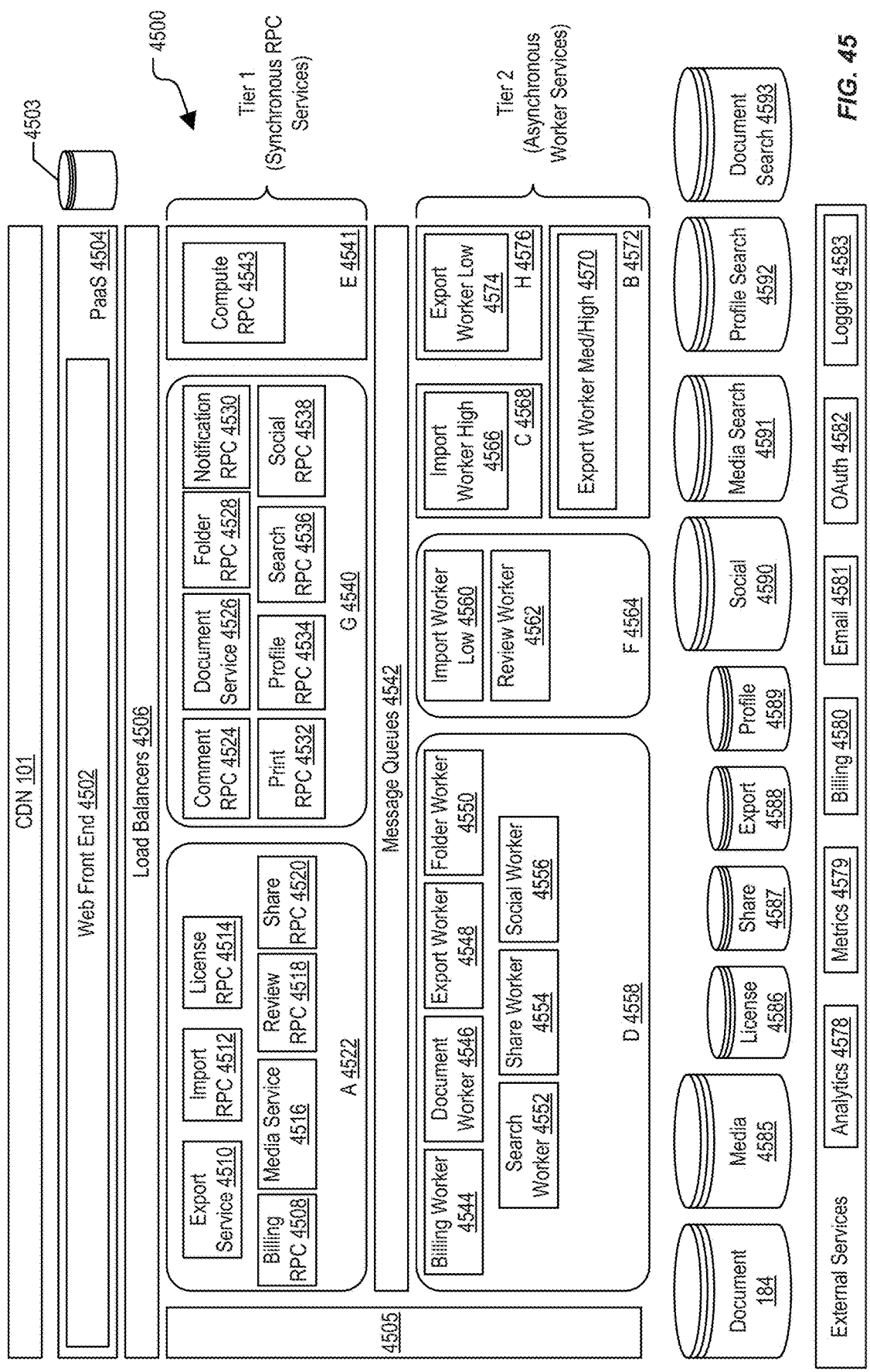
FIG. 45 illustrates another particular example of a system that is operable to generate a design based on a URL.

Whereas FIGS. 1-3 illustrates examples of systems 100, 200, and 300 that are operable to generate or update a design based on a URL (examples of which are illustrated and described with reference to FIGS. 4-44), it is to be understood that operation of such systems may include various local and/or cloud-based components that are not illustrated in FIGS. 1-3. For example, FIG. 45 depicts, in greater detail, a logical diagram of a system 4500 operable to support aspects of the present disclosure. Although illustrated in a logical diagram, it is to be understood that the various components of the system 4500 may include or may correspond to computer hardware, computer software, or a combination thereof. Moreover, components of the system 4500 may be configured to communicate with each other, for example via wired network(s) and/or wireless network(s). Thus, in various implementations, operations described herein as being performed by a particular component of FIG. 45 may be performed by dedicated hardware, software, or a combination thereof corresponding to the particular component.

In particular aspects, the system 4500 supports browser-based and mobile application-based access to a graphic design website. To illustrate, the graphic design website may correspond to one or more GUIs described with reference to FIGS. 4-44, and some or all of the components in the system 4500 may be implemented by the computing environment, one or more servers, the document database 184, a media database 4585, the client device 192 of FIG. 1, one or more message queues 4542, load balancers 4506, and/or an export database 4588. For example, users may log in to the graphic design website and create, edit, and save graphic designs. The graphic design website may support operations including, but not limited to, creating a new design, applying a template to a design, searching for and adding images to a design, saving a design, generating a URL to create a design, generating the design based on the URL, generating a URL to update a design, updating the design based on the URL (as described with reference to the preceding figures), publishing of a design, etc.

The system 4500 includes a web front end 4502 executed at a platform as a service (PaaS) provider 4504. The PaaS provider 4504 may enable at-scale deployment of software as a service (SaaS) applications, such as web applications. For example, the web front end 4502 may represent one, five, ten, or some other number of instances of a SaaS application that executes on hardware owned by and/or leased from the PaaS provider 4504. Each such instance of the front end SaaS application may be accessible via the Internet. In some examples, a browser or a mobile application executed by a user's computing device may access the web front end 4502 via the CDN 101. The CDN 101 may also be configured to cache static content (e.g., thumbnails, static images, static web content, etc.). To illustrate, when a user requests a particular content item, such as a particular image, if the CDN 101 (e.g., a server thereof) stores a copy of the image, the CDN may respond to the request without passing the request further into the service infrastructure shown in FIG. 45. The CDN 101 may thus include multiple geographically distributed "edge" servers that cache content.

The web front end 4502 may be configured to serve a graphic design website to requestors, such as by responding to hypertext transfer protocol (HTTP) GET requests, HTTP POST requests, etc. The web front end 4502 may also be configured to respond to application programming interface (API) calls originating from web browsers and/or mobile apps. In some examples, the web front end 4502 may utilize an in-memory cache 4503 that stores session data. To illustrate, when a user logs in to the graphic design website served by the web front end 4502, information regarding the user (e.g., display name, photo, subscription level, e-mail address, etc.) may be stored in the in-memory cache 4503 for rapid retrieval, processing, and/or rendering on some or all of the webpages of the graphic design website. Use of the in-memory cache 4503 may thus enable quickly serving webpages without accessing backend systems to determine user information.

The system 4500 includes the load balancers 4506 configured to support communication and workload distribution from the web front end 4502 to a plurality of backend services or microservices that execute, for example, on one or more virtual machines in a cloud computing environment. Each such virtual machine may be implemented using physical hardware that is owned by and/or leased by a cloud service provider. The system 4500 may support scaled, dynamic deployment of services based on scale groupings in a multi-tiered configuration. In particular aspects, services may be grouped in certain virtual machines based on expected load patterns for the services. The architecture of the system 4500 may enable the reorganization of these groupings with low effort, based on changes in observed load patterns or the introduction of new services. Separating services across multiple virtual machines may also enable scaling specific service groups in response to increases in certain kinds of loads. This scaling may occur automatically based on monitoring of load, and may also be triggered manually in anticipation of load increases. To illustrate, if an increasing number of export tasks (e.g., publish tasks) are observed (e.g., based on percentage of busy vs. idle time), more virtual machines that include instances of the export service 4510 and/or an export worker 4548 may dynamically be instantiated to service the demand. Conversely, if an administrator of the system 4500 anticipates export volume (e.g., publish volume) to increase, the administrator may manually initialize additional virtual machines that include instances of the export service 4510 and/or the export worker 4548. When export volume decreases, the virtual machines may be automatically (e.g., based on percentage of busy vs. idle time) or manually scaled down.

In the example of FIG. 45, a first tier of services includes synchronous "request-response" remote procedure call (RPC) services and a second tier includes asynchronous "worker" services. A synchronous RPC service may receive first data from a requestor, perform one or more processing functions, and return second data to the requestor. Such synchronous request-response services may be used for tasks that can be completed relatively quickly, e.g., in three seconds or less, because in some examples a requestor (e.g., a web browser or mobile app) may block while waiting for a response. Conversely, the asynchronous worker services of the second tier may be used for background tasks and other tasks that cannot or may not be completed relatively quickly.

In FIG. 45, the first tier includes a first scale group 4522 (designated "A"), a second scale group 4540 (designated "G"), and a third scale group 4541 (designated "E"). The first scale group 4522 includes a billing RPC service 4508, an export service 4510, an import RPC service 4512, a license RPC service 4514, a media service 4516, a review RPC service 4518, and a share RPC service 4520. To illustrate, a virtual machine corresponding to the first scale group 4522 may execute the illustrated RPC services. The billing RPC service 4508 may be configured to perform synchronous billing tasks (e.g., checking account balance). The export service 4510 may be used to perform synchronous graphic design export tasks (e.g., publishing a design). The import RPC service 4512 may be configured to enable user importing of media assets for use in graphic design creation/editing. The license RPC service 4514 may be configured to enforce image licenses (e.g., one-time-use licenses). The media service 4516 may be configured to track and catalog media assets available via the system 4500, including but not limited to user-uploaded and/or library images, templates, fonts, etc. The review RPC service 4518 may be configured to facilitate acceptance of contributor media (e.g., uploading of media assets by authorized contributors of the graphic design website). The share RPC service 4520 may enable sharing of graphic designs with other users, such as via social media accounts.

The second scale group 4540 includes a comment RPC service 4524, a document service 4526, a folder RPC service 4528, a notification RPC service 4530, a print RPC service 4532, a profile RPC service 4534, a search RPC service 4536, and a social RPC service 4538. The comment RPC service 4524 may enable users to comment on graphic designs in comment threads. The document service 4526 may enable core design creation, design updating, and design deletion functionality of the graphic design website. The folder RPC service 4528 may enable navigating into and out of different folders associated with a user's account. The notification RPC service 4530 may enable generating and serving notifications to users via the graphic design website (e.g., when a user's design is "liked" or commented on). In some aspects, multiple such notifications may be coalesced into an e-mail that is sent to an e-mail address of the user or that is shown on a pop-up when the user accesses the graphic design website. The print RPC service 4532 may be a format service that enables sending a graphic design to a third-party printer, for example to be printed and then delivered to a physical mailing address of the user. The profile RPC service 4534 may enable users to manage their graphic design website account. The search RPC service 4536 may enable searching for images, templates, designs, etc. The social RPC service 4538 may enable users to perform social networking engagement on the graphic design website (e.g., "follow" another user, "like" another user's design, etc.) and may generate "feeds" of designs created by followed users. The third scale group 4541 includes a compute RPC service 4543 that may be dedicated for performing certain fast high-CPU-utilization operations, such as hashing and solving of passwords.

The second tier of services in FIG. 45 includes a fourth scale group 4558 (designated "D"), a fifth scale group 4564 (designated "F"), a sixth scale group 4568 (designated "C"), a seventh scale group 4576 (designated "H"), and an eighth scale group 4572 (designated "B"). The fourth scale group 4558 includes a billing worker 4544, a document worker 4546, an export worker 4548, a folder worker 4550, a search worker 4552, a share worker 4554, and a social worker 4556. The fifth scale group 4564 includes a low priority import worker 4560 and a review worker 4562. The sixth scale group 4568 includes a high priority import worker 4566. The seventh scale group 4576 includes a low priority export worker 4574. The eighth scale group 4572 includes a medium/high priority export worker 4570. In illustrative aspects, the asynchronous worker services in FIG. 45 may perform longer and/or more complex versions of the operations performed by the corresponding RPC services of FIG. 45. In a particular implementation, the priority designations shown in FIG. 45 (e.g., "low," "medium," and "high") correspond to an amount of dedicated processing resources. "High" priority may be used for jobs that are triggered by user actions whereas "medium" or "low" priority may be used for jobs that are not triggered by user actions (e.g., background jobs).

It is to be understood that the various services and groupings thereof shown in FIG. 45 is for illustration only and is not to be considered limiting. In alternative aspects, more, fewer, and/or different services may be present in the system. Moreover, a different grouping of services into different scale groups than shown in FIG. 45 may be used. In some aspects, each of the scale groups shown in FIG. 45 corresponds to a virtual hardware instance, i.e., a virtual machine running at a cloud services provider. Thus, at any given time, there may be one or more active/executing instances of each of the scale groups, and the specific numbers of active/executing virtual machine instances may dynamically change based on the overall workload being managed by the load balancers 4506. Coordination and configuration of the various instances, including communication between instances and/or services executed therein, may be managed by a coordination tool 4505, which may itself be a cloud-based system.

During operation, the synchronous RPC services of the first tier may be configured to communicate with the asynchronous workers' services of the second tier via the message queues 4542 and may utilize the asynchronous workers to perform time-consuming tasks. For example, the export service 4510 may receive a request that a user wants to export a graphical design. The export service 4510 may push a corresponding work request into the message queues 4542. An export worker (e.g., the medium/high priority export worker 4570) may respond to the work request by rendering the graphical design to a web output. The web output may then be passed back to the requesting user. As another example, the folder RPC service 4528 may receive a request indicating that a user wants to share a folder of graphic designs with another user. The folder RPC service 4528 may use the message queues 4542 to request that the folder worker 4550 set the corresponding permissions on the folder and on each of the items in that folder. As yet another example, asynchronous workers may be used to perform routine background tasks in the system 4500, such as daily verification of subscription levels.

During certain operations at the system 4500, the illustrated services may access one or more databases or data stores. For example, the document database 184 may store files corresponding to user-created graphic designs and the media database 4585 may store image uploads, fonts, and templates that are accessible via the graphic design website. In an illustrative aspect, the document database 184 may be accessed by the document worker 4546 when a user opens or saves a graphic design. In another illustrative aspect, the media database 4585 may be accessed by the media service 4516 when a user uploads or retrieves an image, a template, or a font.

The system 4500 may also include one or more of a license database 4586, a share database 4587, the export database 4588, a profile database 4589, or a social database 4590. The license database 4586 may be used by the license RPC service 4514 to track licenses (e.g., one-time-use licenses for images) that have been acquired by a user. The share database 4587 may be used by the share RPC service 4520 or the share worker 4554 to manage sharing of graphic designs with other users (e.g., via social network(s)). The export database 4588 may be used by the export service 4510, the export worker 4548, the low priority export worker 4574, or the medium/high priority export worker 4570 to track user exports of their graphic designs into different output formats. The profile database 4589 may support searching for user profiles based on different criteria. The social database 4590 may support social media aspects of the graphic design website.

The system 4500 may also include databases or data stores that support search functionality. For example, a media search database 4591 may be accessed by the search RPC service 4536 or the search worker 4552 when a user searches for images, templates, or fonts. As another example, a profile search database 4592 may be accessed by the profile RPC service 4534 when a user edits the profile information associated with their account. As yet another example, a document search database 4593 may be accessed by the document worker 4546 when a user searches for a previously saved graphic design.

Certain operations at the system 4500 may involve accessing "external" services that are not part of the core service oriented platform of the graphic design website. Examples of such external services may include, but are not limited to, an analytics service 4578, a metrics service 4579, a billing service 4580, an e-mail service 4581, an open authorization (OAuth) service 4582, or a logging service 4583. The analytics service 4578 may receive analytics events (e.g., messages) each time a user performs an action on the graphic design website, and may enable per-user and macro level analytics of graphic design website workflow, operations, and performance. The metrics service 4579 may collect and provide performance information regarding the various components of the system 4500. The billing service 4580 may interface to one or more external payment providers, such as for credit card processing, mobile payment processing, etc. The e-mail service 4581 may enable generating and/or sending e-mails to users (e.g., for notifications, password reset, etc.). The OAuth service 4582 may enable federated logins to the graphic design website using social network credentials and may also support authentication with certain publish endpoints. The logging service

4583 may index events/messages that are generated by the components of the system 4500 for later diagnostic searching.

One example of an operation that may be supported by the system 4500 is logging in to the graphic design website via an Internet browser or a mobile app. A login request may be received by the web front end 4502 from the Internet browser or mobile app. The login request may be routed by the load balancers 4506 to an instance of the profile RPC service 4534, which may "look up" the user in the profile database 4589 and may authenticate the user (federated social networking login may involve the OAuth service 4582). Once the user is authenticated, the graphic design website may load a custom homepage for the user, which may include operations being performed by an instance of the folder RPC service 4528, the document worker 4546, etc. The custom homepage may then be returned to the user's Internet browser or mobile app.

Another example of an operation that may be supported by the system 4500 is starting a new design or opening an existing design. When a user clicks on a new design template, the web front end 4502 may provide the user's Internet browser or mobile application a graphical design interface (e.g., HTML code) that is executable to edit the new or existing design. In the case of loading an existing design, the document service 4526 and/or the document worker 4546 may access the document database 184 to retrieve the existing design, and the media service 4516 may load media assets that are included in the design from the media database 4585.

Another example of an operation that may be supported by the system 4500 is when a user updates a design using the graphical design interface served by the graphic design website. As the user updates the design, the updates may be processed by the document service 4526 and/or the document worker 4546. For example, the service(s) may process image or text movement, insertion, deletion, resizing, recoloring, etc.

Another example of an operation that may be supported by the system 4500 is when a user imports an image. In this case, the import RPC service 4512 and/or one of the import workers 4560, 4566 may receive a user-uploaded image, process the image, and integrate the image into the media database 4585 for subsequent retrieval by the media service 4516.

Another example of an operation that may be supported by the system 4500 is when a user applies a template to a design. In this case, the media search database 4591 may provide via the media service 4516, media assets corresponding to the template. The insertion of the media assets into the design may then be processed by the document service 4526 and/or the document worker 4546 as an update to the user's design.

Another example of an operation that may be supported by the system 4500 is when a user searches for a media asset and then drags-and-drops the media asset into a design. For example, when a user enters a search query "dog," the search RPC service 4536 and/or the search worker 4552 may access the media search database 4591 to retrieve search results for "dog." The search results may be presented by the user's Internet browser or mobile app. When the user adds a particular search result, e.g., a particular image of a dog, to their design, the document service 4526 or the document worker 4546 may process the corresponding update to the design.

Figure 46:
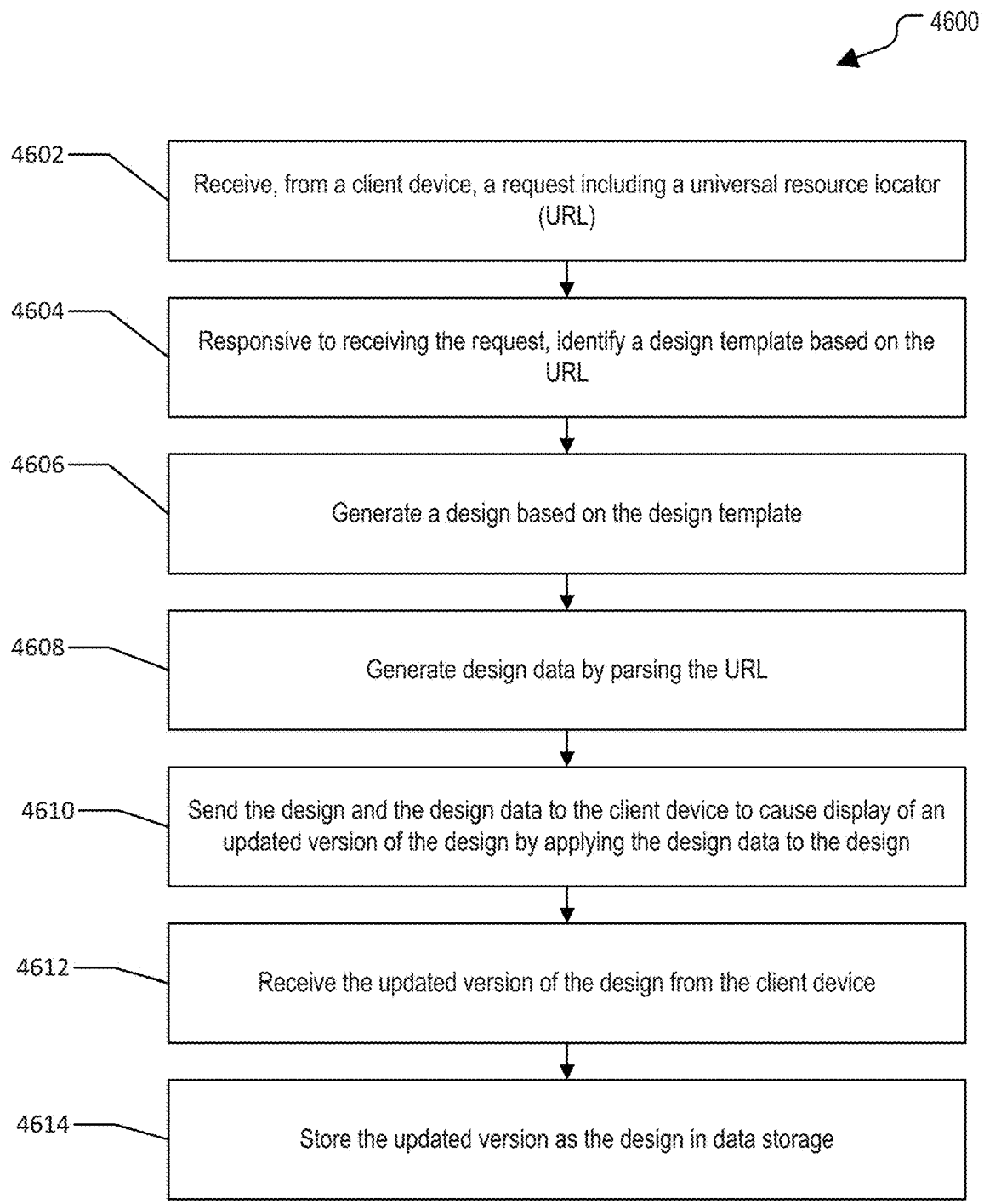
FIG. 46 illustrates a particular example of a method of generating a design based on a URL.

In a particular aspect, the system 4500 may support generating a design based on a URL. For example, a user may generate a design based on a design template indicated in the URL, generate design data by parsing the URL, and provide the design and the design data to a client device to cause the client device to display an updated version of the design by applying the design data to the design, as described with reference to the preceding FIGS. In some aspects, component(s) of the system 4500 (and/or the system 100) may perform a method 4600 of FIG. 46 to generate the design based on a URL.

The method 4600 includes receiving, from a client device, a request including a universal resource locator (URL), at 4602. For example, the design service(s) 126 of FIG. 1 receives the create design request 109 from the client device 192. The create design request 109 includes the URL 141, as described with reference to FIG. 1.

The method 4600 also includes, responsive to receiving the request, identifying a design template based on the URL, at 4604. For example, the design service(s) 126 of FIG. 1, responsive to receiving the create design request 109, identifies the design template 105 based on the URL 141, as described with reference to FIG. 1.

The method 4600 further includes generating a design based on the design template, at 4606. For example, the design service(s) 126 of FIG. 1 generates a design 103 based on the design template 105, as described with reference to FIG. 1.

The method 4600 also includes generating design data by parsing the URL, at 4608. For example, the design service(s) 126 of FIG. 1 generates design data 107 by parsing the URL 141, as described with reference to FIG. 1.

The method 4600 further includes sending the design and the design data to the client device to cause display of an updated version of the design by applying the design data to the design, at 4610. For example, the design service(s) 126 of FIG. 1 sends the design 103 and the design data 107 to the client device 192 to cause display of an updated version of the design 103 by applying the design data 107 to the design 103, as described with reference to FIG. 1.

The method 4600 also includes receiving the updated version of the design from the client device, at 4612. For example, the design service(s) 126 of FIG. 1 receives the updated version of the design 103 from the client device 192, as described with reference to FIG. 1.

The method 4600 further includes storing the updated version as the design in data storage, at 4614. For example, the design service(s) 126 of FIG. 1 stores the updated version as the design 103 in the document database 184, as described with reference to FIG. 1.

The method 4600 thus enables generating a design (e.g., the design 103) based on a URL (e.g., the URL 141). The design 103 is generated by copying a design template (e.g., the design template 105) indicated in the URL 141, generating design data (e.g., the design data 107) by parsing the URL 141, and sending the design 103 and the design data 107 to a client device (e.g., the client device 192) to cause the client device 192 to generate an updated version of the design 103 by applying the design data 107 to the design 103. Using URLs to generate designs may enable faster design processes. For example, the user may efficiently change portions of a URL to generate various designs without having to repetitively provide the same edits corresponding to the unchanging portions of the URL. The user can compare the results of applying the various design edits and choose a particular design based on the comparison.

Methods and devices that may implement aspect(s) of the various features of the present disclosure have been described with reference to the drawings. The drawings and the associated descriptions are provided to illustrate aspects and not to limit the scope of the present disclosure. Reference to any specific aspect, aspect, or implementation is intended to indicate that a particular feature, structure, or characteristic described in connection therewith is included in at least an aspect, aspect, or implementation of the present disclosure. However, the various uses of the terms "aspect," "aspect," or "implementation" are not necessarily all referring to the same single aspect, aspect, or implementation.

In a particular aspect, an apparatus includes a network interface and one or more processors. The network interface is configured to receive a request from a client device. The request includes a universal resource locator (URL). The one or more processors are configured, responsive to receiving the request, to identify a design template based on the URL, to generate a design based on the design template, and to generate design data by parsing the URL. The one or more processors are also configured to send, via the network interface, the design and the design data to the client device to cause display of an updated version of the design by applying the design data to the design. The one or more processors are further configured to receive the updated version of the design via the network interface from the client device.

In another particular aspect, a method includes receiving, at a first device from a client device, a request including a universal resource locator (URL). The method also includes, responsive to receiving the request, identifying a design template based on the URL. The method further includes generating, at the first device, a design based on the design template. The method also includes generating, at the first device, design data by parsing the URL. The method further includes sending the design and the design data from the first device to the client device to cause display of an updated version of the design by applying the design data to the design. The method also includes receiving the updated version of the design at the first device from the client device. The method further includes storing the updated version as the design in data storage.

In another particular aspect, a computer-readable storage device stores instruction that, when executed by one or more processors, cause the one or more processors to perform operations including receiving, from a client device, a request including a universal resource locator (URL). The operations also include, responsive to receiving the request, identifying a design template based on the URL. The operations further include generating a design based on the design template. The operations also include generating design data by parsing the URL. The operations further include sending the design and the design data to the client device to cause display of an updated version of the design by applying the design data to the design. The operations also include receiving the updated version of the design from the client device.

In the foregoing description, specific details are given to provide a thorough understanding of the present disclosure. However, it will be understood by one of ordinary skill in the art that the present disclosure can be practiced without these specific details. Well-known structures and techniques may not be shown in detail, in order to avoid obscuring the illustrated aspects. For example, algorithms may be shown in block diagrams.

It is noted that aspects may be described as a process that is depicted as a flowchart, a flow diagram, a structure diagram, or a block diagram. Although a flowchart may describe operations as a sequential process, many of the operations can be performed in parallel or at least partially concurrently. In addition, the order of the operations can be rearranged. A process is terminated when its operations are completed. A process can correspond to a method, a function, a procedure, a subroutine, a subprogram, etc. When a process corresponds to a function, its termination corresponds to a return of the function to the calling function or the main function.

Moreover, storage may represent one or more devices that store data, including but not limited to random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a flash memory device, and/or other computer-readable or processor-readable media to store information. As used herein, a computer-readable or processor-readable storage medium/device is not a signal.

Furthermore, aspects can be implemented by hardware, software, firmware, middleware, microcode, or any combination thereof. When implemented in software, firmware, middleware or microcode, program code or code segments to perform the tasks can be stored in a memory or other storage. One or more than one processor can perform tasks in series, distributed, concurrently, or in parallel. In some examples, a virtual computer system can be constructed to implement one or more of the methods or functionality as described herein. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, etc.

Although the present disclosure has been described with a degree of particularity, it is understood that the present disclosure has been made by way of example and that other versions are possible. As various changes could be made in the above description without departing from the scope of the disclosure, it is intended that all matter contained in the above description or shown in the accompanying drawings shall be illustrative and not used in a limiting sense.

All features disclosed in the specification, including the claims, abstract, and drawings, and all the steps in any method or process disclosed, can be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise.

Thus, unless expressly stated otherwise, each feature disclosed is one example only of a generic series of equivalent or similar features. The above-disclosed subject matter is to be considered illustrative, and not restrictive, and the appended claims are intended to cover all such modifications, enhancements, and other aspects, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing description.

What is claimed is:

1. An apparatus comprising:
a network interface configured to receive a request from a client device, the request including a universal resource locator (URL); and
one or more processors configured to, responsive to receiving the request:
identify a design template based on the URL;
generate a design based on the design template;
generate design data by parsing the URL;
send, via the network interface, the design and the design data to the client device to cause display of an updated version of the design by applying the design data to the design; and
receive the updated version of the design via the network interface from the client device,
wherein the URL includes a plurality of attribute-value pairs, and
wherein generating the design data includes, in response to determining that an attribute-value pair of the plurality of attribute-value pairs is associated with a content role, adding a key-value pair to the design data, a key of the key-value pair indicating the content role, and a value of the key-value pair based on a value of the attribute-value pair.

2. The apparatus of claim 1, wherein the plurality of attribute-value pairs indicate a color palette, a font combination, a background image, a design title, or a combination thereof.

3. The apparatus of claim 1, wherein an attribute-value pair of the plurality of attribute-value pairs indicates an identifier of the design template.

4. The apparatus of claim 1, wherein the content role includes a pretitle, a title, a subtitle, or a combination thereof.

5. The apparatus of claim 1, wherein generating the design includes, in response to determining that the design template includes a first design element:
adding a second design element to the design; and
transferring content from the first design element to the second design element.

6. An apparatus comprising:
a network interface configured to receive a request from a client device, the request including a universal resource locator (URL); and
one or more processors configured to, responsive to receiving the request: identify a design template based on the URL;
generate a design based on the design template;
generate design data by parsing the URL;
send, via the network interface, the design and the design data to the client device to cause display of an updated version of the design by applying the design data to the design; and
receive the updated version of the design via the network interface from the client device,
wherein the design data includes a key-value pair indicating a key and a value, wherein the key indicates a content role, and wherein generating the updated version of the design includes:
based on determining that the design includes a first design element having the content role, updating the first design element based on the value; and
based on determining that the design does not include any design element having the content role, adding a second design element to the design, the second design element initialized based on the value.

7. The apparatus of claim 1, wherein the network interface is further configured to receive user input, and wherein the one or more processors are further configured to:
generate the URL based on the user input; and
send the URL via the network interface to the client device.

8. An apparatus comprising:
a network interface configured to receive a request from a client device, the request including a universal resource locator (URL); and
one or more processors configured to, responsive to receiving the request: identify a design template based on the URL;
generate a design based on the design template;
generate design data by parsing the URL;
send, via the network interface, the design and the design data to the client device to cause display of an updated version of the design by applying the design data to the design; and
receive the updated version of the design via the network interface from the client device,
wherein the one or more processors are configured to, prior to receiving the request from the client device:
in response to receiving a user input from the client device, provide a URL generation interface to the client device, wherein the URL generation interface includes a plurality of fields;
receive a URL generation request from the client device, the URL generation request indicating values of the plurality of fields;
generate the URL based on the values; and
provide the URL to the client device,
wherein the URL indicates the design template responsive to a value of a template field of the plurality of fields indicating the design template.

9. An apparatus comprising:
a network interface configured to receive a request from a client device, the request including a universal resource locator (URL); and
one or more processors configured to, responsive to receiving the request: identify a design template based on the URL;
generate a design based on the design template;
generate design data by parsing the URL;
send, via the network interface, the design and the design data to the client device to cause display of an updated version of the design by applying the design data to the design; and
receive the updated version of the design via the network interface from the client device,
wherein the one or more processors are configured to, prior to receiving the request from the client device:
in response to receiving a user input from the client device, provide a URL generation interface to the client device, wherein the URL generation interface includes a plurality of fields;
receive a URL generation request from the client device, the URL generation request indicating values of the plurality of fields;
generate the URL based on the values; and
provide the URL to the client device,
wherein, responsive to a determination that a particular field of the plurality of fields is associated with an attribute, the URL includes an attribute-value pair associated with the attribute and a value of the attribute-value pair based on a particular value of the particular field.

10. A method comprising:
receiving, at a first device from a client device, a request including a universal resource locator (URL);
responsive to receiving the request, identifying a design template based on the URL;
generating, at the first device, a design based on the design template;
generating, at the first device, design data by parsing the URL;
sending the design and the design data from the first device to the client device to cause display of an updated version of the design by applying the design data to the design;
receiving the updated version of the design at the first device from the client device;
storing the updated version as the design in data storage;
providing, from the first device to the client device, a URL generation interface including a plurality of fields;
subsequent to storing the updated version of the design, receiving a URL update request from the client device, the URL update request indicating values of the plurality of fields;
determining, based on the values of the plurality of fields, a plurality of attribute-value pairs;
responsive to determining a design field of the plurality of fields indicates the design, generating a second URL indicating the design and the plurality of attribute-value pairs; and
sending the second URL from the first device to the client device.

11. The method of claim 10, further comprising:
receiving, at the first device from the client device, a second request indicating the second URL;
identifying, at the first device, the design based on the second URL; retrieving the stored design from the data storage;
generating, at the first device, second design data by parsing the second URL;
sending the retrieved design and the second design data from the first device to
the client device to cause display of a second updated version of the design by applying the second design data to the retrieved design; and
responsive to receiving, at the first device from the client device, the second updated version of the design, storing the second updated version as the design in the data storage.

12. A method comprising:
receiving, at a first device from a client device, a request including a universal resource locator (URL);
responsive to receiving the request, identifying a design template based on the URL;
generating, at the first device, a design based on the design template;
generating, at the first device, design data by parsing the URL;
sending the design and the design data from the first device to the client device to cause display of an updated version of the design by applying the design data to the design;
receiving the updated version of the design at the first device from the client device; and
storing the updated version as the design in data storage
wherein prior to receiving the request from the client device:
in response to receiving a user input at the first device from the client device, providing a URL generation interface from the first device to the client device, wherein the URL generation interface includes a plurality of fields;
receiving a URL generation request at the first device from the client device, the URL generation request indicating values of the plurality of fields; and
generating, at the first device, the URL based on the values; and
providing the URL from the first device to the client device,
wherein, responsive to a value of a template field of the plurality of fields indicating the design template, the URL indicates the design template.

13. A method comprising:
receiving, at a first device from a client device, a request including a universal resource locator (URL);
responsive to receiving the request, identifying a design template based on the URL;
generating, at the first device, a design based on the design template;
generating, at the first device, design data by parsing the URL;
sending the design and the design data from the first device to the client device to cause display of an updated version of the design by applying the design data to the design;
receiving the updated version of the design at the first device from the client device; and
storing the updated version as the design in data storage
wherein prior to receiving the request from the client device:
in response to receiving a user input at the first device from the client device, providing a URL generation interface from the first device to the client device, wherein the URL generation interface includes a plurality of fields;
receiving a URL generation request at the first device from the client device, the URL generation request indicating values of the plurality of fields;
generating, at the first device, the URL based on the values; and
providing the URL from the first device to the client device,
wherein, responsive to a particular field of the plurality of fields associated with an attribute indicating a particular value, the URL includes an attribute-value pair associated with the attribute and a value of the attribute-value pair based on the particular value.

14. A computer-readable storage device storing instructions that, when executed by one or more processors, cause the one or more processors to perform operations comprising:
receiving, from a client device, a request including a universal resource locator (URL);
responsive to receiving the request, identifying a design template based on the URL;
generating a design based on the design template;
generating design data by parsing the URL;
sending the design and the design data to the client device to cause display of an updated version of the design by applying the design data to the design; and
receiving the updated version of the design from the client device,
wherein the URL includes a plurality of attribute-value pairs, and
wherein generating the design data includes, in response to determining that a attribute-value pair of the plurality of attribute-value pairs is associated with a content role, adding a key-value pair to the design data, a key of the key-value pair indicating the content role, and a value of the key-value pair based on a value of the attribute-value pair.

15. The computer-readable storage device of claim 14, wherein the operations further comprise, prior to receiving the request from the client device:
- in response to receiving a user input from the client device, providing a URL generation interface to the client device, wherein the URL generation interface includes a plurality of fields;
- receiving a URL generation request from the client device, the URL generation request indicating values of the plurality of fields;
- generating the URL based on the values; and providing the URL to the client device.

\* \* \* \* \*